US008386325B2

(12) United States Patent
Bock et al.

(10) Patent No.: US 8,386,325 B2
(45) Date of Patent: Feb. 26, 2013

(54) ARCHITECTURAL DESIGN FOR PLAN-DRIVEN PROCUREMENT APPLICATION SOFTWARE

(75) Inventors: Daniel Bock, Dossenheim (DE); Achim Heger, Meckesheim (DE); Andre Wachholz-Prill, Speyer (DE); Andrea Sudbrack, Heidelberg (DE); Andreas Poth, Weingarten (DE); Christian Ihrig, Weinheim (DE); Christoph Engler, Walldorf (DE); Cordula Ude, Muehlhausen (DE); Dietmar Nowotny, Dielheim (DE); Georg Podhajsky, Philippsburg (DE); Gerhard Maier, Wiesloch (DE); Gunther Liebich, Walldorf (DE); Holger Herrmann, Malsch (DE); Imme Henningsen, Sandhausen (DE); Ingo Pfitzner, Berlin (DE); Jens Freund, Heidelberg (DE); Joachim Kenntner, Heidelberg (DE); Jochen Hirth, Weinheim (DE); Jochen Steinbach, Bad Schoenborn (DE); Jochen Wickel, Wiesloch (DE); Karina Herrmann, Weinheim (DE); Katja Kasteleiner, Mannheim (DE); Martin Wunsch, Dielheim (DE); Martina Lahr, Weinheim (DE); Michael Picht, Walldorf (DE); Paola Sala, Heidelberg (DE); Peer Marschall, Heidelberg (DE); Rainer Heun, Rellingen (DE); Ralf Reinke, Rauenberg (DE); Reiner Bildmayer, Bad Schoenborn (DE); Stefan Adelmann, Mannheim (DE); Stephan Hetzer, Oestringen-Eichelberg (DE); Tao Yu, Wiesloch (DE); Thomas Bach, Muehlhausen (DE); Thomas Nitschke, Nussloch (DE); Uwe Mayer, Erligheim (DE); Volkmar Stegmann, Altlussheim (DE); Wilfried Merkel, Heidelberg (DE); Wilhelm Zwerger, Stutensee (DE); Martin Von Der Emde, Wiesloch (DE)

(73) Assignee: SAP AG, Walldorf (DE)

( * ) Notice: Subject to any disclaimer, the term of this patent is extended or adjusted under 35 U.S.C. 154(b) by 648 days.

(21) Appl. No.: 12/233,457

(22) Filed: Sep. 18, 2008

(65) Prior Publication Data
US 2010/0070324 A1 Mar. 18, 2010

(51) Int. Cl.
*G06Q 30/00* (2006.01)
(52) U.S. Cl. .................. 705/26.1; 705/26.8; 705/26.81; 705/26.82; 705/28; 705/29
(58) Field of Classification Search .................. 705/26.1, 705/26.81, 26.82, 28, 29
See application file for complete search history.

(56) References Cited

U.S. PATENT DOCUMENTS

| | | | |
|---|---|---|---|
| 4,947,321 A | 8/1990 | Spence et al. |
| 5,361,198 A | 11/1994 | Harmon et al. |
| 5,550,734 A | 8/1996 | Tarter et al. |
| 5,560,005 A | 9/1996 | Hoover et al. |
| 5,566,097 A | 10/1996 | Myers et al. |
| 5,586,312 A | 12/1996 | Johnson et al. |
| 5,590,277 A | 12/1996 | Fuchs et al. |
| 5,632,022 A | 5/1997 | Warren et al. |
| 5,634,127 A | 5/1997 | Cloud et al. |
| 5,680,619 A | 10/1997 | Gudmundson et al. |
| 5,704,044 A | 12/1997 | Tarter et al. |
| 5,710,917 A | 1/1998 | Musa et al. |
| 5,768,119 A | 6/1998 | Havekost et al. |
| 5,822,585 A | 10/1998 | Noble et al. |
| 5,832,218 A | 11/1998 | Gibbs et al. |
| 5,848,291 A | 12/1998 | Milne et al. |
| 5,867,495 A | 2/1999 | Elliott et al. |
| 5,870,588 A | 2/1999 | Rompaey et al. |
| 5,881,230 A | 3/1999 | Christensen et al. |
| 5,893,106 A | 4/1999 | Brobst et al. |
| 5,898,872 A | 4/1999 | Richley |
| 5,918,219 A | 6/1999 | Isherwood |
| 5,987,247 A | 11/1999 | Lau |
| 5,991,536 A | 11/1999 | Brodsky et al. |
| H001830 H | 1/2000 | Petrimoulx et al. |
| 6,028,997 A | 2/2000 | Leymann et al. |

| Patent No. | Kind | Date | Inventor(s) |
|---|---|---|---|
| 6,038,393 | A | 3/2000 | Iyengar et al. |
| 6,049,838 | A | 4/2000 | Miller et al. |
| 6,067,559 | A | 5/2000 | Allard et al. |
| 6,070,197 | A | 5/2000 | Cobb et al. |
| 6,112,024 | A | 8/2000 | Almond et al. |
| 6,151,582 | A | 11/2000 | Huang et al. |
| 6,167,563 | A | 12/2000 | Fontana et al. |
| 6,167,564 | A | 12/2000 | Fontana et al. |
| 6,177,932 | B1 | 1/2001 | Galdes et al. |
| 6,182,133 | B1 | 1/2001 | Horvitz |
| 6,192,390 | B1 | 2/2001 | Berger et al. |
| 6,208,345 | B1 | 3/2001 | Sheard et al. |
| 6,237,136 | B1 | 5/2001 | Sadahiro |
| 6,272,672 | B1 | 8/2001 | Conway |
| 6,311,170 | B1 | 10/2001 | Embrey |
| 6,338,097 | B1 | 1/2002 | Krenzke et al. |
| 6,424,991 | B1 | 7/2002 | Gish |
| 6,434,740 | B1 | 8/2002 | Monday et al. |
| 6,442,748 | B1 | 8/2002 | Bowman-Amuah |
| 6,445,782 | B1 | 9/2002 | Elfe et al. |
| 6,446,045 | B1 | 9/2002 | Stone et al. |
| 6,446,092 | B1 | 9/2002 | Sutter |
| 6,473,794 | B1 | 10/2002 | Guheen et al. |
| 6,493,716 | B1 | 12/2002 | Azagury et al. |
| 6,571,220 | B1 | 5/2003 | Ogino et al. |
| 6,594,535 | B1 | 7/2003 | Costanza |
| 6,601,233 | B1 * | 7/2003 | Underwood ............ 717/102 |
| 6,601,234 | B1 | 7/2003 | Bowman-Amuah |
| 6,606,744 | B1 | 8/2003 | Mikurak |
| 6,609,100 | B2 | 8/2003 | Smith et al. |
| 6,640,238 | B1 | 10/2003 | Bowman-Amuah |
| 6,671,673 | B1 | 12/2003 | Baseman et al. |
| 6,678,882 | B1 | 1/2004 | Hurley et al. |
| 6,691,151 | B1 | 2/2004 | Cheyer et al. |
| 6,721,783 | B1 | 4/2004 | Blossman et al. |
| 6,738,964 | B1 | 5/2004 | Zink et al. |
| 6,747,679 | B1 | 6/2004 | Finch et al. |
| 6,750,885 | B1 | 6/2004 | Finch et al. |
| 6,757,837 | B1 | 6/2004 | Platt et al. |
| 6,764,009 | B2 | 7/2004 | Melick et al. |
| 6,772,216 | B1 | 8/2004 | Ankireddipally et al. |
| 6,782,536 | B2 | 8/2004 | Moore et al. |
| 6,789,252 | B1 | 9/2004 | Burke et al. |
| 6,845,499 | B2 | 1/2005 | Srivastava et al. |
| 6,847,854 | B2 | 1/2005 | Discenzo |
| 6,859,931 | B1 | 2/2005 | Cheyer et al. |
| 6,889,197 | B2 | 5/2005 | Lidow |
| 6,889,375 | B1 | 5/2005 | Chan et al. |
| 6,895,438 | B1 | 5/2005 | Ulrich |
| 6,898,783 | B1 | 5/2005 | Gupta et al. |
| 6,904,399 | B2 | 6/2005 | Cooper et al. |
| 6,907,395 | B1 | 6/2005 | Hunt et al. |
| 6,954,736 | B2 | 10/2005 | Menninger et al. |
| 6,985,939 | B2 | 1/2006 | Fletcher et al. |
| 6,990,466 | B1 | 1/2006 | Hu |
| 7,003,474 | B2 * | 2/2006 | Lidow ............ 705/7.31 |
| 7,031,998 | B2 | 4/2006 | Archbold |
| 7,043,448 | B2 | 5/2006 | Campbell |
| 7,047,518 | B2 | 5/2006 | Little et al. |
| 7,050,056 | B2 | 5/2006 | Meyringer |
| 7,050,873 | B1 | 5/2006 | Discenzo |
| 7,055,136 | B2 | 5/2006 | Dzoba et al. |
| 7,058,587 | B1 | 6/2006 | Horne |
| 7,069,536 | B2 | 6/2006 | Yaung |
| 7,072,855 | B1 | 7/2006 | Godlewski et al. |
| 7,076,766 | B2 | 7/2006 | Wirts et al. |
| 7,100,195 | B1 | 8/2006 | Underwood |
| 7,103,873 | B2 | 9/2006 | Tanner et al. |
| 7,117,447 | B2 | 10/2006 | Cobb et al. |
| 7,120,597 | B1 | 10/2006 | Knudtzon et al. |
| 7,120,896 | B2 | 10/2006 | Budhiraja et al. |
| 7,131,069 | B1 | 10/2006 | Rush et al. |
| 7,149,887 | B2 | 12/2006 | Morrison et al. |
| 7,155,403 | B2 | 12/2006 | Cirulli et al. |
| 7,155,409 | B1 | 12/2006 | Stroh |
| 7,181,694 | B2 | 2/2007 | Reiss et al. |
| 7,184,964 | B2 * | 2/2007 | Wang ............ 705/7.11 |
| 7,191,740 | B2 | 3/2007 | Baba et al. |
| 7,194,431 | B1 | 3/2007 | Land et al. |
| 7,197,740 | B2 | 3/2007 | Beringer et al. |
| 7,200,569 | B2 | 4/2007 | Gallagher et al. |
| 7,206,768 | B1 | 4/2007 | deGroeve et al. |
| 7,213,232 | B1 | 5/2007 | Knowles |
| 7,216,091 | B1 | 5/2007 | Blandina et al. |
| 7,219,107 | B2 | 5/2007 | Beringer |
| 7,222,786 | B2 | 5/2007 | Renz et al. |
| 7,225,240 | B1 | 5/2007 | Fox et al. |
| 7,249,044 | B2 | 7/2007 | Kumar et al. |
| 7,257,254 | B2 | 8/2007 | Tunney |
| 7,283,973 | B1 | 10/2007 | Loghmani et al. |
| 7,293,254 | B2 | 11/2007 | Bloesch et al. |
| 7,299,970 | B1 | 11/2007 | Ching |
| 7,315,830 | B1 | 1/2008 | Wirtz et al. |
| 7,322,024 | B2 | 1/2008 | Carlson et al. |
| 7,324,966 | B2 | 1/2008 | Scheer |
| 7,353,180 | B1 | 4/2008 | Silverstone et al. |
| 7,356,492 | B2 | 4/2008 | Hazi et al. |
| 7,367,011 | B2 | 4/2008 | Ramsey et al. |
| 7,370,315 | B1 | 5/2008 | Lovell et al. |
| 7,376,601 | B1 | 5/2008 | Aldridge |
| 7,376,604 | B1 * | 5/2008 | Butcher ............ 705/35 |
| 7,376,632 | B1 | 5/2008 | Sadek et al. |
| 7,383,201 | B2 | 6/2008 | Matsuzaki et al. |
| 7,386,833 | B2 | 6/2008 | Granny et al. |
| 7,406,716 | B2 | 7/2008 | Kanamori et al. |
| 7,415,697 | B1 | 8/2008 | Houlding |
| 7,418,409 | B1 | 8/2008 | Goel |
| 7,418,424 | B2 | 8/2008 | Martin et al. |
| 7,424,701 | B2 | 9/2008 | Kendall et al. |
| 7,433,979 | B2 | 10/2008 | Need |
| 7,448,022 | B1 | 11/2008 | Ram et al. |
| 7,451,432 | B2 | 11/2008 | Shukla et al. |
| 7,460,654 | B1 | 12/2008 | Jenkins et al. |
| 7,461,030 | B2 | 12/2008 | Hibler et al. |
| 7,469,233 | B2 | 12/2008 | Shooks et al. |
| 7,516,088 | B2 | 4/2009 | Johnson et al. |
| 7,523,054 | B2 | 4/2009 | Tyson-Quah |
| 7,529,699 | B2 | 5/2009 | Fuse et al. |
| 7,536,325 | B2 | 5/2009 | Randell et al. |
| 7,536,354 | B1 | 5/2009 | deGroeve et al. |
| 7,546,520 | B2 | 6/2009 | Davidson et al. |
| 7,546,575 | B1 | 6/2009 | Dillman et al. |
| 7,565,640 | B2 | 7/2009 | Shukla et al. |
| 7,574,694 | B2 | 8/2009 | Mangan et al. |
| 7,624,371 | B2 | 11/2009 | Kulkarni et al. |
| 7,631,291 | B2 | 12/2009 | Shukla et al. |
| 7,640,195 | B2 | 12/2009 | Von Zimmermann et al. |
| 7,640,291 | B2 | 12/2009 | Maturana et al. |
| 7,644,390 | B2 | 1/2010 | Khodabandehloo et al. |
| 7,657,406 | B2 | 2/2010 | Tolone et al. |
| 7,657,445 | B1 | 2/2010 | Goux |
| 7,665,083 | B2 | 2/2010 | Demant et al. |
| 7,668,761 | B2 | 2/2010 | Jenkins et al. |
| 7,672,888 | B2 | 3/2010 | Allin et al. |
| 7,681,176 | B2 | 3/2010 | Willis et al. |
| 7,693,586 | B2 | 4/2010 | Dumas et al. |
| 7,703,073 | B2 | 4/2010 | Illowsky et al. |
| 7,739,160 | B1 | 6/2010 | Ryan et al. |
| 7,742,985 | B1 | 6/2010 | Digrigoli et al. |
| 7,747,980 | B2 | 6/2010 | Illowsky et al. |
| 7,765,156 | B2 | 7/2010 | Staniar et al. |
| 7,765,521 | B2 | 7/2010 | Bryant |
| 7,788,145 | B2 | 8/2010 | Wadawadigi et al. |
| 7,788,319 | B2 | 8/2010 | Schmidt |
| 7,793,256 | B2 | 9/2010 | Charisius et al. |
| 7,793,258 | B2 | 9/2010 | Sundararajan et al. |
| 7,797,698 | B2 | 9/2010 | Diament et al. |
| 7,805,365 | B1 | 9/2010 | Slavin et al. |
| 7,814,142 | B2 | 10/2010 | Mamou et al. |
| 7,822,682 | B2 | 10/2010 | Arnold et al. |
| 7,835,971 | B2 | 11/2010 | Stockton et al. |
| 7,886,041 | B2 | 2/2011 | Outhred et al. |
| 7,895,568 | B1 | 2/2011 | Goodwin et al. |
| 7,904,350 | B2 | 3/2011 | Ayala et al. |
| 7,912,755 | B2 | 3/2011 | Perry et al. |
| 7,917,889 | B2 | 3/2011 | Devarakonda et al. |
| 7,925,985 | B2 | 4/2011 | Moore |
| 8,001,519 | B2 | 8/2011 | Conallen et al. |

| | | |
|---|---|---|
| 8,010,938 B2 | 8/2011 | Elaasar |
| 8,051,332 B2 | 11/2011 | Zakonov et al. |
| 8,091,065 B2 | 1/2012 | Mir et al. |
| 8,112,738 B2 | 2/2012 | Pohl et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0069144 A1 | 6/2002 | Palardy |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0058277 A1 | 3/2003 | Bowman-Amuah |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0101112 A1 | 5/2003 | Gallagher et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1* | 3/2005 | Kroswek et al. .................. 705/7 |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1* | 8/2005 | Lidow .............................. 705/22 |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 | 9/2005 | Wright |
| 2005/0222896 A1 | 10/2005 | Rhyne et al. |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0075916 A1 | 4/2007 | Bump et al. |
| 2007/0094098 A1 | 4/2007 | Mayer et al. |
| 2007/0094261 A1* | 4/2007 | Phelan et al. .................. 707/9 |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0164849 A1 | 7/2007 | Haeberle et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0220143 A1 | 9/2007 | Lund et al. |
| 2007/0233539 A1 | 10/2007 | Suenderhauf et al. |
| 2007/0233541 A1 | 10/2007 | Schorr et al. |
| 2007/0233545 A1 | 10/2007 | Cala et al. |
| 2007/0233574 A1 | 10/2007 | Koegler et al. |
| 2007/0233575 A1 | 10/2007 | Berger et al. |

| | | | |
|---|---|---|---|
| 2007/0233581 | A1 | 10/2007 | Peter |
| 2007/0233598 | A1 | 10/2007 | Der Emde et al. |
| 2007/0234282 | A1 | 10/2007 | Prigge et al. |
| 2007/0239508 | A1 | 10/2007 | Fazal et al. |
| 2007/0239569 | A1 | 10/2007 | Lucas et al. |
| 2007/0265860 | A1 | 11/2007 | Herrmann et al. |
| 2007/0265862 | A1 | 11/2007 | Freund et al. |
| 2008/0004929 | A9 | 1/2008 | Raffel et al. |
| 2008/0017722 | A1 | 1/2008 | Snyder et al. |
| 2008/0027831 | A1 | 1/2008 | Gerhardt |
| 2008/0065437 | A1 | 3/2008 | Dybvig |
| 2008/0120129 | A1 | 5/2008 | Seubert et al. |
| 2008/0147507 | A1 | 6/2008 | Langhammer |
| 2008/0162382 | A1 | 7/2008 | Clayton et al. |
| 2008/0208707 | A1 | 8/2008 | Erbey et al. |
| 2008/0215354 | A1 | 9/2008 | Halverson et al. |
| 2008/0263152 | A1 | 10/2008 | Daniels et al. |
| 2008/0300959 | A1 | 12/2008 | Sinha et al. |
| 2009/0037287 | A1 | 2/2009 | Baitalmal et al. |
| 2009/0037492 | A1 | 2/2009 | Baitalmal et al. |
| 2009/0063112 | A1 | 3/2009 | Hader et al. |
| 2009/0171716 | A1 | 7/2009 | Suenderhauf et al. |
| 2009/0171818 | A1 | 7/2009 | Penning et al. |
| 2009/0172699 | A1 | 7/2009 | Jungkind et al. |
| 2009/0189743 | A1* | 7/2009 | Abraham et al. .......... 340/10.42 |
| 2009/0192858 | A1 | 7/2009 | Johnson |
| 2010/0070324 | A1 | 3/2010 | Bock et al. |
| 2010/0070331 | A1 | 3/2010 | Koegler et al. |
| 2010/0070336 | A1 | 3/2010 | Koegler et al. |
| 2010/0070391 | A1 | 3/2010 | Storr et al. |
| 2010/0070395 | A1 | 3/2010 | Elkeles et al. |
| 2010/0070555 | A1 | 3/2010 | Duparc et al. |
| 2010/0100464 | A1 | 4/2010 | Ellis et al. |
| 2010/0138269 | A1 | 6/2010 | Cirpus et al. |
| 2011/0252395 | A1 | 10/2011 | Charisius et al. |

FOREIGN PATENT DOCUMENTS

| | | |
|---|---|---|
| WO | 00/23874 | 4/2000 |
| WO | WO 2004/083984 | 9/2004 |
| WO | WO 2005/114381 | 12/2005 |

OTHER PUBLICATIONS

Bin et al.; "Component Model Optimization for Distributed Real-Time Embedded Software"; IEEE International Conference on Systems, Man and Cybernetics; Oct. 13, 2004; 6 pages.

Cascallar, Eduardo et al.; "Assessment in the Evaluation of Self-Regulation as a Process"; Educational Psychology Review; vol. 18, No. 3; Sep. 2006; pp. 297-306.

Cohen; "Optimizer: IBM's Multi-Echelon Inventory System for Managing Service Logistics Interfaces"; vol. 20, No. 1; 1990; pp. 65-82.

Cohen et al.; "Saturn's Supply-Chain Innovation: High Value in After Sales Service"; Sloan Management Review; vol. 41, No. 4; 2000; pp. 93-101.

Cool, David W.; "Activity Fund Accounting"; School Business Affairs; vol. 49, No. 6; Jun. 1983; pp. 50-52.

Cox et al.; "A Formal Model for Component Based Software"; IEEE; Aug. 7, 2002; 8 pages.

Ferscha et al.; "A Light-Weight Component Model for Peer-to-Peer Applications"; IEEE; Mar. 23, 2004.

Finin et al.; "KQML as an Agent Communication Language"; retrieved on Jul. 26, 2011; pp. 456-463. <http://portal.acm.org/citation.cfm?id=191322>.

Flissi et al.; "A Component-based Software Infrastructure for Ubiquitous Computing"; IEEE; Jul. 4, 2005.

Gould; "Integrating the Manufacturing Enterprise"; Automative Design & Production; 119, 1; ABI/INFORM Global; Jan. 2007; 3 pages.

Huang et al.; "Supply Chain Configuration Based on Supply Chain Operations Reference (SCOR) Model"; Computers and Industrial Engineering; Elsevier; 2005.

Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.

Kalakota et al.; "Readings in Electronic Commerce"; Addison-Wesley Longman, Inc.; 1995; ISBN: 0-201-88060-1.

Orsburn; "Spares Management Handbook"; McGrawHill; 1991; ISBN: 0-8306-7626-0.

Papazoglou et al; "Service-Oriented Computing Research Road Map"; http://infolab.uvt.nl/pub/papazogloump-2006-96.pdf; Mar. 1, 2006; 29 pages.

SAP AG; "SAP NetWeaver Visual Composer: User Guide (SAP NetWeaver Visual Composer release 6.0)"; Document version 1.1; 2004; pp. 1-208.

SAP AG; "Powered by SAP NetWeaver Partner Program—Frequently Asked Questions"; May 2005; 10 pages. [online] http://www.lionbridge.com/NR/rdonlyres/4940BE1F/DA46/412E/AB16/F049BD865CA1/0/PBMWFAQ_50070686_en.pdf.

Strelich, Thomas P. et al.; "Simulation-Based Transformation with the Service Integration/Interoperation Infrastructure"; Technology Review Journal; Fall/Winter 2005; pp. 99-115.

Office Action issued in U.S. Appl. No. 11/396,312 on Sep. 10, 2010; 23 pages.

Office Action issued in U.S. Appl. No. 11/322,611 on Sep. 16, 2010; 21 pages.

Notice of Allowance issued in U.S. Appl. No. 11/322,398 on Oct. 29, 2010; 18 pages.

Notice of Allowanced issued in U.S. Appl. No. 11/322,398 on Nov. 15, 2010; 20 pages.

Notice of Allowance issued in U.S. Appl. No. 11/396,258 on Jul. 28, 2010; 9 pages.

Notice of Allowance issued in U.S. Appl. No. 11/396,258 on Nov. 16, 2010; 8 pages.

Office Action issued in U.S. Appl. No. 11/396,236 on Oct. 28, 2010; 19 pages.

Notice of Allowance issued in U.S. Appl. No. 12/233,554 on Sep. 17, 2010; 10 pages.

Notice of Allowance issued in U.S. Appl. No. 12/233,554 on Feb. 22, 2011; 7 pages.

Notice of Allowance issued in U.S. Appl. No. 12/233,554 on Jun. 27, 2011; 7 pages.

Office Action issued in U.S. Appl. No. 12/233,550 on Jan. 12, 2011; 29 pages.

Notice of Allowance issued in U.S. Appl. No. 12/233,550 on May 11, 2011; 20 pages.

Notice of Allowance issued in U.S. Appl. No. 11/968,054 on Sep. 7, 2010; 11 pages.

Notice of Allowance issued in U.S. Appl. No. 11/967,865 on Oct. 6, 2010; 6 pages.

Office Action issued in U.S. Appl. No. 11/323,634 on Apr. 29, 2011; 8 pages.

Office Action issued in U.S. Appl. No. 11/322,973 on Dec. 7, 2010; 13 pages.

Office Action issued in U.S. Appl. No. 11/322,973 on May 27, 2011; 15 pages.

Notice of Allowance issued in U.S. Appl. No. 11/396,327 on Nov. 30, 2010; 28 pages.

Office Action issued in U.S. Appl. No. 11/404,147 on Nov. 24, 2010; 27 pages.

Office Action issued in U.S. Appl. No. 11/404,147 on Aug. 4, 2011; 26 pages.

Notice of Allowance issued in U.S. Appl. No. 12/233,462 on Feb. 2, 2011; 11 pages.

Notice of Allowance issued in U.S. Appl. No. 12/233,462 on May 18, 2011; 6 pages.

Office Action issued in U.S. Appl. No. 11/967,483 on Aug. 20, 2010; 10 pages.

Office Action issued in U.S. Appl. No. 11/967,483 on Mar. 4, 2011; 6 pages.

Office Action issued in U.S. Appl. No. 12/327,232 on May 26, 2011; 20 pages.

Office Action issued in U.S. Appl. No. 12/327,590 on Jun. 23, 2011; 16 pages.

Notice of Allowance issued in U.S. Appl. No. 12/333,085; Sep. 13, 2010; 8 pages.

Notice of Allowance issued in U.S. Appl. No. 12/233,534 on Oct. 20, 2010; 15 pages.

Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Application No. 1/322,382 on Sep. 20, 2010; 6 pages.
Notice of Allowance issued in U.S. Application No. 1/322,382 on Jan. 6, 2011; 7 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowanced issued in U.S. Appl. No. 11/322,398 on May 27, 2011; 21 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Office Action issued in U.S. Appl. No. 12/233,417 on Apr. 7, 2011; 32 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Sep. 16, 2010; 16 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 o n Apr. 15, 2011; 12 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.

Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,772; Jul. 12, 2010; 18 pages.

Office Action issued in U.S. Appl. No. 11/322,398 on Apr. 2, 2010; 39 pages.
Notice of Allowance issued in U.S. Appl. No. 11/322,398 on Jul. 23, 2010; 38 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,259 on Jul. 6, 2010; 6 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/322,845; Jul. 15, 2010; 16 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.
Office Action issued in U.S. Appl. No. 12/333,146 on Sep. 6, 2011; 21 pages.
Notice of Allowance issued in U.S. Appl. No. 12/233,462 on Sep. 2, 2011; 7 pages.
Office Action issued in U.S. Appl. No. 12/233,087 on Aug. 18, 2011; 42 pages.
Notice of Allowance issued in U.S. Appl. No. 11/322,382 on Jul. 25, 2011; 5 pages.
Notice of Allowance issued in U.S. Appl. No. 11/396,259 on Aug. 5, 2011; 7 pages.
Notice of Allowance issued in U.S. Appl. No. 11/322,851 on Sep. 2, 2011; 8 pages.
Notice of Allowance issued in U.S. Appl. No. 11/397,026 on Jul. 20, 2011; 8 pages.
Notice of Allowance issued in U.S. Appl. No. 12/233,417 on Sep. 14, 2011; 11 pages.
Notice of Allowance issued in U.S. Appl. No. 11/968,054 on August 2; 5 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Notice of Allowance issued in U.S. Appl. No. 11/967,890 on Jul. 15, 2011; 7 pages.
Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports™ 13,000 MAS 90® for Windows® Shipments in First Nine Months of Availability"; PR Newswire; Apr. 28, 1997.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
"Hudson's Bay Company Realizes Fast ROI with the Oracle E-Business Suite"; PR Newswire; New York; Jan. 15, 2002; p. 1.
Office Action issued in U.S. Appl. No. 11/397,029; Jul. 21, 2009;28 pages.
Office Action issued in U.S. Appl. No. 11/323,040; Jul. 24, 2009; 35 pages.
Office Action issued in U.S. Appl. No. 11/323,590; Jul. 10, 2009; 32 pages.
Office Action issued in U.S. Appl. No. 11/322,816; Jul. 23, 2006; 41 pages.
Office Action issued in U.S. Appl. No. 11/322,851; Sep. 2, 2009; 32 pages.
Office Action issued in U.S. Appl. No. 11/323,590; Dec. 30, 2009; 31 pages.
Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.
Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.
Fellner, K.J., et al.; "Classification Framework for Business Components"; System Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.
Gauthier, P. and OSS-J Architecture Board; "OSS through Java (TM) J2EE Design Guidelines"; [online]; Oct. 31, 2001; http://www.ossj.org/downloads/design_guidelines.shtml.
Gessford, J.E.; "Object-Oriented System Design"; Emerging Information Technologies for Competitive Advantage and Economic Development; Proceedings of the 1992 Information Resources Management Association International Conference; 1992; pp. 110-118.
He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.
Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.
Kythe, D.K.; "The Promise of Distributed Business Components"; Bell Labs Technical Journal; vol. 75, No. 2; Mar./Apr. 1999; pp. 20-28.
Linthicum, D.S.; "Chapter 9: RPCs, Messaging, and B2B Application Integration"; B2B Application Integration: E-Business Enable Your Enterprise; 2001; pp. 167-181.
Nori A.K. et al.; "Composite Applications: Process Based Application Development"; Lecture Notes in Computer Science; vol. 2444; Aug. 2003; pp. 48-53.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development"; The Data Base for Advances in Information Systems; 2003; pp. 45-46.
SAP AG; "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop; vol. 12, No. 6; Oct. 1999; pp. 6-10, 12-15.
Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.
Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Vergil Technology Ltd.; "Vergil Composite Application Builder Suite"; Product Datasheet [online]; 2003; pp. 1-5; http://www.webservicesmall.com.docs/VCAB_datasheet.pdf.
Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
Anonymous; "Mastering Management"; Motor Age, vol. 25, No. 10; Oct. 2006; pp. 1-3.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.

Kremic, Tibor; "Outsourcing Decision Support: A Survey of Benefits, Risks, and Decision Factor"; Supply Chain Management; V. 11; 2006; pp. 467-482.

Sarjoughian et al.; "CoSMOs: A Visual Environment for Component Based Modeling, Experimental Design and Simulation"; ACM; 2009; pp. 1-9.

Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.

Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.

Notice of Allowance issued in U.S. Appl. No. 11/396,327 on Sep. 28, 2011; 31 pages.

Office Action issued in U.S. Appl. No. 12/233,479 on Oct. 27, 2011; 24 pages.

Office Action issued in U.S. Appl. No. 12/332,965 on Oct. 11, 2011; 6 pages.

Notice of Allowance in U.S. Appl. No. 12/233,462 on Dec. 12, 2011; 6 pages.

Office Action issued in U.S. Appl. No. 12/233,289 on Oct. 27, 2011; 15 pages.

Notice of Allowance issued in U.S. Appl. No. 12/327,232 on Nov. 2, 2011; 16 pages.

Notice of Allowance issued in U.S. Appl. No. 12/327,590 on Dec. 28, 2011; 10 pages.

Office Action issued in U.S. Appl. No. 12/327,701 on Nov. 8, 2011; 20 pages.

Notice of Allowance issued in U.S. Appl. No. 12/233,534 on Dec. 28, 2011; 7 pages.

Notice of Allowanced issued in U.S. Appl. No. 11/322,398 on Oct. 18, 2011; 7 pages.

Office Action issued in U.S. Appl. No. 11/322,383 on May 12, 2010; 23 pages.

Office Action issued in U.S. Appl. No. 11/322,383 on Nov. 12, 2009; 23 pages.

Examiner's Answer to Appeal Brief issued in U.S. Appl. No. 11/396,236 on Nov. 10, 2011; 19 pages.

Office Action issued in U.S. Appl. No. 11/396,288 on Oct. 17, 2011; 38 pages.

Notice of Allowance issued in U.S. Appl. No. 11/396,250 on Dec. 7, 2011; 6 pages.

Office Action issued in U.S. Appl. No. 11/396,252 on Nov. 10, 2011; 18 pages.

Notice of Allowance issued in U.S. Appl. No. 11/322,845; Nov. 13, 2011; 9 pages.

Office Action issued in U.S. Appl. No. 11/397,026; Jul. 21, 2009; 28 pages.

Notice of Allowance issued in U.S. Appl. No. 11/397,026 on Nov. 4, 2011; 8 pages.

Notice of Allowance issued in U.S. Appl. No. 12/233,520 on Nov. 10, 2011; 22 pages.

Office Action issued in U.S. Appl. No. 12/233,458 on Oct. 12, 2011; 19 pages.

Office Action issued in U.S. Appl. No. 11/967,489 on Sep. 28, 2011; 7 pages.

Notice of Allowance issued in U.S. Appl. No. 11/967,393 on Nov. 9, 2011; 9 pages.

"IDe Partners with Journyx to Offer Customers Best-in-Class Time Management Solution"; PR Newswire; Mar. 8, 2005; Business Dateline.

Meseroll, Robert; "Data Mining Navy Flight"; IEEE Autotestcom 2007; Sep. 2007; pp. 476-481.

"Trakware Systems Inc. Expands Management Team: Leading To-Order Software Provider Adds Experienced Global VP Sales and Marketing to its World-Class Team"; Canada NewsWire; Apr. 9, 2008.

Trappey, Amy; "Design and Analysis of a Rule Based Knowledge"; International Journal of Manufacturing Tech; Dec. 2007; 35,3-4:385-93.

Notice of Allowance issued in U.S. Appl. No. 12/233,550 on Jan. 9, 2012; 11 pages.

Office Action issued in U.S. Appl. No. 12/333,146 on Feb. 2, 2012; 21 pages.

Notice of Allowance issued in U.S. Appl. No. 11/323,634 on Jan. 25, 2012; 5 pages.

Office Action issued in U.S. Appl. No. 11/322,816 on Jun. 7, 2012; 12 pages.

Office Action issued in U.S. Appl. No. 12/233,479 on May 7, 2012; 26 pages.

Notice of Allowance issued in U.S. Appl. No. 12/332,965 on Jun. 11, 2012; 21 pages.

Notice of Allowance in U.S. Appl. No. 12/233,462 on Apr. 5, 2012; 7 pages.

Notice of Allowance issued in U.S. Appl. No. 12/233,289 on Feb. 15, 2012; 11 pages.

Notice of Allowance issued in U.S. Appl. No. 12/233,457 on May 16, 2012; 7 pages.

Notice of Allowance issued in U.S. Appl. No. 12/327,701 on Apr. 6, 2012; 9 pages.

Notice of Allowance issued in U.S. Appl. No. 12/233,087 on Mar. 30, 2012; 30 pages.

Notice of Allowanced issued in U.S. Appl. No. 11/322,398 on May 3, 2012; 7 pages.

Office Action issued in U.S. Appl. No. 11/323,041 on Jun. 7, 2012; 12 pages.

Office Action issued in U.S. Appl. No. 11/322,612 on Jun. 26, 2012; 11 pages.

Notice of Allowance issued in U.S. Appl. No. 11/396,259 on Mar. 15, 2012; 7 pages.

Notice of Allowance issued in U.S. Appl. No. 11/396,288; Apr. 27, 2012; 15 pages.

Notice of Allowance issued in U.S. Appl. No. 11/396,258 on Feb. 3, 2012; 12 pages.

Notice of Allowance issued in U.S. Appl. No. 11/322,851 on Mar. 1, 2012; 9 pages.

Notice of Allowance issued in U.S. Appl. No. 11/397,026 on Feb. 23, 2012; 8 pages.

Notice of Allowance issued in U.S. Appl. No. 12/233,458 on May 1, 2012; 17 pages.

Office Action issued in U.S. Appl. No. 11/967,489 on Feb. 6, 2012; 9 pages.

Office Action issued in U.S. Appl. No. 12/233,489 on Jun. 6, 2012; 87 pages.

Office Action issued in U.S. Appl. No. 11/967,387 on Apr. 12, 2012; 13 pages.

Office Action issued in U.S. Appl. No. 12/327,737 on Mar. 26, 2012; 14 pages.

Notice of Allowance issued in U.S. Appl. No. 12/233,075 on Mar. 22, 2012; 25 pages.

\* cited by examiner

*Primary Examiner* — Ryan Zeender
*Assistant Examiner* — Milena Racic
(74) *Attorney, Agent, or Firm* — Fish & Richardson P.C.

(57) ABSTRACT

Methods, systems, and apparatus, including computer program products, for implementing a software architecture design for a software application implementing plan-driven procurement. The application is structured as multiple process components interacting with each other through service interfaces, and multiple service operations, each being implemented for a respective process component. The process components include an Inbound Delivery Processing process component, a Site Logistics Processing process component, an Inventory Processing process component, a Purchase Request Processing process component, a Purchase Order Processing process component, a Purchasing Contract process component, a Supplier Invoice Processing process component, a Demand Forecast Processing process component, a Supply and Demand Matching process component, an External Procurement Trigger and Response process component, and a Logistics Execution Control process component.

22 Claims, 37 Drawing Sheets

ARCHITECTURAL DESIGN FOR PLAN-DRIVEN PROCUREMENT APPLICATION SOFTWARE

BACKGROUND

The subject matter of this patent application relates to computer software architecture and, more particularly, to the architecture of application software for plan-driven procurement.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application implementing plan-driven procurement.

In its various aspects, the software architecture design can be implemented as methods, systems, and apparatuses, including computer program products, for implementing a software architecture design for a software application implementing plan-driven procurement. The software application is structured as multiple process components interacting with each other through service interfaces, and multiple service operations, each being implemented for a respective process component. The process components include an Inbound Delivery Processing process component, a Site Logistics Processing process component, an Inventory Processing process component, a Material Inspection Processing process component, a Purchase Request Processing process component, a Purchase Order Processing process component, a Purchasing Contract process component, a Supplier Invoice Processing process component, a Demand Forecast Processing process component, a Supply and Demand Matching process component, an External Procurement Trigger and Response process component, and a Logistics Execution Control process component.

In its various aspects, the software architecture design can further be implemented as methods, systems, and apparatuses, including computer program products, implementing a software architecture design for a software application that is adapted to interact with external software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

DETAILED DESCRIPTION

Figure 1A:
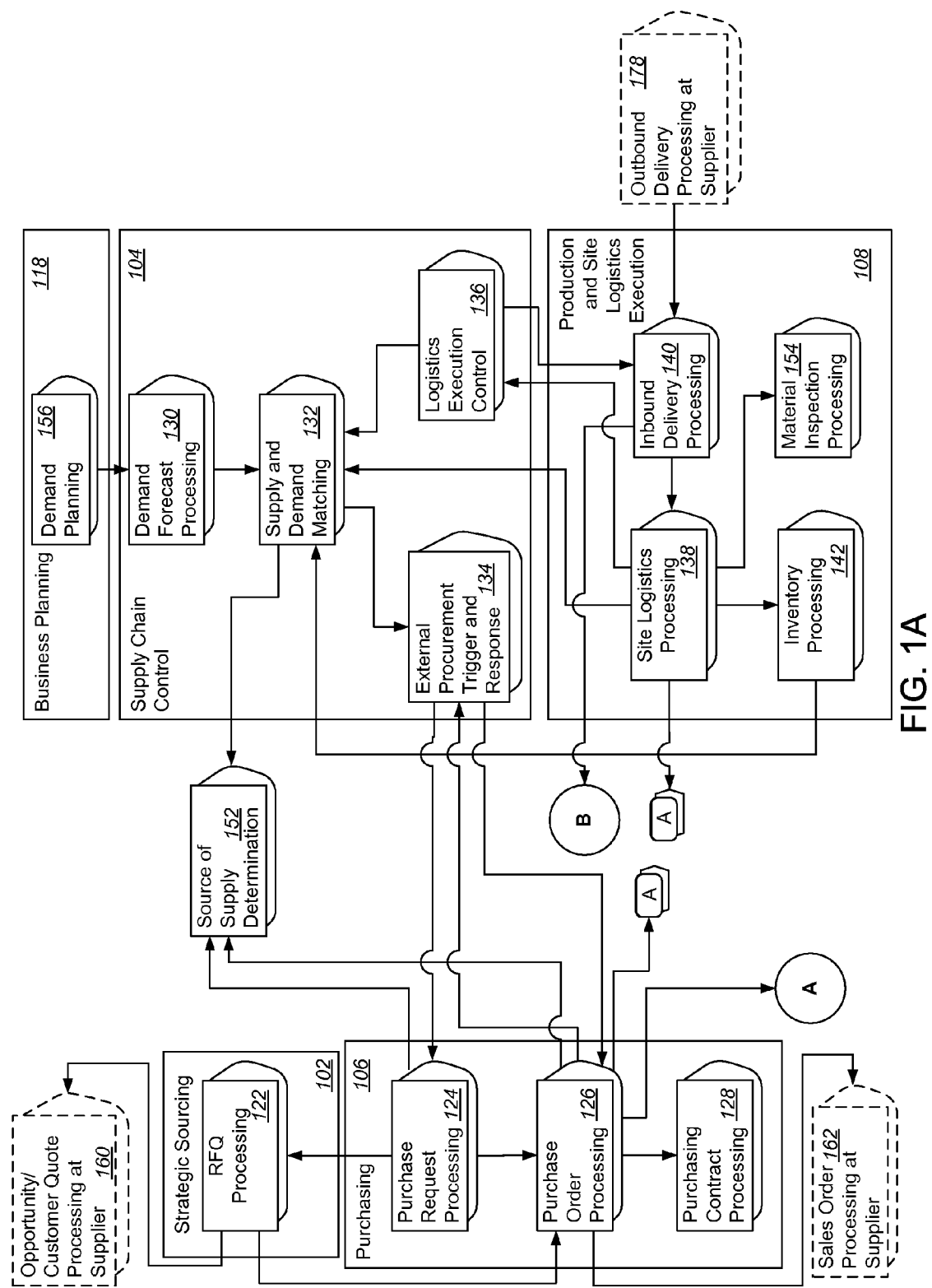
FIGS. 1A and 1B are block diagrams collectively showing a software architectural design for a plan-driven procurement software application.
Figure 1B:
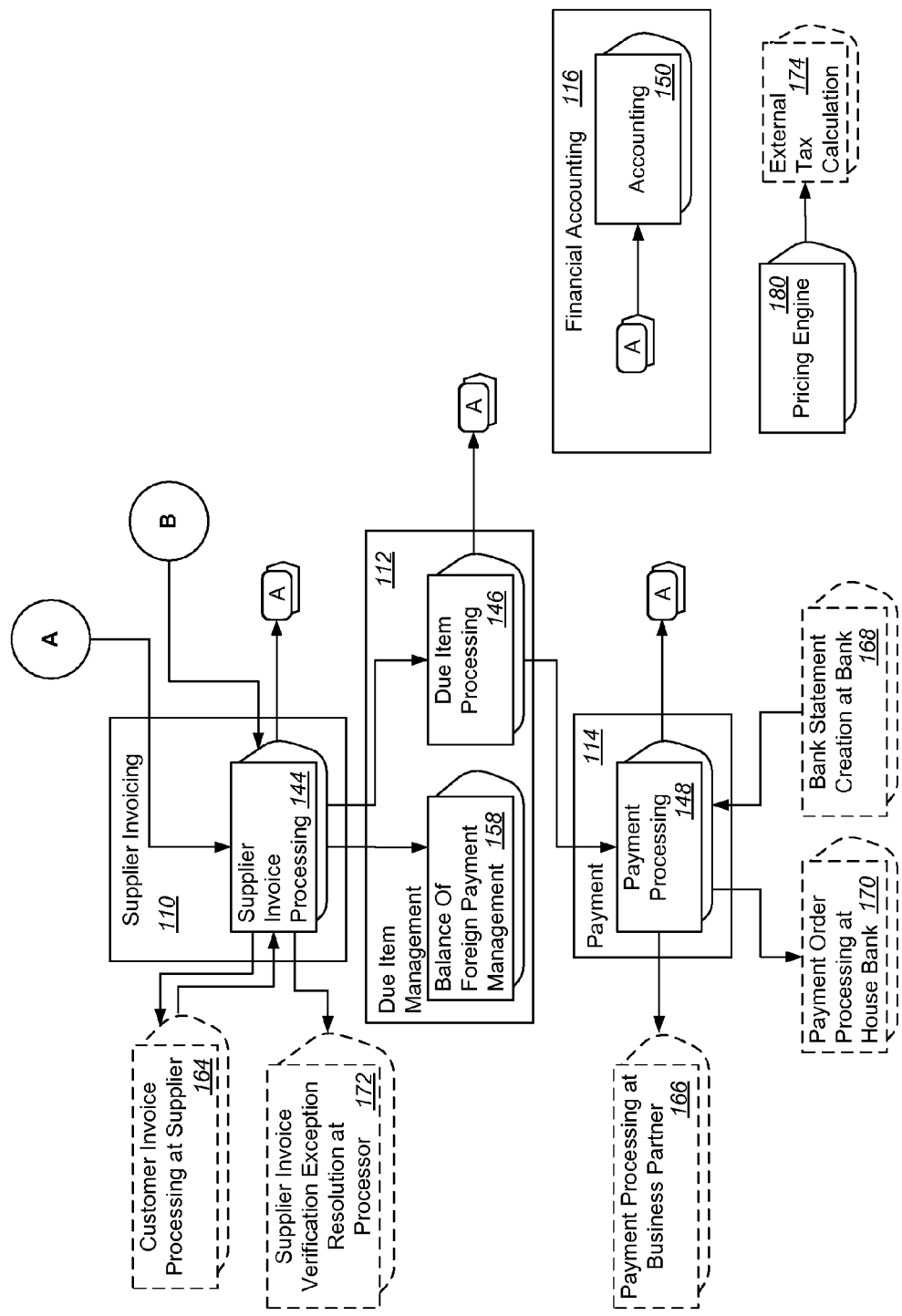

FIGS. 1A and 1B collectively show the software architectural design for a plan-driven procurement software application. The plan driven procurement application is software that implements an end-to-end process used to procure goods using purchase orders that may be driven by a planning department to increase the stock of goods. For example, the plan driven procurement application can procure goods to stock using purchase orders based on supply planning.

As shown in FIGS. 1A and 1B, the plan-driven procurement design includes a Strategic Sourcing deployment unit 102, a Supply Chain Control deployment unit 104, a Purchasing deployment unit 106, a Production and Site Logistics Execution deployment unit 108, a Supplier Invoicing deployment unit 10, a Due Item Management deployment unit 112, a Payment deployment unit 114, a Financial Accounting deployment unit 116, and a Business Planning deployment unit 118.

As shown in FIG. 1A, the Strategic Sourcing deployment unit 102 includes an RFQ Processing process component 122. The RFQ Processing process component 122 handles requests for quotes and supplier quotes for strategic as well as operational negotiation purposes. A request for quotation (RFQ) is a description of materials and services that purchasers use to request responses from potential suppliers. Requests for Quotation can be one of a number of types, including a request for price information, a request for quote that may run over a certain period of time, a request for proposal in complex purchasing situation or live auctions that may be performed over a short time frame. A quote is a response to a request for quotation in which a supplier offers to sell goods and services at a certain price.

The Supply Chain Control deployment unit 104 includes a Demand Forecast Processing process component 130, a Supply and Demand Matching process component 132, an External Procurement Trigger and Response process component 134, and a Logistics Execution Control process component 136. The Demand Forecast Processing process component 130 receives and processes demand forecasts and subsequent release of the forecasts to planned independent requirements. The Supply and Demand Matching process component 132 can manage tasks such that sufficient material receipt elements are present to cover material demand while taking available capacity into account. The External Procurement Trigger and Response process component 134 manages tasks for processing procurement planning orders and interfacing to purchasing from a supply planning perspective. The Logistics Execution Control process component 136 creates, controls, and monitors supply chain execution activities for fulfillment of an order on a macro-logistics level. For example, the Logistics Execution Control process component 136 can trigger site logistics activities and receives information about supply chain execution progress.

The Purchasing deployment unit 106 includes a Purchase Request Processing process component 124, a Purchase Order Processing process component 126, and a Purchasing Contract Processing process component 128. The Purchase Request Processing process component 124 can handle creating, changing, and processing of purchase requests to locate appropriate external sources of supply. The Purchase Order Processing process component 126 can create and maintain purchase orders and purchase order confirmations. The Purchasing Contract Processing process component 128 can create and maintain purchasing contracts.

The Production and Site logistics Execution deployment unit 108 includes a Site Logistics Processing process component 138, an Inbound Delivery processing process component 140, an Inventory Processing process component 142, and a Material Inspection Processing process component 154. The Site Logistics Processing process component 138 handles the preparation, physical execution, and confirmation of logistics processes within a site. Logistics processes, which are based on site logistics process models, include picking, packing, shipping, receiving as well as value added services. The Inbound Delivery processing process component 140 can handle and process inbound delivery requirements for received goods from a vendor. In some implementations, the Inbound Delivery processing process component 140 can combine all document based tasks for the inbound delivery process and enable communication with the originating document (fulfillment), the vendor, and invoicing. The Inventory Processing process component 142 handles inventory and records inventory changes. For example, the Inventory Processing process component 142 provides services to maintain current stock, content, and structure of logistic units and allocations. The Material Inspection Processing process component 154 can handle processing of inventory and recording of inventory changes. For example, the Material Inspection Processing process component 154 provides services to maintain current stock, content, and structure of logistic units and allocations.

The Business Planning deployment unit 118 includes at Demand Planning process component 156. The Demand Planning process component 156 can handle processing to provide accurate and measurable estimates of future demand.

As shown in FIG. 1B, the Supplier Invoicing deployment unit 110 includes a Supplier Invoice Processing, process component 144 that handles management and volume processing of supplier invoices (e.g., exception handling and approving supplier invoices).

The Due Item Management deployment unit 112 includes a Due Item Processing process component 146 and a Balance of Foreign Payment Management process component 158. The Due Item Processing process component 146 handles the collection, management, and monitoring of trade receivables or payables and corresponding sales tax or withholding tax. The Balance of Foreign Payment Management process component 158 handles collection, processing, and reporting of receivables and payables according to foreign trade regulations that are required by the central banks to create the balance of payments of a country.

The Payment deployment unit 114 includes a Payment Processing process component 148. The Payment Processing process component 148 processes and manages payments. In some implementations, the Payment Processing process component 148 can be responsible for the associated communication with financial institutions, such as banks, and provide the primary input for liquidity management.

The Financial Accounting deployment unit 116 includes an Accounting process component 150. The Accounting process component 150 represents relevant business transactions for valuation and profitability analysis.

The foundation layer, described below, includes a Source of Supply Determination process component 152 as shown in FIG. 1A, and a Pricing Engine process component 180 as shown in FIG. 1B. The Source of Supply Determination process component 152 handles the maintenance of and access to sources of supply and quota arrangements for external and internal procurement processes. The Pricing Engine process component 180 handles processing of price and tax calculation.

A number of external process components, described below, will be used to describe the architectural design. These include an Opportunity/Customer Quote Processing at Supplier 160, a Sales Order Processing at Supplier process component 162, a Customer Invoice Processing at Supplier process component 164, a Payment Processing at Business Partner process component 166, a Bank Statement Creation at Bank process component 168, a Payment Order Processing at House Bank process component 170, a Supplier Invoice Verification Exception Resolution at Processor process component 172, an External Tax Calculation process component 174, and an Outbound Delivery Processing at Supplier process component 178.

The Opportunity/Customer Quote Processing at Supplier process component 160 can handle invoicing of customers for the delivery of goods or the provision of services or processes quotes to customers offering the delivery of goods according to specific terms.

The Sales Order Processing at Supplier process component 162 processes customers' requests to seller for the delivery of goods on a specific date, for a specific quantity, and for a specific price.

The Customer Invoice Processing at Supplier process component 164 handles invoicing of customers for the delivery of goods or the provision of services.

The Payment Processing at Business Partner process component 166, the Bank Statement Creation at Bank process component 168, and the Payment Order Processing at House Bank process component 170 may interact with the Payment Processing process component 148. The Payment Processing Process component 148 may send updates to a Payment Processing at Business Partner processing component 166, which is used to handle, at business partner, payments. The Payment Processing at Business Partner process component 166 may also be responsible for the associated communication with financial institutions such as banks, aid provides the primary input for liquidity management. The Payment Processing Process component 148 also receives messages from the Bank Statement Creation at Bank process component 168. The message may include a bank statement for a bank account. The Payment Processing process component 148 sends messages to the Payment Order Processing at House Bank process component 170. The messages may include a Bank Payment Order that is a Payment Order which will be sent to a house bank. The Bank Payment Order may contain bank transfers as well direct debits.

The Supplier Invoice Verification Exception Resolution at Processor process component 172 may receive messages from the Supplier Invoice Processing process component 144.

Figure 2:
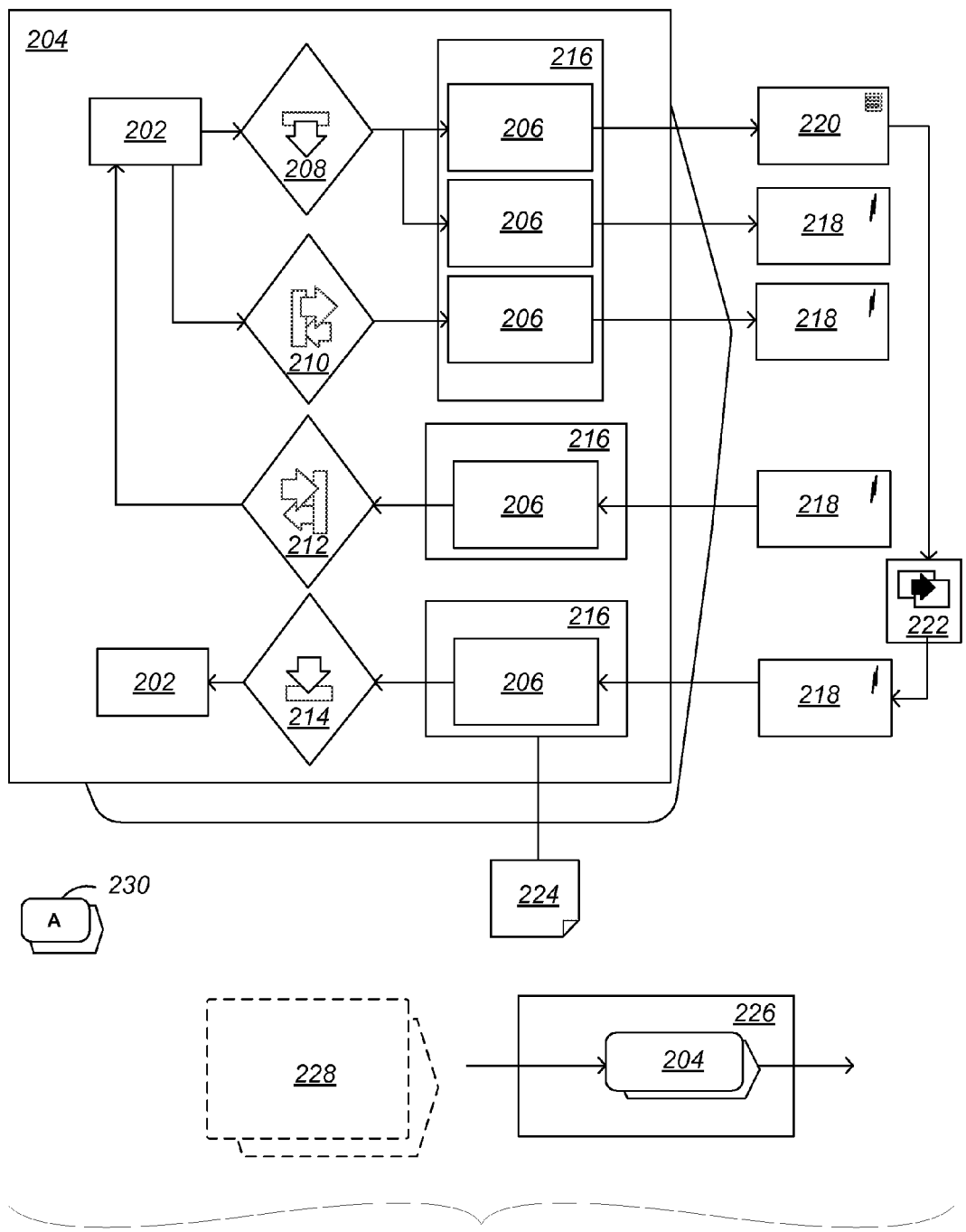
FIG. 2 illustrates the elements of the architecture as they are drawn in the figures.

FIG. 2 illustrates the elements of the architecture as they are drawn in the figures of this patent application. The elements of the architecture include the business object 202, the process component 204, the operation 206, the outbound process agent 208, the synchronous outbound process agent 210, the synchronous inbound process agent 212, the inbound process agent 214, the service interface or interface 216, the message 218, the form message 220, the mapping entity 222, the communication channel template 224, and the deployment unit 226.

Not explicitly represented in the figures is a foundation layer that contains all fundamental entities that are used in multiple deployment units 226. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

A process component of an external system is drawn as a dashed-line process component 228. Such a process component 228 represents the external system in describing interactions with the external system; however, the process component 228 need not represent more of the external system than is needed to produce and receive messages as required by the process component that interacts with the external system.

The connector icon 230 is used to simplify the drawing of interactions between process components 204. Interactions between process component pairs 204 involving their respective business objects 202, process agents (at 208, 210, 212, and 214), operations 206, interfaces 216, and messages (at 218 and 222) are described as process component interactions, which determine the interactions of a pair of process components across a deployment unit boundary, i.e., from one deployment unit 226 to another deployment unit 226. Interactions between process components 204 are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components 204, but interfaces 216, process agents (at 208, 210, 212, and 214), and business objects 202 that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component 204 is described as being contained in a deployment unit 226. It should be understood, however, that such operational inclusion can be realized in a variety of ways and is not limited to a physical inclusion of the entirety of one element in another.

The architectural elements include the business object 202. A business object 202 is a representation of a type of a uniquely identifiable business entity (an object instance) described by a structural model. Processes operate on business objects. This example business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component 204, is an object that encapsulates transactional data (i.e., data that is valid for a point in time). The term business object will be used generically to refer to a business process object and a master data object, unless the context requires otherwise. Properly implemented, business objects 202 are implemented free of redundancies.

The architectural elements also include the process component 204. A process component 204 is a software package that realizes a business process and generally exposes its functionality as services. The functionality includes the ability to perform all or parts of particular kinds of business transactions. A process component 204 contains one or more semantically related business objects 202. Any business object belongs to no more than one process component. Process components can be categorized as a standard process component, a process component at a business partner, a third party process component, or a user centric process component. The standard process component (named simply process component) is a software package that realizes a business process and exposes its functionality as services. The process component at a business partner is a placeholder for a process component (or other technology that performs the essential functions of the process component) used at a business partner. The third party process component is a process component (or other technology that performs the essential functions of the process component) provided by a third party. The user centric process component is a process component containing user interface parts.

Process components 204 are modular and context-independent. That they are context-independent means that a process component 204 is not specific to any specific application and is reusable. The process component 204 is often the smallest (most granular) element of reuse in the architecture.

The architectural elements also include the operation 206. An operation 206 belongs to exactly one process component 204. A process component 204 generally is able to perform multiple operations 206. Operations 206 can be synchronous or asynchronous, corresponding to synchronous or asynchronous process agents (e.g. at 208, 210, 212, and 214), which will be described below. Operation 206 may be the smallest, separately-callable function, described by a set of data types used its input, output, and fault parameters serving as a signature.

The architectural elements also include the service interface 216, referred to simply as the interface. An interface 216 is a named group of operations 206. Interface 216 typically specifies inbound service interface functionality or outbound service interface functionality. Each operation 206 belongs to exactly one interface 216. An interface 216 belongs to exactly one process component 204. A process component 204 might contain multiple interfaces 216. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations 206 directed to the same other process component 204 are in one interface 216.

The architectural elements also include the message 218. Operations 206 transmit and receive messages 218. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component. In some implementations, the message is a form based message 220 that can be translated into a recognized format for an external process component 228. The form message type 220 is a message type used for documents structured in forms. The form message type 220 can be used for printing, faxing, emailing, or other events using documents structured in forms. In some implementations, the form message type 220 provides an extended signature relative to the normal message type. For example, the form message type 220 can include text information in addition to identification information to improve human reading.

The architectural elements also include the process agent (e.g. at 208, 210, 212, and 214). Process agents do business processing that involves the sending or receiving of messages 218. Each operation 206 will generally have at least one associated process agent. The process agent can be associated with one or more operations 206. Process agents (at 208, 210, 212, and 214) can be either inbound or outbound, and either synchronous or asynchronous.

Asynchronous outbound process agents 208 are called alter a business object 202 changes, e.g., after a create, update, or delete of a business object instance. Synchronous outbound process agents 210 are generally triggered directly by a business object 202.

An outbound process agent (208 and 210) will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents (212 and 214) are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent call act on multiple business objects in a process component.

Synchronous agents (210 and 212) are used when a process component requires a more or less immediate response from another process component, and is waiting for that response to continue its work.

Operations and process components are described in this specification in terms of process agents. However, in alternative implementations, process components and operations can be implemented without use of agents by using other conventional techniques to perform the functions described in this specification.

The architectural elements also include the communication channel template. The communication channel template is a modeling entity that represents a set of technical settings used for communication. The technical settings can include details for inbound or outbound processing of a message. The details can be defined in the communication channel template. In particular, the communication channel template defines an adapter type, a transport protocol, and a message protocol. In some implementations, various other parameters may be defined based on a selected adapter type. For example, the communication channel template can define a security level, conversion parameters, default exchange infrastructure parameters, processing parameters, download URI parameters, and specific message properties.

The communication channel template 224 can interact with internal or external process components (at 204 and 228). To interact with an internal process component, the communication channel template is received and uploaded to be used with an operation and interface pair. To interact with an external process component, the communication channel template is received and uploaded to be used with an external entity, such as an external bank, business partner, or supplier.

The architectural elements also include the deployment unit 226. A deployment unit 226 includes one or more process components 204 that are deployed together on a single computer system platform. Conversely, separate deployment units can be deployed on separate physical computing systems. For this reason, a boundary of a deployment unit 226 defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components 204 of one instance of one deployment unit 226.

The process components 204 of one deployment unit 226 interact with those of another deployment unit 226 using messages 218 passed through one or more data communication networks or other suitable communication channels.

Thus, a deployment unit 226 deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units 226 is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components 204 that interact with other process components 204 or external systems only through messages 218, e.g., as sent and received by operations 206, can also be replaced as long as the replacement supports the operations 206 of the original 204.

In contrast to a deployment unit 226, the foundation layer does not define a limit for application-defined transactions. Deployment units 226 communicate directly with entities in the foundation layer, which communication is typically not message based. The foundation layer is active in every system instance on which the application is deployed. Business objects 202 in the foundation layer will generally be master data objects. In addition, the foundation layer will include some business process objects that are used by multiple deployment units 226. Master data objects and business process objects that should be specific to a deployment unit 226 are assigned to their respective deployment unit 226.

Interactions Between Process Components "Purchase Request Processing" and "RFQ Processing"

Figure 3:
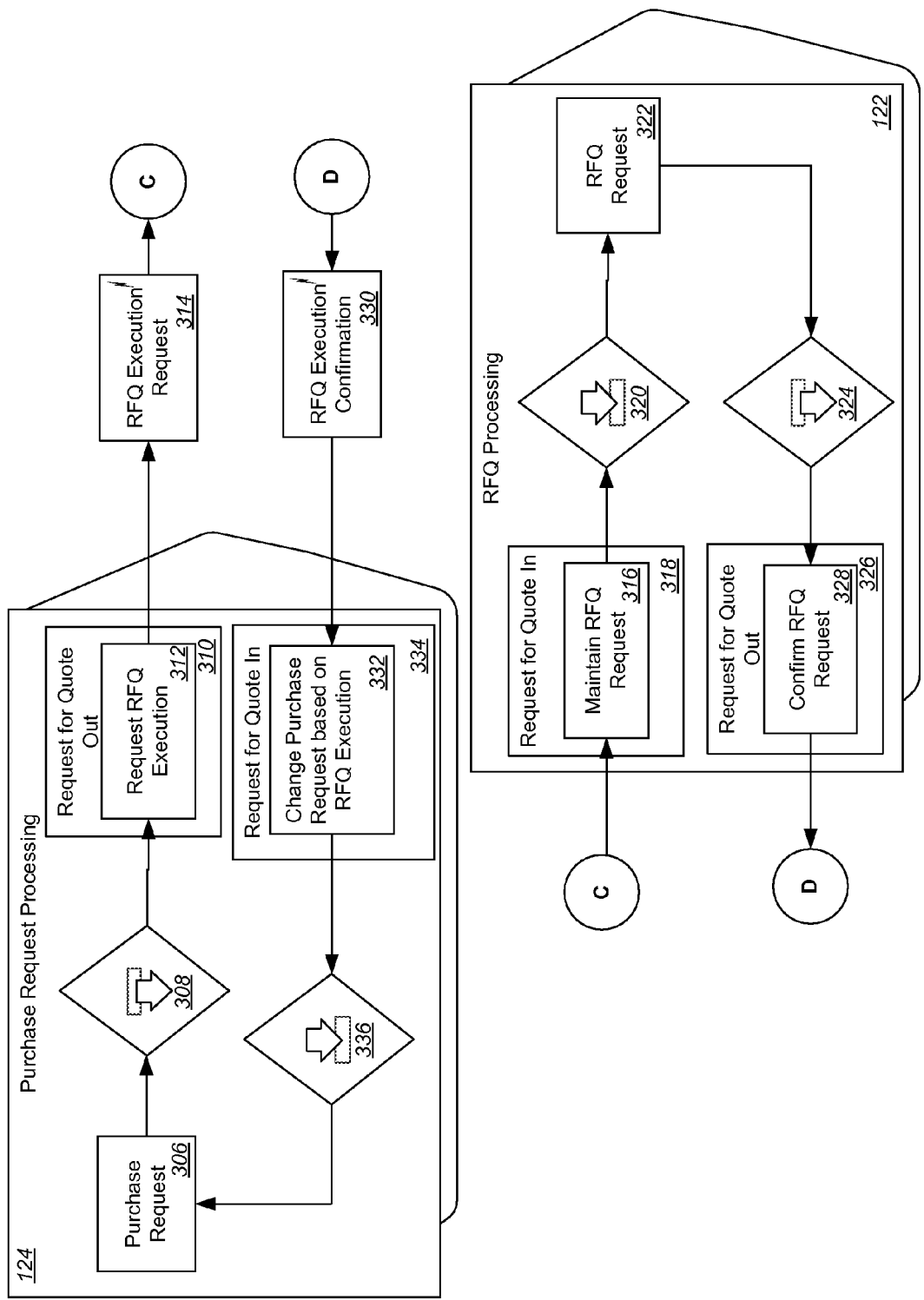
FIG. 3 is a block diagram showing interactions between a Purchase Request Processing process component and an RFQ Processing process component.

FIG. 3 is a block diagram showing interactions between the Purchase Request Processing process component 124 and the RFQ Processing process component 122 in the architectural design of FIGS. 1A and 1B. The interaction requests the creation of a request for quote in the RFQ Processing process component 122 to find sources of supply for a purchase request.

As shown in FIG. 3, the Purchase Request Processing process component 124 includes a Purchase Request business object 306. The Purchase Request business object 306 represents a request or instruction to the purchasing department to purchase specified goods or services in a specified quantity at a specified price within a specified time. The Purchase Request business object 306 uses a Request RFQ Execution from Purchase Request to RFQ Processing outbound process agent 308 to start execution of Request for Quote Processing process component 122. The outbound process agent 308 invokes a Request RFQ Execution operation 312. The Request RFQ Execution operation 312 is included in a Request for Quote Out interface 310. The Request RFQ Execution operation 312 requests for the execution of a request for quote. The Request RFQ Execution operation 312 generates an RFQ Execution Request message 314.

A Maintain RFQ Request operation 316 receives the RFQ Execution Request message 314. The operation 316 is included in a Request for Quote In interface 318. The operation 316 creates an RFQ request from business documents that are involved in at bidding process or in a negotiation process. The Maintain RFQ Request operation 316 uses a Maintain RFQ Request inbound process agent 320 to create or update an RFQ Request business object 322. The RFQ Request business object 322 represents a request to the purchasing department to prepare a request for quote.

The RFQ Request business object 322 uses a Confirm RFQ Request outbound process agent 324 to invoke a Confirm RFQ Request operation 328. The operation 328 is included in a Request for Quote Out interface 326. The operation 328 confirms the RFQ execution. The Confirm RFQ Request operation 328 sends an RFQ Execution Confirmation message 330 to the Purchase Request process component 124 to confine RFQ execution. A Change Purchase Request based on RFQ Execution operation 332 receives the message 330. The operation 332 is included in a Request for Quote In interface 334. The operation 332 changes purchase requests based on RFQ execution. The Change Purchase Request based on RFQ Execution operation 332 uses a Change Purchase Request based on RFQ Execution inbound process agent 336 to update the references of the purchase request in the Purchase Request business object 306.

Interactions Between Process Components "Due Item Processing" and "Payment Processing"

Figure 4A:
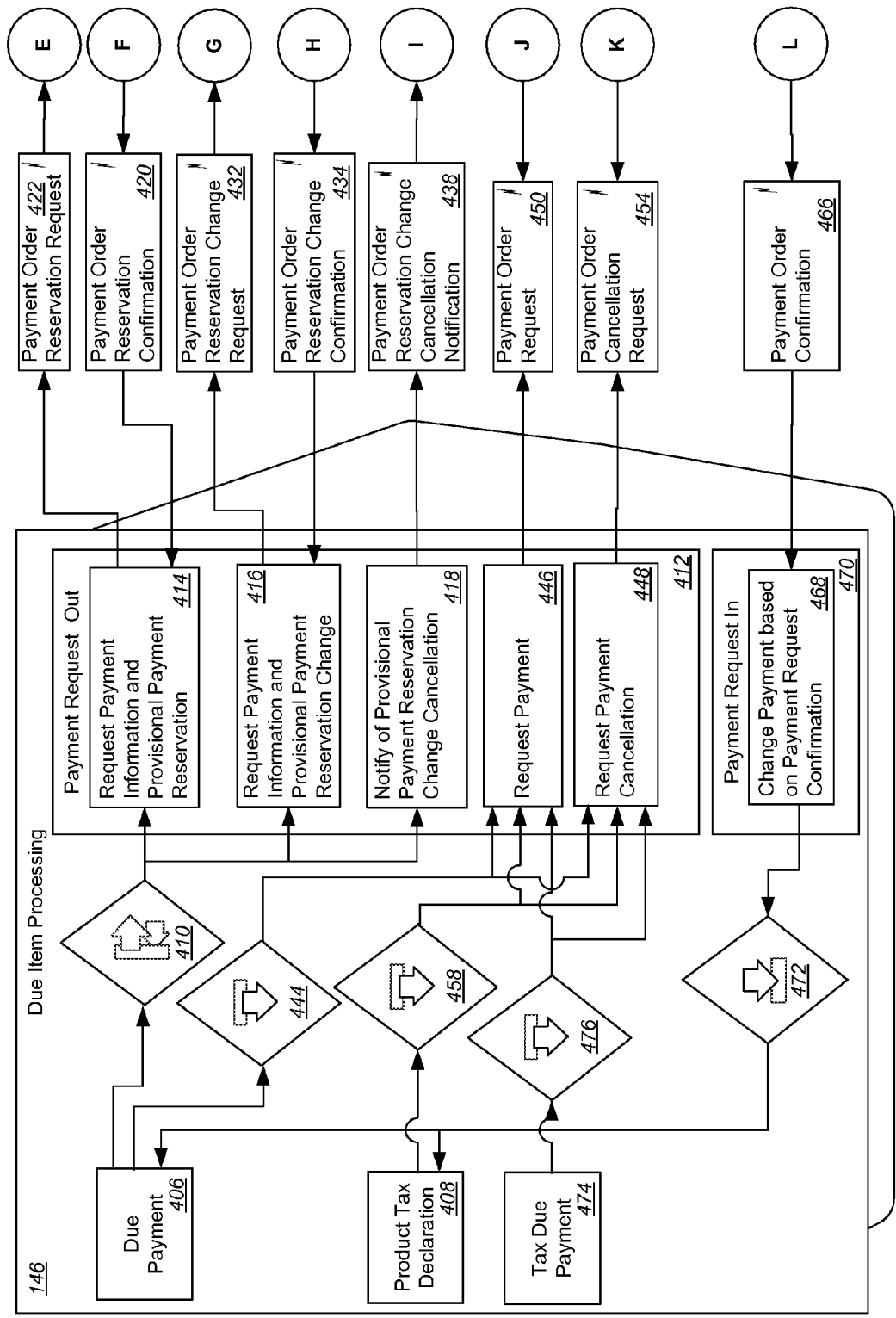
FIGS. 4A and 4B are block diagrams collectively showing interactions between a Due Item Processing process component and a Payment Processing process component.
Figure 4B:
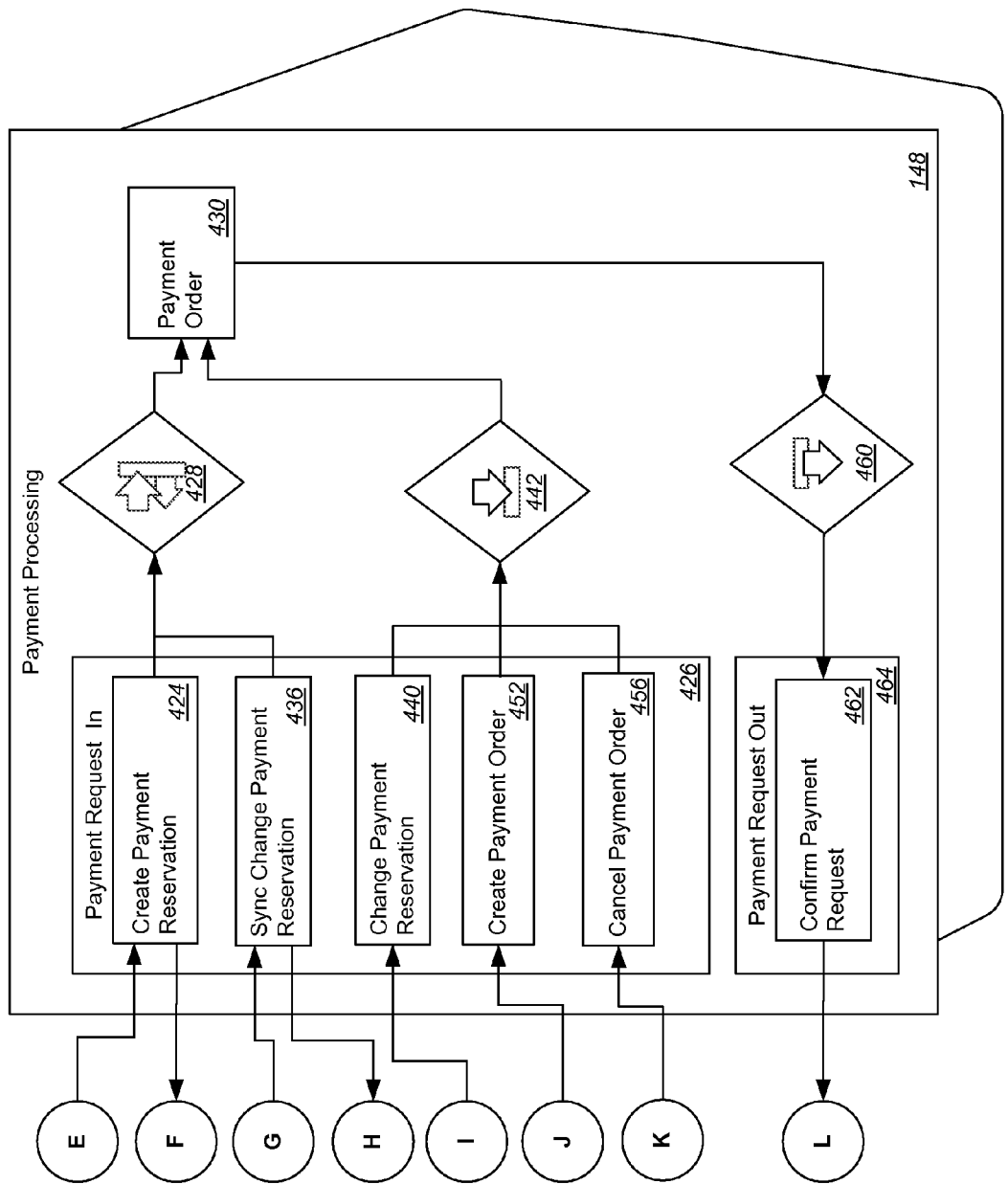

FIGS. 4A and 4B are block diagrams collectively showing interactions between the Due Item Processing process component 146 and the Payment Processing process component 148 in the architectural design of FIGS. 1A and 1B. The interaction starts when a payment for trade or tax receivables or payables is initiated or cancelled. The Due Item Processing process component 146 requests the creation or cancellation of a payment order from the Payment Processing process component 148. The Payment Processing process component 148 confirms the payment execution to the requestor. Additionally, the interaction allows the Due Item Processing process component 146 to request a reservation or change a previously made reservation of cash from the Payment Processing process component 148 within the creation process. The Payment Processing process component 148 confirms the creation or the change of a reservation immediately.

As shown in FIG. 4A, the Due Item Processing process component includes a Due Payment business object 406, a Product Tax Declaration business object 408, and a Tax Due Payment business object 474. The Due Payment business object 406 represents a payment request or payment confirmation with regard to trade receivables and payables. The Product Tax Declaration business object 408 represents a declaration of the product tax payables and receivables of a company to the responsible tax authority according to the tax declaration arrangement and country specific legal requirements that triggers the payment to the tax authority. The Tax Due Payment business object 474 represents a payment request or payment confirmation with regard to tax payables and receivables.

The Due Payment business object 406 uses a Synchronous Request Payment Reservation from Due Payment to Payment Processing outbound process agent 410 to invoke one or more operations including a Request Payment Information and Provisional Payment Reservation operation 414, a Request Payment Information and Provisional Payment Reservation Change operation 416, and a Notify of Provisional Payment Reservation Change Cancellation operation 418. The operations 414, 416, and 418 are included in a Payment Request Out interface 412. The Request Payment Information and Provisional Payment Reservation operation 414 can request payment information with a provisional reservation or money in payment processing. The Request Payment Information and Provisional Payment Reservation Change operation 416 can request payment information with a change of provisional reservation of money in payment processing. The Notify of Provisional Payment Reservation Cancellation operation 418 can register a change of a provisional payment to the last transactional or saved state.

If the Request Payment Information and Provisional Payment Reservation operation 414 is invoked, the operation 414 generates a Payment Order Reservation Request message 422. If the Request Payment Information and Provisional Payment Reservation Change operation 416 is invoked, the operation 416 generates a Payment Order Reservation Change Request message 432. If the Notify of Provisional Payment Reservation Change Cancellation operation 418 is invoked, the operation 418 generates a Payment Order Reservation Change Cancellation Notification message 438.

The Due Payment business object 406 also uses a Request Payment front Due Payment to Payment Processing outbound process agent 444 to invoke a Request Payment operation 446 or a Request Payment Cancellation operation 448. The operations 444 and 446 are included in the Payment Request Out interface 412. The Request Payment operation 446 sends a request for payment to the Payment Processing process component 148. This confirms a previously made provisional payment. The Request Payment Cancellation operation 448 cancels at least one provisional, requested, or ordered payment. If the Request Payment operation 446 is invoked, a Payment Order Request message 450 is generated. If the Request Payment Cancellation operation 448 is invoked, the operation 448 generates a Payment Order Cancellation Request message 454.

The Product Tax Declaration business object 408 uses a Request Payment from Product Tax Declaration to Payment Processing outbound process agent 458 to invoke the Request Payment operation 446 or the Request Payment Cancellation operation 448. If the Request Payment operation 446 is invoked, a Payment Order Request message 450 is generated. If the Request Payment Cancellation operation 448 is invoked, the operation 448 generates a Payment Order Cancellation Request message 454.

The Tax Due Payment business object 474 uses a Request Payment from Tax Due Payment to Payment Processing outbound process agent 476 to invoke the Request Payment operation 446 or the Request Payment Cancellation operation 448. If the Request Payment operation 446 is invoked, a Payment Order Request message 450 is generated. If the Request Payment Cancellation operation 448 is invoked, the operation 448 generates a Payment Order Cancellation Request message 454.

As shown in FIG. 4B, a Create Payment Reservation operation 424 receives the Payment Order Reservation Request message 422. The operation 424 uses a synchronous Request Payment Reservation from Due Payment to Payment Processing inbound process agent 428 to create, change, or cancel a payment order for a reservation request. The synchronous inbound process agent 428 updates the Payment Order business object 430. The Payment Order business object 430 represents an order within a company to make a payment to a business partner at a specified time. A payment order can be a collective order that includes several individual orders.

A synchronous Change Payment Reservation operation 436 receives a Payment Order Reservation Change Request message 432. The operation 436 uses the synchronous Request Payment Reservation from Due Payment to Payment Processing inbound process agent 428 to update the Payment Order business object 430. The synchronous Change Payment Reservation operation 436 changes a reservation of payment and confirms the change to the caller.

A Change Payment Reservation operation 440 receives the Payment Order Reservation Change Cancellation Notification message 438. A Create Payment Order operation 452 receives the Payment Order Request message 450. A Cancel Payment Order operation 456 receives the Payment Order Cancellation Request message 454. The operations 440, 452, and 456 use a Maintain Payment Order inbound process agent 442 to update the Payment Order business object 430. The Cancel Payment Order operation 456 cancels a previously sent payment request by reference. The Create Payment Order operation 452 creates a request for payment. The Change Payment Reservation operation 440 changes a reservation of payment without confirmation to the caller. The operations 424, 436, 440, 452, and 456 are included in a Payment Request In interface 426.

The Payment Order business object 430 uses a Confirm Payment Request from Payment Order to Due Item Processing outbound process agent 460 to invoke a Confirm Payment Request operation 462. The operation 462 confirms the execution of a payment in response to a payment request sent to the Payment Processing process component 148. The operation 462 is included in a Payment Request Out interface 464. The Confirm Payment Request operation 462 generates a Payment Order Confirmation message 466.

As shown in FIG. 4A, the Payment Order Confirmation message 466 is received in a Change Payment based on Payment Request Confirmation operation 468. The operation 468 confirms the execution of a payment request or a payment request cancellation. The operation 468 is included in a Payment Request In interface 470. The Change Payment based on Payment Request Confirmation operation 468 uses a Change Payment based on Payment Request Confirmation inbound process agent 472 to update the Due Payment business object 406.

The Create Payment Reservation 424 operation (shown in FIG. 4B) sends a Payment Order Reservation Confirmation message 420 to the Due Item Processing process component 130 (shown in FIG. 4A). The message 420 is a confirmation response received in the Request Payment Information and Provisional Payment Reservation operation 414.

The Synchronous Change Payment Reservation operation 436 (shown in FIG. 4B) sends a Payment Order Reservation Change Confirmation message 434 to the Due Item Processing process component 130 (shown in FIG. 4A). The message 434 is a confirmation response received in the Request Payment Information and Provisional Payment Reservation Change operation 416.

Interactions Between Process Components "Purchase Order Processing" and "Accounting"

Figure 5:
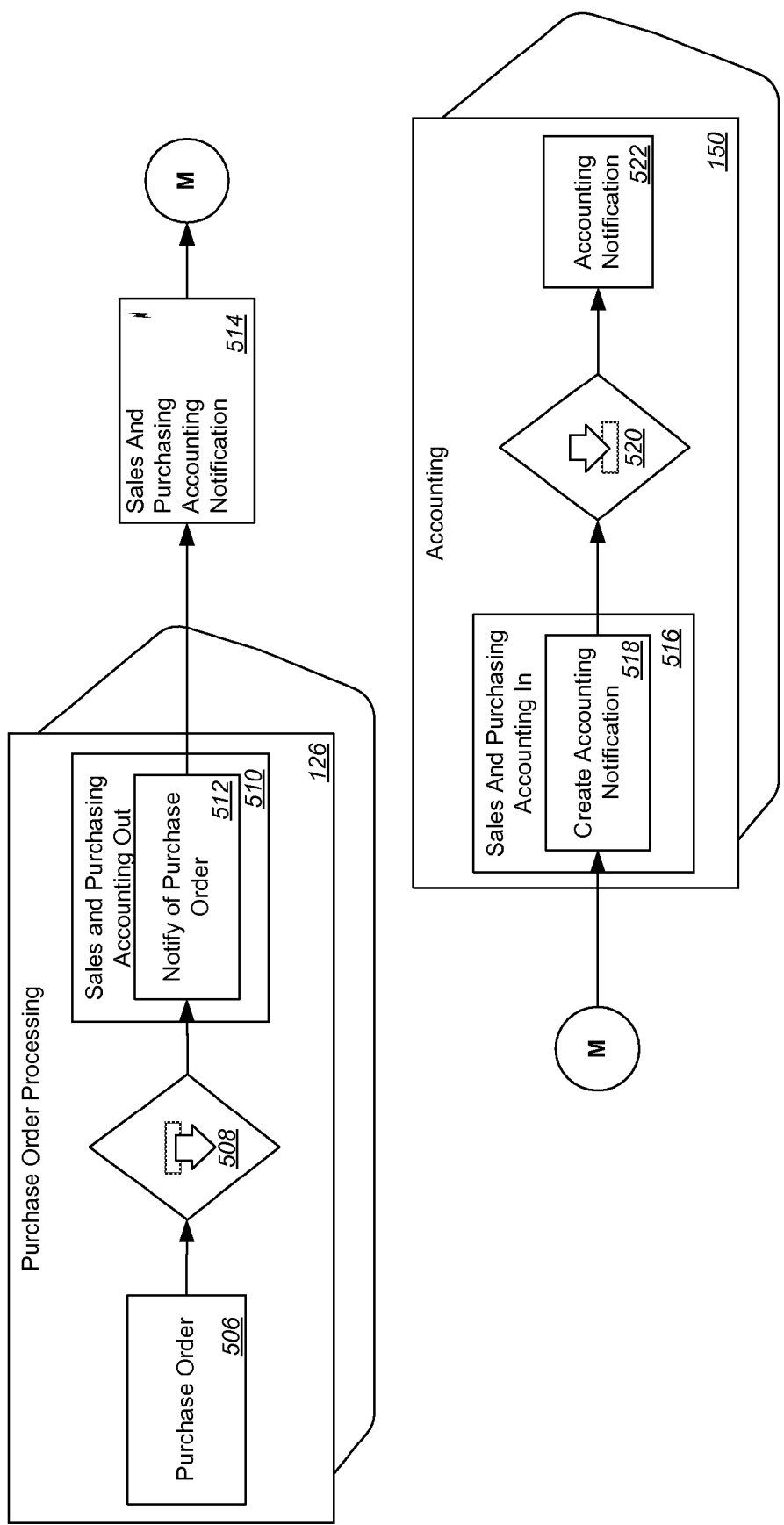
FIG. 5 is a block diagram showing interactions between a Purchase Order Processing process component and an Accounting process component.

FIG. 5 is a block diagram showing interactions between the Purchase Order Processing process component 126 and the Accounting process component 150 in the architectural design of FIGS. 1A and 1B. The interaction starts when a purchase order is created or updated. For example, the Purchase Order Processing process component 126 requests the creation or update of a subledger account (based on purchasing) from the Accounting process component 150.

As shown in FIG. 5, the Purchase Order Processing process component 126 includes a Purchase Order business object 506. The Purchase Order business object 506 represents a request from a buyer to a seller to deliver a specified quantity of material or perform a specified service, at a specified price within a specified time.

The Purchase Order business object 506 uses a Notify of Purchase Order to Accounting outbound process agent 508 to inform Accounting Processing about the creation, modification, or cancellation of a purchase order. The outbound process agent 508 invokes a Notify of Purchase Order operation 512. The Notify of Purchase Order operation 512 is included in a Sales and Purchasing Accounting Out interface 510. The operation 512 generates a Sales and Purchasing Accounting Notification message 514 to notify the Accounting process component 150 about the created, changed, or cancelled Purchase Order business object 506.

A Create Accounting Notification operation 518 of the Accounting process component 150 receives the Sales and Purchasing Accounting Notification message 514. The operation 518 is included in a Sales and Purchasing Accounting In interface 516. The Create Accounting Notification operation 518 receives an Order Accounting Notification from a Service Confirmation Processing process component, a Service Contract Processing process component, a Service Request Processing process component, a Service Order Processing process component, a Sales Order Processing process component, and the Purchase Order Processing process component. The notification is to inform Accounting Processing about creation, change or deletion of any kind of order business objects. The operation 518 updates an Accounting Notification business object 522 using a Maintain Subledger Account based on Sales and Purchasing inbound process agent 520. In some implementations, the Accounting Notification business object 522 represents a notification sent to Financial Accounting by an operational component regarding, a business transaction. For example, the business object 522 can represent the operational business transaction in a standardized form for business transaction documents and contains the data needed to valuate the business transaction.

Interactions Between Process Components "Logistics Execution Control" and "Inbound Delivery Processing"

Figure 6:
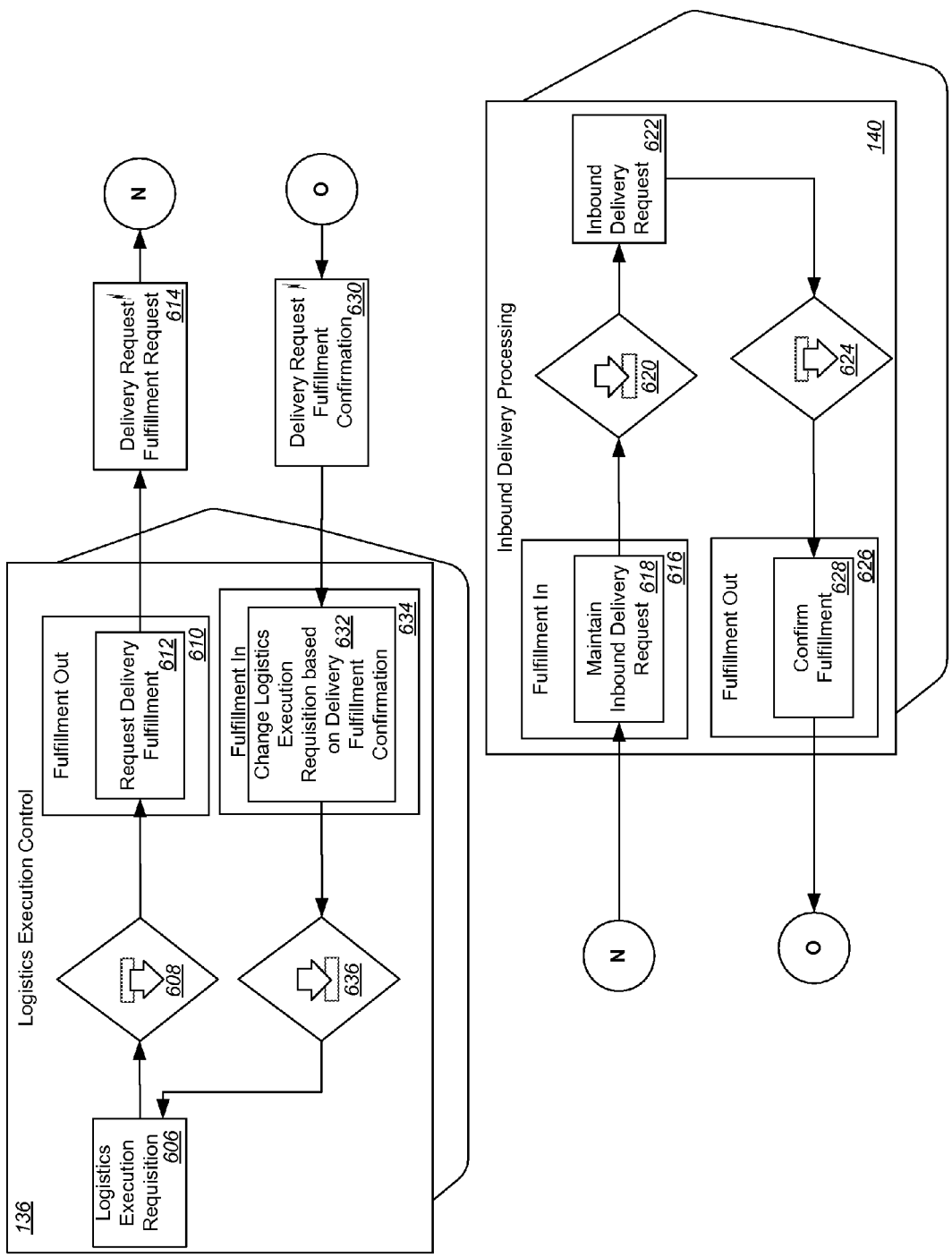
FIG. 6 is a block diagram showing interactions between a Logistics Execution Control process component and an Inbound Delivery Processing process component.

FIG. 6 is a block diagram showing interactions between the Logistics Execution Control process component 136 and the Inbound Delivery Processing process component 140 in the architectural design of FIGS. 1A and 1B. The interaction can include requesting the creation or update of an inbound delivery request(s) from the Inbound Delivery Processing process component 140 when a logistics execution requisition is released, and confirming the delivery fulfillment by the Inbound Delivery Processing process component 140 to Logistics Execution Control process component 136.

As shown in FIG. 6, the Logistics Execution Control process component 136 includes a Logistics Execution Requisition business object 606. The Logistics Execution Requisition business object 606 represents a requisition to Logistics to control, trigger, and/or monitor the execution of a logistic process on a macro-logistics level to fulfill an order. The business object 606 uses a Request Fulfillment from Logistics Execution Request to Inbound Delivery Processing outbound process agent 608 to request fulfillment of an inbound delivery from the Inbound Delivery Processing process component 140. The outbound process agent 608 invokes a Request Delivery Fulfillment operation 612. The operation 612 is included in a fulfillment Out interface 610. The Request Delivery Fulfillment operation 612 can create or update an inbound or outbound delivery request. The Request Delivery Fulfillment operation 612 generates a Delivery Request Fulfillment Request message 614.

A Maintain Inbound Delivery Request operation 618 receives the Delivery Request Fulfillment Request message 614. The operation 618 is included in a Fulfillment In interface 616. The operation 618 receives delivery fulfillment request from the Logistics Execution Control process component 136. The operation 618 can update, using a Maintain Inbound Delivery Request inbound process agent 620, an Inbound Delivery Request business object 622. The Inbound Delivery Request business object 622 represents a request to a product recipient to receive a composition of goods.

The Inbound Delivery Request business object 622 uses a Confirm Fulfillment of Inbound Delivery Request to Logistics Execution Control outbound process agent 624 to invoke a Confirm Fulfillment operation 628. The operation 628 is included in a Fulfillment Out interface 626. The Confirm Fulfillment operation 628 sends delivery fulfillment confirmation to the Logistics Execution Control process component 136. The Confirm Fulfillment operation 628 sends a Delivery Request Fulfillment Confirmation message 630 to the Logistics Execution Control process component 136.

A Change logistics Execution Requisition based on the Delivery Fulfillment Confirmation operation 632 receives the message 630. The operation 632 is included in a Fulfillment In interface 634. The operation can update the Logistics Execution Control process component 136 with fulfillment confirmation data received from an inbound or outbound delivery request. The Change Logistics Execution Requisition based on the Delivery Fulfillment Confirmation operation 632 uses a Change Logistics Execution Requisition based on Delivery Fulfillment Confirmation inbound process agent 636 to update the Logistics Execution Requisition business object 606.

Interactions Between Process Components "Payment Processing" and "Payment Processing at Business Partner"

Figure 7:
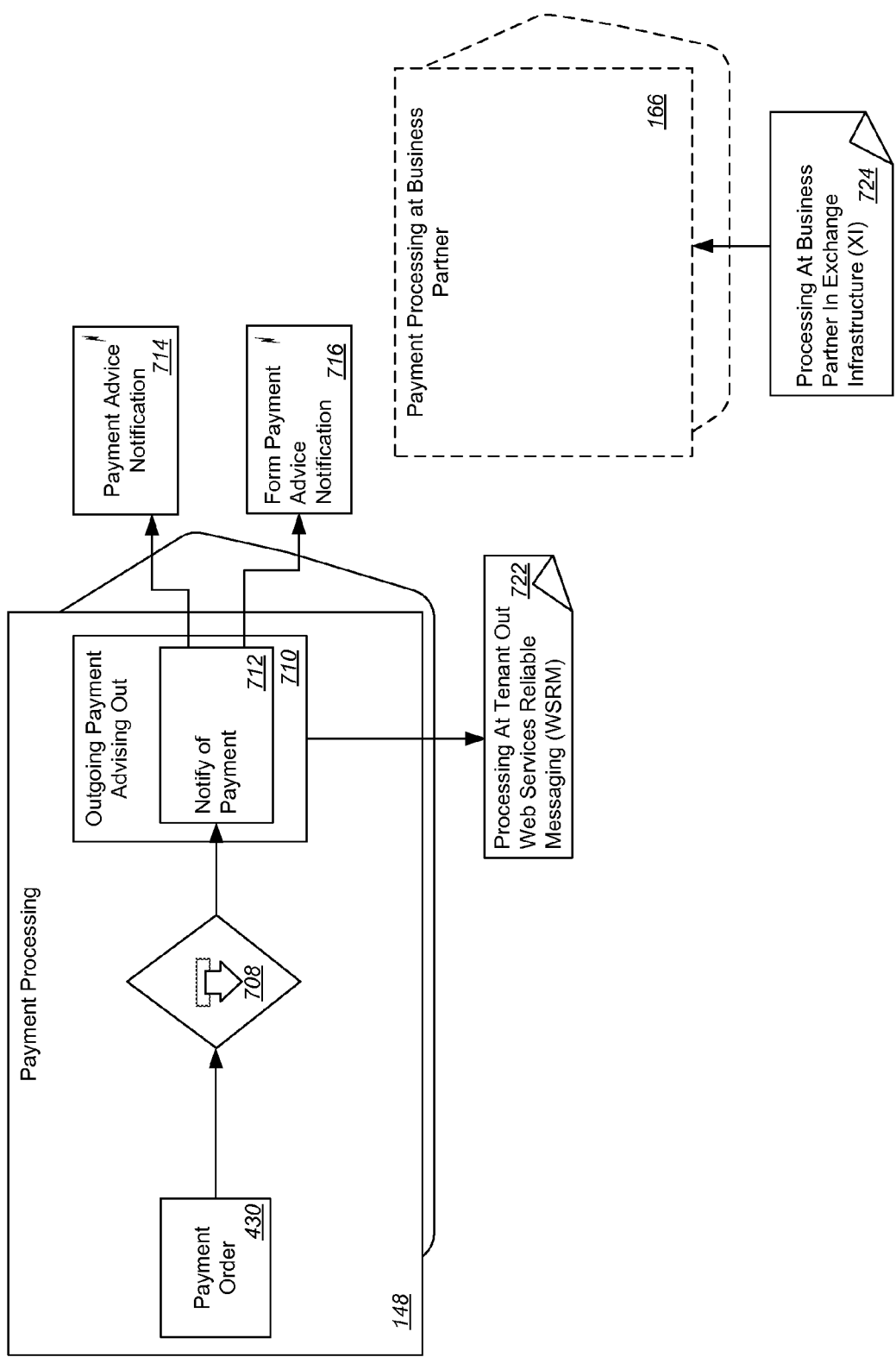
FIG. 7 is a block diagram showing interactions between a Payment Processing process component and a Payment Processing at a Business Partner processing component.

FIG. 7 is a block diagram showing interactions between the Payment Processing process component 148 and the Payment Processing at a Business Partner process component 166 in the architectural design of FIGS. 1A and 1B. The interaction starts with the creation of a payment advice from a payment order within the Payment Processing process component 148. For example, the Payment Processing process component 148 notifies the Payment Processing at the Business Partner process component 166 about payments in transfer.

As shown in FIG. 7, the Payment Processing process component 148 includes the Payment Order business object 430. The Payment Order business object 430 represents an order within a company to make a payment to a business partner at a specified time. The Payment Order business object 430 can be a collective instruction that includes several separate instructions.

The Payment Order business object 430 uses a Notify of Payment from Payment Order to Business Partner outbound process agent 708 to create a payment advice to the business partner. The outbound process agent 708 invokes a Notify of Payment operation 712 to send data that can allow the assignment of payments to receivables or payables at the business partner. The Notify of Payment operation 712 is included in an Outgoing Payment Advising Out interface 710. The Payment Processing process component 148 sends information to the Payment Processing at Business Partner process component 166 using a Processing at Tenant Out communication channel template 722. The Outgoing Payment Advising Out 710 sends information to the Payment Processing at Business Partner process component 166 using the Processing at Tenant Out communication channel template 722. The communication channel template 722 can define protocols and parameters used for communication with an external party.

The Notify of Payment operation 712 sends a Payment Advice Notification message 714 and/or a Form Payment Advice Notification message 716 to the Payment Processing at Business Partner process component 166. The Payment Processing at Business Partner process component 166 receives information from the Payment Processing process component 148 using a Processing At Business Partner In Exchange Infrastructure (XI) communication channel template 724. The Processing At Business Partner In XI communication channel template 724 can define protocols and parameters used for communication with an external party. While XI represents Exchange Infrastructure, any similar or suitable third-party or proprietary toll may be used to perform the functions provided by or describe in relation to XI.

Interactions Between Process Components "Purchase Order Processing" and "Supplier Invoice Processing"

Figure 8:
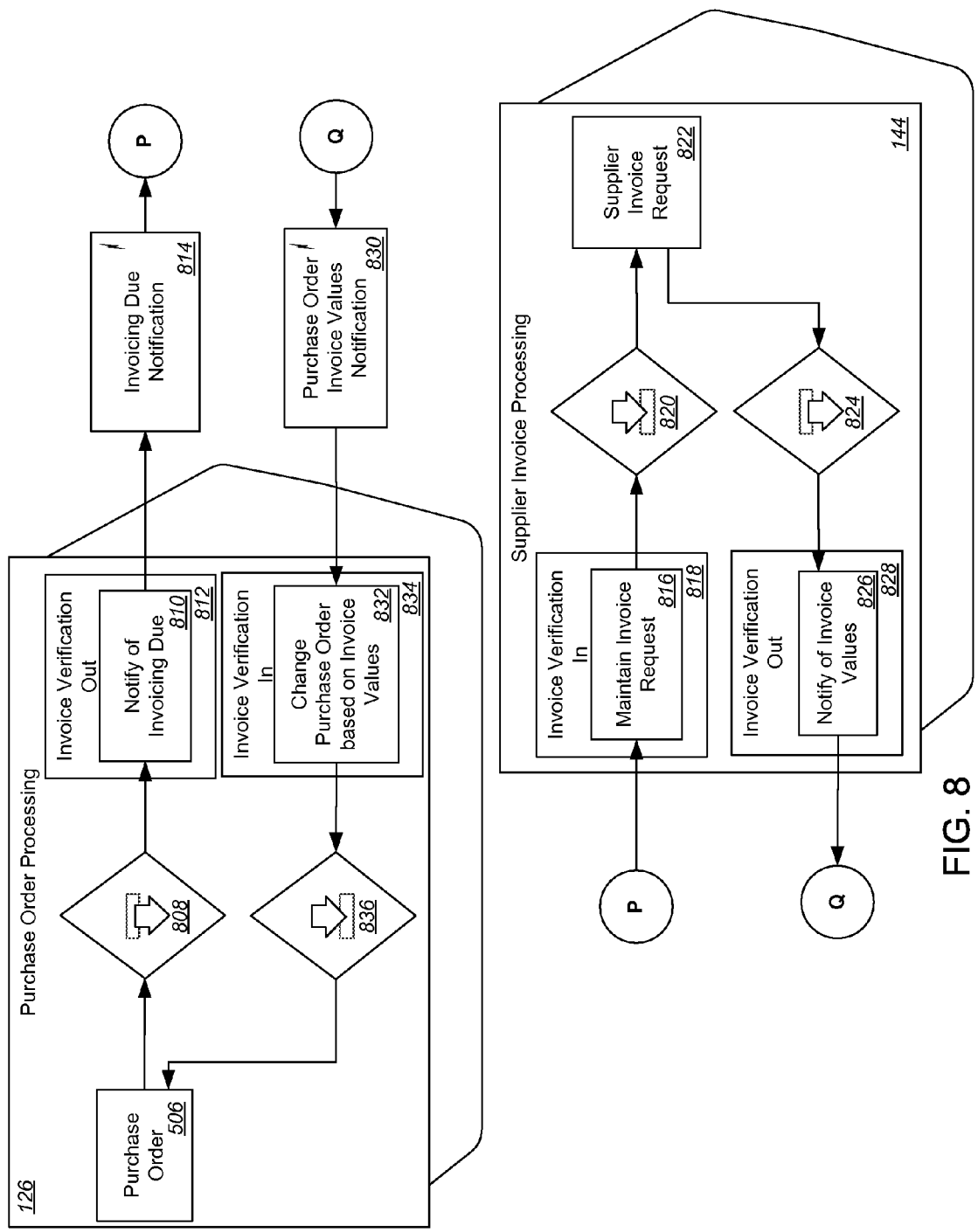
FIG. 8 is a block diagram showing interactions between a Purchase Order Processing process component and a Supplier Invoice Processing process component.

FIG. 8 is a block diagram showing interactions between the Purchase Order Processing process component 126 and the Supplier Invoice Processing process component 144 in the architectural design of FIGS. 1A and 1B. The interactions include the sending of invoicing-relevant data from a purchase order to the Supplier Invoice Processing process component 144. For example, after the supplier invoice that is based on the purchase order is saved, the Purchase Order Processing process component 126 is notified and the invoiced value and invoiced quantity in the supplier invoice are reported back.

As shown in FIG. 8, the Purchase Order Processing process component 126 includes the Purchase Order business object 506. The Purchase Order business object 506 represents a request from a buyer to a seller to deliver a specified quantity of material, or perform a specified service, at a specified price within a specified time. The Purchase Order business object 506 uses a Notify of Invoicing Due from Purchase Order to Supplier Invoice Processing outbound process agent 808 to invoke a Notify of Invoicing Due operation 810. The Notify of Invoicing Due operation 810 is included in an Invoice Verification Out interface 812. The Notify of Invoicing Due operation 810 can notify the Supplier Invoice Processing process component 144 about an invoice due, and/or when a Purchase Order business object 506 has been created, changed or cancelled. The Notify of Invoicing Due operation 810 sends an Invoicing Due Notification message 814 to the Supplier Invoice Processing process component 144.

The Invoicing Due Notification message 814 is received by a Maintain Invoice Request operation 816. The operation 816 can create or update a reference object in the Supplier Invoice Processing process component 144 in order to perform invoice verification with reference to a purchase order, for example, without having to access other process components. The reference object can be used for checks against the preceding documents and to make proposals for invoice entry. The operation 816 is included in an Invoice Verification In interface 818. The Maintain Invoice Request operation 816 uses a Maintain Supplier Invoice Request inbound process agent 820 to update a Supplier Invoice Request business object 822. The Supplier Invoice Request business object 822 represents a request that is sent to invoice verification advising that a supplier invoice for specified quantities and prices is expected or is to be created through evaluation settlement.

An update to the Supplier Invoice Request business object 822 triggers a Notify of Invoiced Values from Supplier Invoice Request to Purchase Order Processing outbound process agent 824. The outbound process agent 824 invokes a Notify of Invoiced Values operation 826 to notify the Purchase Order business object, 506 that at least parts of the order have already been invoiced. The Notify of Invoiced Values operation 826 is included in an Invoice Verification Out interface 828. The operation 826 sends a Purchase Order Values Notification message 830. The message 830 is received by a Change Purchase Order based on Invoice Values operation 832. The operation 832 is included in an Invoice Verification In interface 834. The operation 832 can change the Purchase Order business object 506 based on invoice values by adding the quantity and amount of a supplier invoice to the cumulated invoiced quantity and amount in a node "Item Actual Values" of a purchase order. The Change Purchase Order based on Invoice Values operation 832 also adds the reference to the supplier invoice document to the purchase order. The Change Purchase Order based on Invoice Values operation 832 updates the Purchase Order business object 506 using a Change Purchase Order based on Invoice Values inbound process agent 836.

Interactions Between Process Components "Bank Statement Creation at Bank" and "Payment Processing"

Figure 9:
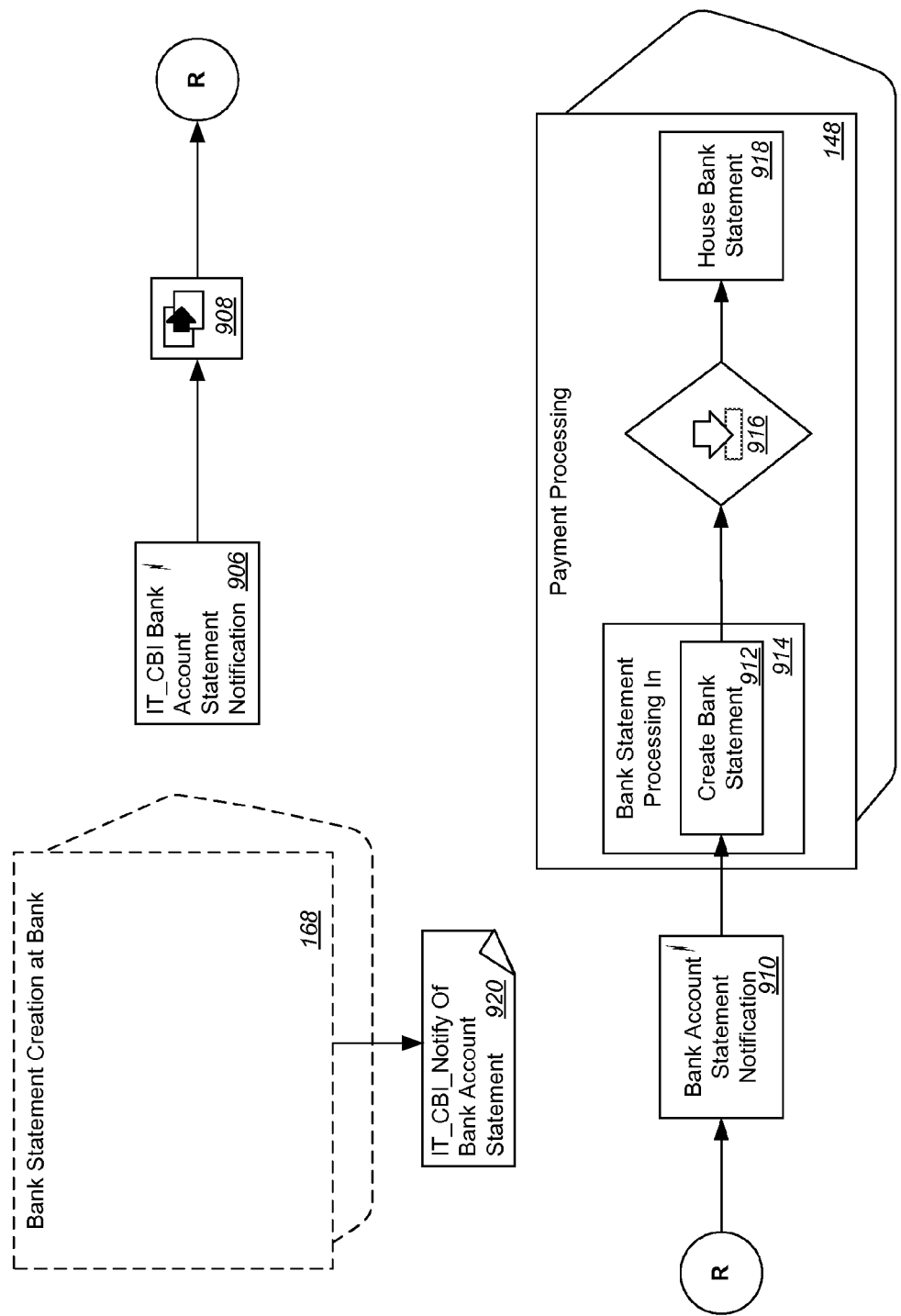
FIG. 9 is a block diagram showing interactions between a Bank Statement Creation at Bank process component and a Payment Processing process component.

FIG. 9 is a block diagram showing interactions between the Bank Statement Creation at Bank process component 168 and the Payment Processing process component 148 in the architectural design of FIGS. 1A and 1B.

As shown in FIG. 9, the Bank Statement Creation at Bank process component 168 sends an IT_CBI Bank Account Statement Notification message 906 to the Payment Processing process component 148. The Bank Statement Creation at Bank process component 168 sends information to the Payment Processing process component 148 using an IT_CBI_Notify Of Bank Account Statement communication channel template 920. The communication channel template 920 can provide information from an external party about a bank statement. The IT_CBI Bank Account Statement Notification message 906 uses a mapping entity 908 to transform the IT_CBI-based message type to a Bank Account Statement Notification message 910 that can be received by a Create Bank Statement operation 912. For example, the IT_CBI Bank Account Statement Notification message 906 can be in a format of the national electronic banking standard, CBI (Corporate Banking Interbancario), established by the Italian Banking Association (ABI) and the major Italian (IT) banks, used by the majority (approximately 80%) of domestic and foreign banks in Italy.

The Create Bank Statement operation 912 is included in a Bank Statement Processing In interface 914. In one example, the Create Bank Statement operation 912 creates a bank statement in the Payment Processing process component 148. The operation 912 uses a Maintain Bank Statement inbound process agent 916 to update a House Bank Statement business object 918. The House Bank Statement business object 918 represents a legally binding notification from the house bank about the revenues within a period of time at a house bank account with a defined starting and closing balance.

Interactions Between Process Components "Supplier Invoice Processing" and "Due Item Processing"

Figure 10:
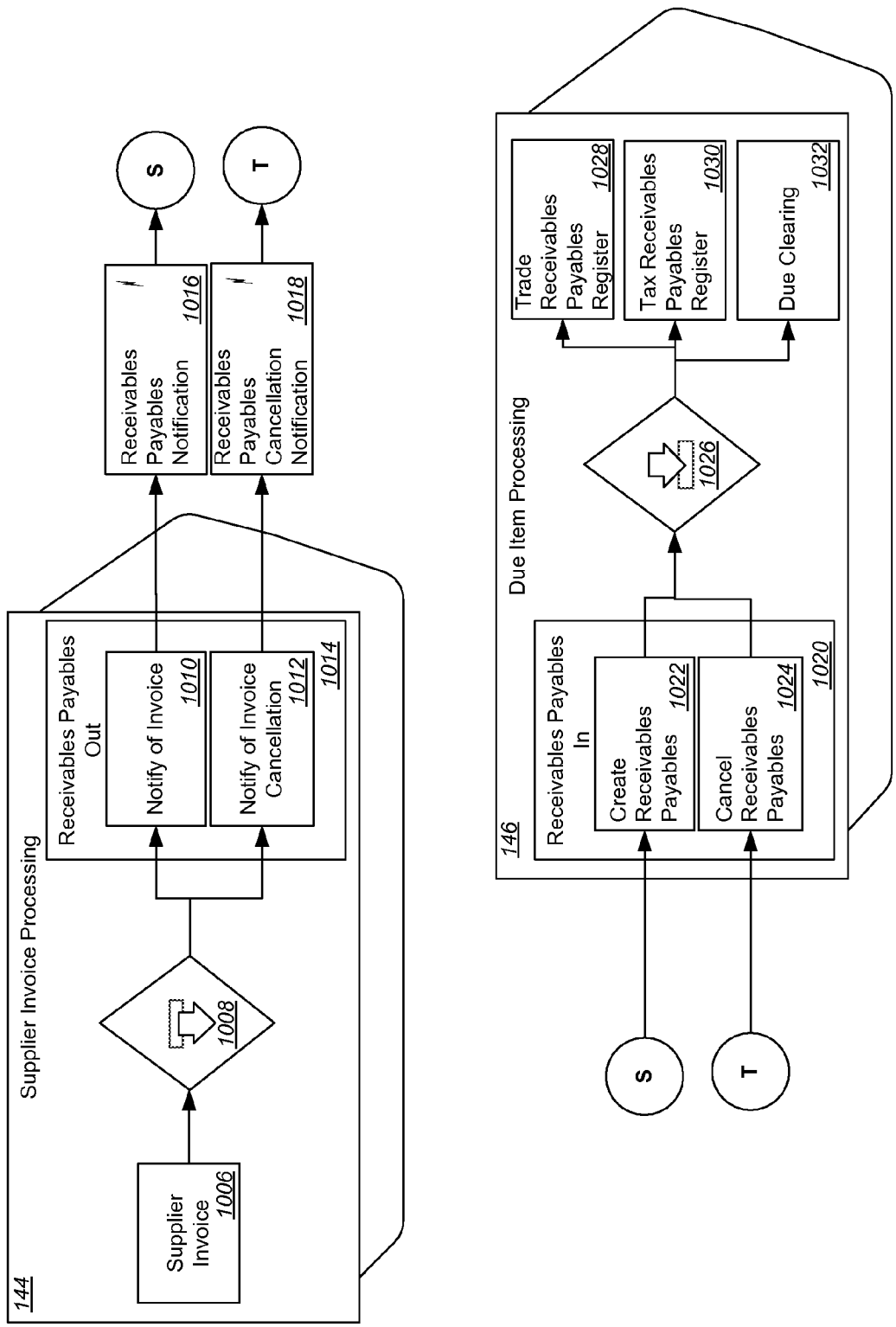
FIG. 10 is a block diagram showing interactions between a Supplier Invoice Processing process component and a Due Item Processing process component.

FIG. 10 is a block diagram showing interactions between the Supplier Invoice Processing process component 144 and the Due Item Processing process component 146 in the architectural design of FIGS. 1A and 1B. The interaction starts when a supplier invoice is created or cancelled. For example, the Supplier Invoice Processing process component 144 notifies the Due Item Processing process component 146 about the creation or cancellation of a supplier invoice.

As shown in FIG. 10, the Supplier Invoice Processing process component 144 includes a Supplier Invoice business object 1006. The Supplier Invoice business object 1006 represents a company's obligation to pay a supplier for delivered goods and services. For example, if the company returns goods or complains about services, the supplier usually issues a credit memo for an amount equal to, or lower than the original invoice, and refunds the money to the company. For invoiced goods that require a duty, a customs duty invoice can be submitted by the customs authority, stating a company's obligation to pay tax on the import or export of goods.

An update in the Supplier Invoice business object 1006 (e.g., when a supplier invoice is paid) triggers a Notify of Supplier Invoice to Due Item Processing outbound process agent 1008. The Notify of Supplier Invoice to Due Item Processing outbound process agent 1008 invokes a Notify of Invoice operation 1010 to notify the Due Item Processing process component 146 about payments and taxes that are due based on a posted supplier invoice. Alternatively, the process agent 1008 invokes a Notify of Invoice Cancellation operation 1012 to notify the due item processing system about a previously posted supplier invoice that is canceled. Both operations are included in a Receivables Payables Out interface 1014. If the Notify of Invoice operation 1010 is invoked, then a Receivables Payables Notification message 1016 is sent to the Due Item Processing process component 146. If the Notify of Invoice Cancellation operation 1012 is invoked, a Receivables Payables Cancellation Notification message 1018 is sent to the Due Item Processing process component 146.

The messages 1016 and 1018 are received by the Due Item Processing process component 146. A Create Receivables Payables operation 1022 receives the Receivables Payables Notification message 1016 to create a trade or tax receivable or payable. A Cancel Receivables Payables operation 1024 receives the Receivables Payables Cancellation Notification message 1018 to cancel a trade, tax receivable, or tax payable. The operations 1022 and 1024 are included in a Receivables Payables In interface 1020.

The operations 1022 and 1024 use a Maintain Trade and Tax Receivables Payables inbound process agent 1026 to update one or more of three business objects: a Trade Receivables Payables Register business object 1028, a Tax Receivables Payables Register business object 1030, or a Due Clearing business object 1032. The Trade Receivables Payables Register business object 1028 represents a register of the trade receivables and payables of a company from or to its business partners. The Tax Receivables Payables Register business object 1030 represents the register of tax receivables and payables of a company for delivered goods and rendered services between buyers and sellers, consumption of goods, transfer of goods, and amounts withheld from payments to sellers. The Due Clearing business object 1032 represents a group of receivables and payables for clearing.

Interactions Between Process Components "Payment Processing" and "Accounting"

Figure 11:
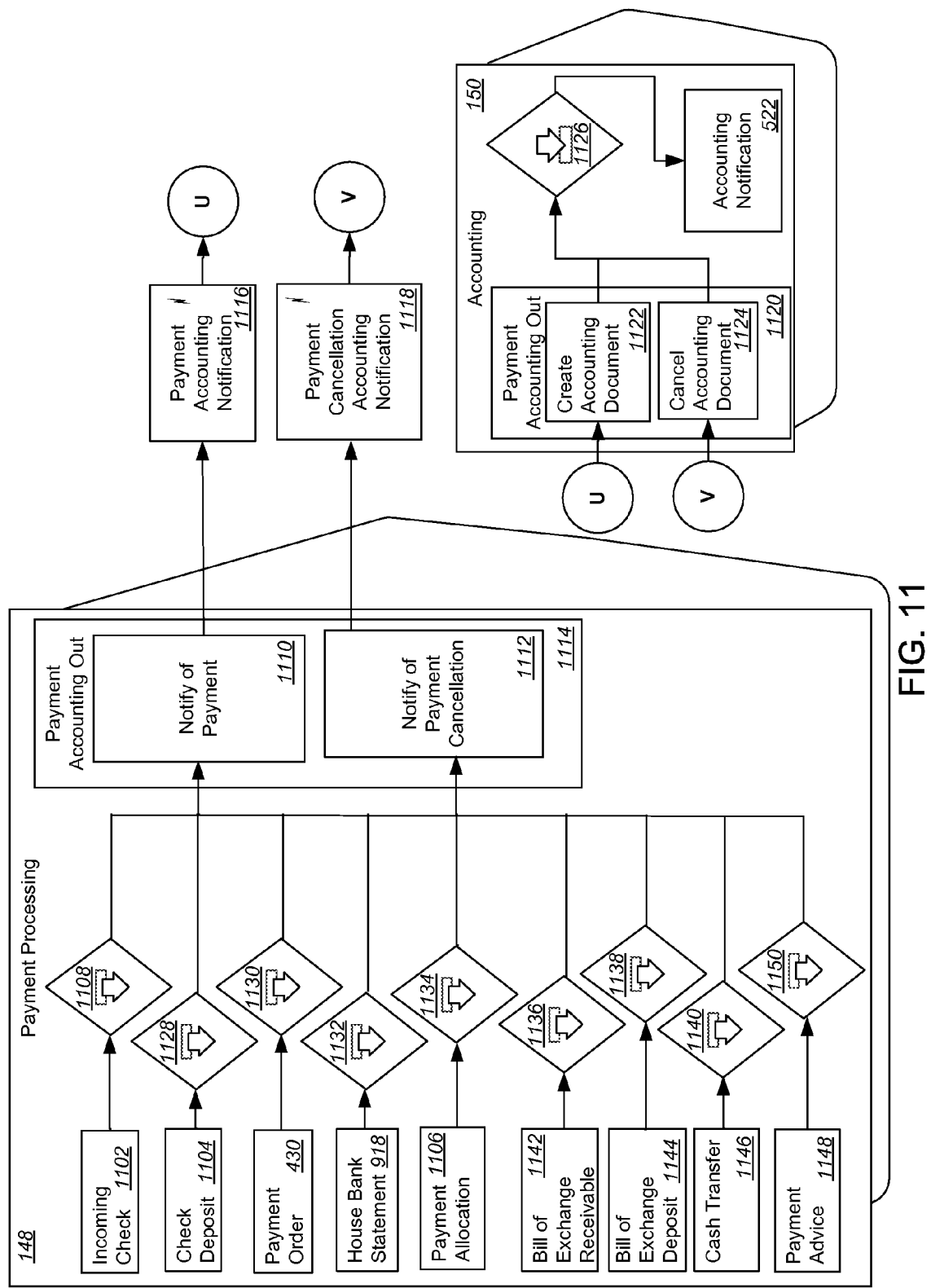
FIG. 11 is a block diagram showing interactions between a Payment Processing process component and an Accounting process component.

FIG. 11 is a block diagram showing interactions between the Payment Processing process component 148 and the Accounting process component 150 in the architectural design of FIGS. 1A and 1B. The interaction starts when a payment is ordered, received, allocated, or cancelled. The Payment Processing process component 148 can notify the Accounting process component 103 about the creation or cancellation of a payment ordered, received, or allocated.

As shown in FIG. 11, the Payment Processing process component 148 includes an Incoming Check business object 1102, a Check Deposit business object 1104, the Payment Order business object 430, the House Bank Statement business object 918, a Payment Allocation business object 1106, a Bill of Exchange Receivable business object 1142, a Bill of Exchange Deposit business object 1144, a Cash Transfer business object 1146, and a Payment Advice business object 1148. The Incoming Check business object 1102 represents a check issued by a business partner payable to the company. The Check Deposit business object 1104 represents a deposit of checks at a house bank for credit to a house bank account. The Payment Allocation business object 1106 represents an assignment of a payment item to the payment reasons from which the payment item originated. The Bill of Exchange Receivable business object 1142 represents a bill of exchange issued either by the company or by a business partner for the benefit of the company. The Bill of Exchange Deposit business object 1144 represents a deposit of bills of exchange receivable at a house bank for credit to a house bank account. The Cash Transfer business object 1146 represents a company-internal money transfer that can include the following payments: from one house bank account to another (house bank account transfer); from one cash storage to another (cash transfer); from a cash storage to a house bank account (cash deposit); or from a house bank account to a cash storage (cash withdrawal). The Payment Advice business object 1148 represents an announcement of a payment transaction by a business partner to the company, specifying payment reasons. The Payment Order business object 430 represents an order within a company to make a payment to a business partner at a specified time. For example, a payment order can be a collective order that includes several individual orders. The House Bank Statement business object 918 represents a legally binding notification from the house bank about the revenues (items) within a specific time period at a house bank account with a defined starting and closing balance.

An update in one or more of the above business objects triggers the Payment Processing process component 148 to update the Accounting Notification business object 522 in the Accounting process component 150. An update in the Incoming Check business object 1102 triggers a Notify of Payment from Incoming Check to Accounting outbound process agent 1108 to invoke either a Notify of Payment operation 1110 or a Notify of Payment Cancellation operation 1112. The operations 1110 and 1112 are included in a Payment Accounting Out interface 1114. The Notify of Payment operation 1110 can notify accounting of cash receipts and cash disbursements. The Notify of Payment Cancellation operation 1112 can notify accounting about the cancellation of cash receipts and cash disbursements. If the Notify of Payment operation 1110 is invoked (e.g., a status of the Incoming Check business object 1102 is "saved"), then a Payment Accounting Notification message 1116 is sent to the Accounting process component 150. If the Notify of Payment Cancellation operation 1112 is invoked (e.g., a status of the Incoming Check business object 1102 is "cancelled"), then a Payment Cancellation Accounting Notification message 1118 is sent to the Accounting process component 150.

The Accounting process component 150 includes a Payment Accounting Out interface 1120 to receive the messages 1116 and 1118. The Payment Accounting Notification message 1116 is received by a Create Accounting Document operation 1122. The Payment Cancellation Accounting Notification message 1118 is received by a Cancel Accounting Document operation 1124. The operations 1122, 1124 can use a Maintain Accounting Document based on Payment inbound process agent 1126 to update the Accounting Notification business object 522. The Accounting Notification business object 522 represents a notification sent to the Accounting process component 150 by an operational component regarding a business transaction. For example, the Accounting Notification business object 522 can represent the operational business transaction in a standardized form for business transaction documents and can include the data needed to valuate the business transaction.

The Check Deposit business object 1104 uses a Notify of Payment from Check Deposit to Accounting outbound process agent 1128 to send a notification to the Accounting process component 150 regarding check deposits. The Notify of Payment from Check Deposit to Accounting outbound process agent 1128 invokes either the Notify of Payment operation 1110, or the Notify of Payment Cancellation operation 1112 in a Payment Accounting Out interface 1114. If the Notify of Payment operation 1110 is invoked (e.g., a status of the Payment Order business object 430 is "ready for transfer"), then the Payment Accounting Notification message 1116 is sent to the Accounting process component 150. If the Notify of Payment Cancellation operation 1112 is invoked (e.g., a status of the Payment Order business object 430 is "cancelled"), then the Payment Cancellation Accounting Notification message 1118 is sent to the Accounting process component 150 to update the Accounting Notification business object 522.

The Payment Order business object 430 uses a Notify of Payment from Payment Order to Accounting outbound process agent 1130 to send a notification to the Accounting process component 150 regarding a self-initiated payment. The Notify of Payment from Payment Order to Accounting outbound process agent 1130 invokes either the Notify of Payment operation 1110, or the Notify of Payment Cancellation operation 1112 in a Payment Accounting Out interface 1114. If the Notify of Payment operation 1110 is invoked (e.g., a status of the Payment Order business object 430 is "final"), then the Payment Accounting Notification message 1116 is sent to the Accounting process component 150. If the Notify of Payment Cancellation operation 1112 is invoked (e.g. a status of the Payment Order business object 430 is "cancelled"), then the Payment Cancellation Accounting Notification message 1118 is sent to the Accounting process component 150 to update the Accounting Notification business object 522.

The House Bank Statement business object 918 uses a Notify of Payment from Bank Statement to Accounting outbound process agent 1132 to send a notification to the Accounting process component 150 concerning payments on bank accounts. For example, these payments can be sent to the system via the House Bank Statement business object 918. The Notify of Payment from Bank Statement to Accounting outbound process agent 1132 invokes either the Notify of Payment operation 1110 or the Notify of Payment Cancellation operation 1112. If the Notify of Payment operation 1110 is invoked (e.g., a status of the House Bank Statement business object 918 is "saved"), then the Payment Accounting Notification message 1116 is sent to the Accounting process component 150. If the Notify of Payment Cancellation operation 1112 is invoked (e.g., a status of the House Bank Statement business object 918 is "cancelled"), then the Payment Cancellation Accounting Notification message 1118 is sent to the Accounting process component 150 to update the Accounting Notification business object 522.

The Payment Allocation business object 1106 uses a Notify of Payment from Payment Allocation to Accounting outbound process agent 1134 to send a notification to the Accounting process component 150 from the Payment Allocation business object 1106. The Notify of Payment from Payment Allocation to Accounting outbound process agent 2434 invokes either the Notify of Payment operation 1110 or the Notify of Payment Cancellation operation 1112. If the Notify of Payment operation 1110 is invoked (e.g., a status of the Payment Allocation business object 1106 is "saved"), then the Payment Accounting Notification message 1116 is sent to the Accounting process component 150. If the Notify of Payment Cancellation operation 1112 is invoked (e.g., a status of the Payment Allocation business object 1106 is "cancelled"), then the Payment Cancellation Accounting Notification message 1118 is sent to the Accounting process component 150 to update the Accounting Notification business object 522.

The Bill of Exchange Receivable business object 1142 uses a Notify of Payment from Bill of Exchange Receivable to Accounting outbound process agent 1136 to send a notification to the Accounting process component 150 from the Bill of Exchange Receivable business object 1142. The Notify of Payment from Bill of Exchange Receivable to Accounting outbound process agent 1136 invokes either the Notify of Payment operation 1110 or the Notify of Payment Cancellation operation 1112. If the Notify of Payment operation 1110 is invoked, then the Payment Accounting Notification message 1116 is sent to the Accounting process component 150. If the Notify of Payment Cancellation operation 1112 is invoked, then the Payment Cancellation Accounting Notification message 1118 is sent to the Accounting process component 150 to update the Accounting Notification business object 522.

The Bill of Exchange Deposit business object 1144 uses a Notify of Payment from Bill of Exchange Deposit to Accounting outbound process agent 1138 to send a notification to the Accounting process component 150 from the Bill of Exchange Deposit business object 1144. The Notify of Payment from Bill of Exchange Deposit to Accounting outbound process agent 1138 invokes either the Notify of Payment operation 1110 or the Notify of Payment Cancellation operation 1112. If the Notify of Payment operation 1110 is invoked, then the Payment Accounting Notification message 1116 is sent to the Accounting process component 150. If the Notify of Payment Cancellation operation 1112 is invoked, then the Payment Cancellation Accounting Notification message 1118 is sent to the Accounting process component 150 to update the Accounting Notification business object 522.

The Cash Transfer business object 1146 uses a Notify of Payment from Cash Transfer to Accounting outbound process agent 1140 to send a notification to the Accounting process component 150 from the Cash Transfer business object 1146. The Notify of Payment Cash Transfer to Accounting outbound process agent 1140 invokes either the Notify of Payment operation 1110 or the Notify of Payment Cancellation operation 1112. If the Notify of Payment operation 1110 is invoked, then the Payment Accounting Notification message 1116 is sent to the Accounting process component 150. If the Notify of Payment Cancellation operation 1112 is invoked, then the Payment Cancellation Accounting Notification message 1118 is sent to the Accounting process component 150 to update the Accounting Notification business object 522.

The Payment Advice business object 1148 uses a Notify of Payment from Payment Advice to Accounting outbound process agent 1150 to create a notification to the Accounting process component 150 from the Payment Advice business object 1148. The Notify of Payment from Payment Advice to Accounting outbound process agent 1150 invokes either the Notify of Payment operation 1110 or the Notify of Payment Cancellation operation 1112. If the Notify of Payment operation 1110 is invoked, then the Payment Accounting Notification message 1116 is sent to the Accounting process component 150. If the Notify of Payment Cancellation operation 1112 is invoked, then the Payment Cancellation Accounting Notification message 1118 is sent to the Accounting process component 150 to update the Accounting Notification business object 522.

Interactions Between Process Components "Purchase Order Processing" and "Sales Order Processing at Supplier"

Figure 12:
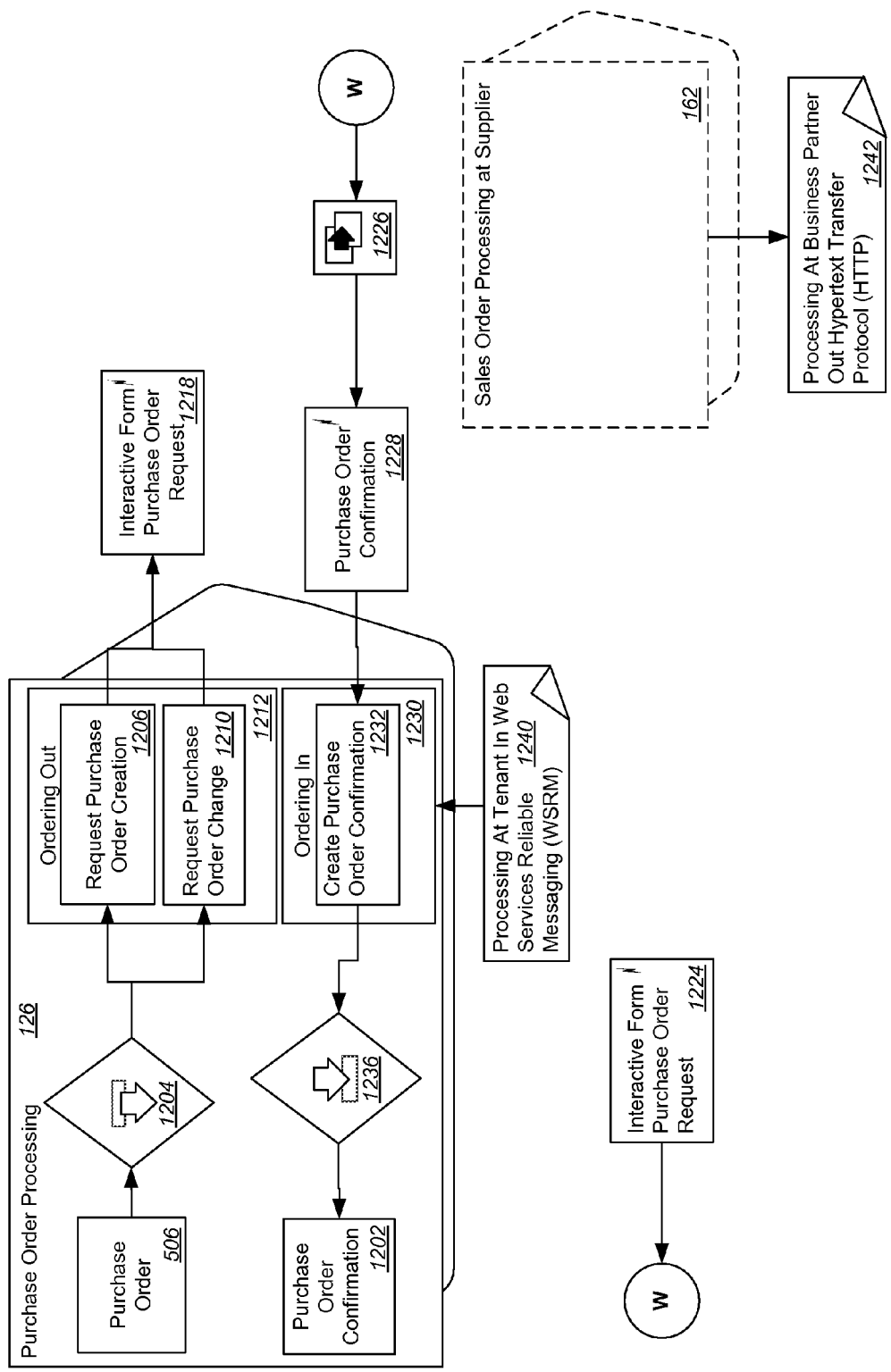
FIG. 12 is a block diagram showing interactions between a Purchase Order Processing process component and a Sales Order Processing at Supplier process component.

FIG. 12 is a block diagram showing interactions between the Purchase Order Processing process component 126 and the Sales Order Processing at Supplier process component 162 in the architectural design of FIGS. 1A and 1B. The interactions include requesting of the creation, update, or cancellation of a sales order in the external Sales Order Processing at Supplier process component 162, and the subsequent requesting of the creation, update, or cancellation of a purchase order confirmation in the Purchase Order Processing process component 126 using interactive forms.

As shown in FIG. 12, the Purchase Order Processing process component 126 includes the Purchase Order business object 506 and a Purchase Order Confirmation business object 1202. The Purchase Order business object 506 represents a request from a buyer to a seller to deliver a specified quantity of material, or perform a specified service, at a specified price within a specified time. The Purchase Order Confirmation business object 1202 represents a confirmation from a seller to deliver a specified quantity of goods, or perform a specified service, at a specified price within a specified time.

An update in the Purchase Order business object 506 triggers a Request Purchase Order to Supplier outbound process agent 1204 to request a purchase order at a supplier. The outbound process agent 1204 invokes either a Request Purchase Order Creation operation 1206 or a Request Purchase Order Change operation 1210. The operations 1206 and 1210 are included in an Ordering Out interface 1212.

The Request Purchase Order Creation operation 1206 can request a purchase order from a supplier. The Request Purchase Order Change operation 1210 can request a change of a purchase order that was formerly ordered at a supplier. In this example, the operations 1206, 1210 send an Interactive Form Purchase Order Request message 1218 to the Sales Order Processing at Supplier process component 162.

The Sales Order Processing at Supplier process component 162 sends information to Purchase Order Processing process component 1230 using a Processing At Business Partner Out Hypertext Transfer Protocol (HTTP) communication channel template 1242. The Processing At Business Partner Out Hypertext Transfer Protocol (HTTP) communication channel template 1242 can define protocols and parameters used for communication with an external party.

The Sales Order Processing at Supplier process component 162 sends an Interactive Form Purchase Order Request message 1224. The Interactive Form Purchase Order Request message 1224 uses a mapping entity 1226 to transform the interactive form based message type to a Purchase Order Confirmation message 1228.

A Create Purchase Order Confirmation operation 1232 receives the Purchase Order Confirmation message 1228. The operation 1232 is included in an Ordering In interface 1230. The Ordering In interface 1230 receives information from the Sales Order Processing at Supplier process component 162 using a Processing at Tenant In Web Services Reliable Messaging (WSRM) communication channel template 1240. The communication channel template 1240 can provide information from an external party about a purchase order confirmation.

The Create Purchase Order Confirmation operation 1232 can create a purchase order confirmation according to the confirmation, partial confirmation, or proposed changes sent from the seller to the buyer concerning the requested delivery of product to trigger the creation of a purchase order confirmation. The Create Purchase Order Confirmation operation 1232 uses a Create Purchase Order Confirmation inbound process agent 1236 to update the Purchase Order Confirmation business object 1202.

Interactions Between Process Components "Customer Invoice Processing at Supplier" and "Supplier Invoice Processing"

Figure 13:
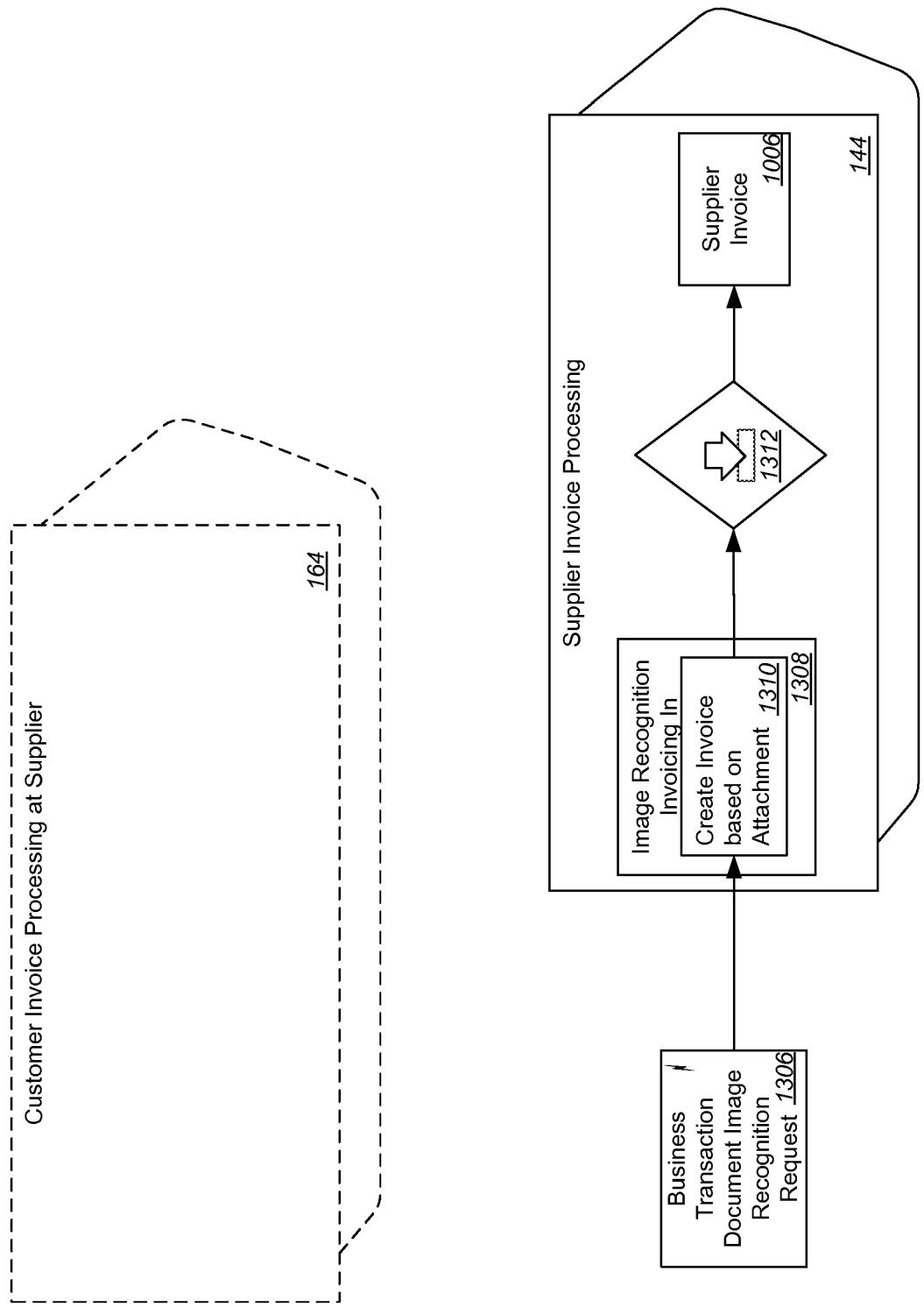
FIG. 13 is a block diagram showing interactions between a Customer Invoice Processing at Supplier process component and a Supplier Invoice Processing process component.

FIG. 13 is a block diagram showing interactions between the Customer Invoice Processing at Supplier process component 164 and the Supplier Invoice Processing process component 144 in the architectural design of FIGS. 1A and 1B.

For example, the interactions include sending of digitalized supplier invoices from an external system to the Supplier Invoice Processing process component 144.

The Supplier Invoice Processing process component 144 includes a Create Invoice based on Attachment operation 1310. The operation 1310 is included in an Image Recognition Invoicing In interface 1308. The operation 1310 can create an empty supplier invoice with an attachment of an invoice image according to legally binding claims or liabilities for delivered goods and rendered services. In this example, the Create Invoice based on Attachment operation 1310 receives a Business Transaction Image Recognition Request message 1306 from the Customer Invoice Processing at Supplier process component 164. The operation 1310 uses a Create Supplier Invoice based on Attachment inbound process agent 1312 to update the Supplier Invoice business object 1006.

The Supplier Invoice business object 1006 represents a company's obligation to pay a supplier for delivered goods and services. For example, if the company returns goods or complains about services, the supplier usually issues a credit memo for an amount equal to, or lover than the original invoice, and refunds the money to the company. For invoiced goods that require a duty, a customs duty invoice can be submitted by the customs authority stating a company's obligation to pay tax on the import or export of goods.

Interactions Between Process Components "Inbound Delivery Processing" and "Supplier Invoice Processing"

Figure 14:
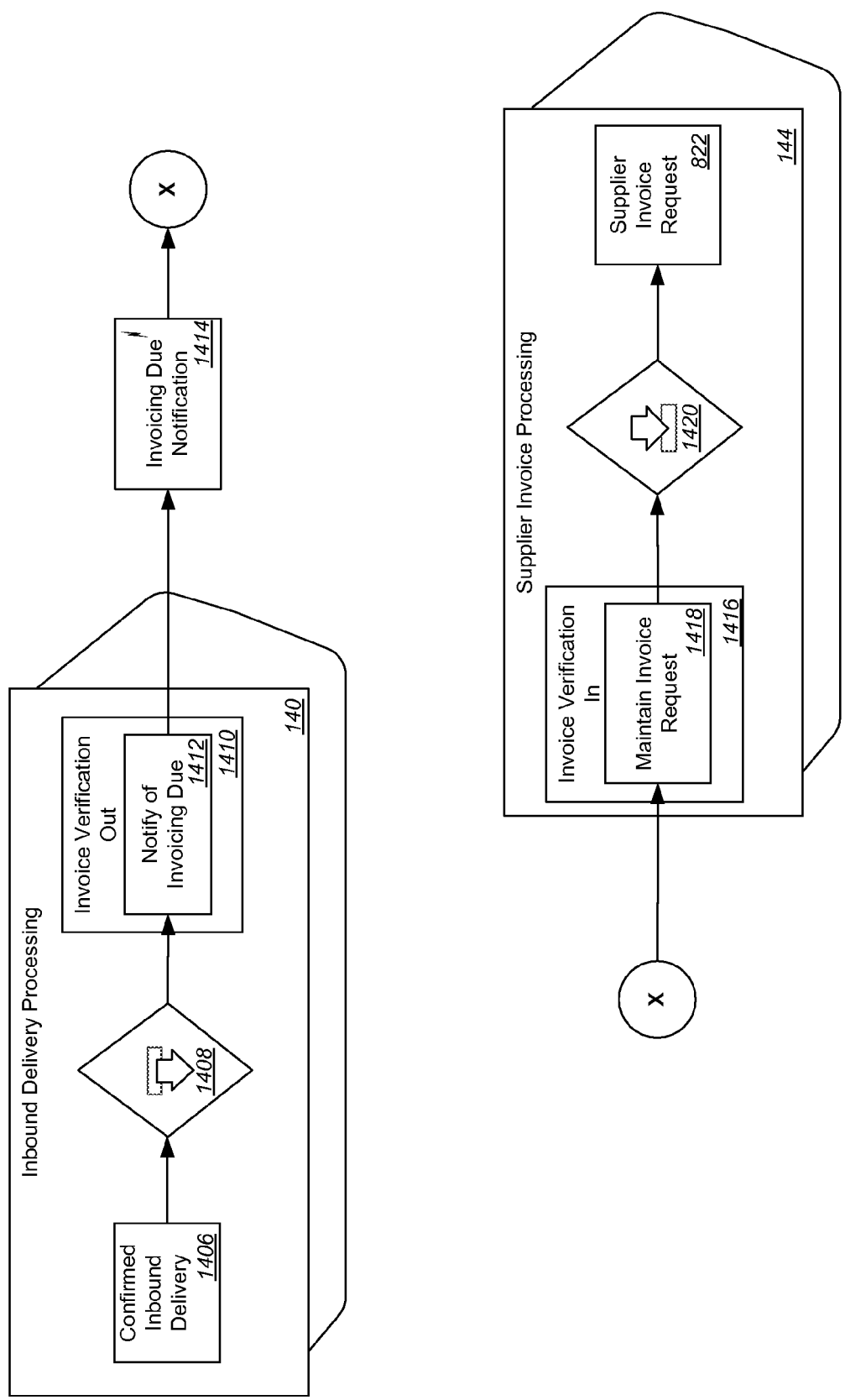
FIG. 14 is a block diagram showing interactions between an Inbound Delivery Processing process component and a Supplier Invoice Processing process component.

FIG. 14 is a block diagram showing interactions between the Inbound Delivery Processing process component 140 and the Supplier Invoice Processing process component 144 in the architectural design of FIGS. 1A and 1B. The interactions include sending of invoicing-relevant data from a confirmed inbound delivery to the Supplier Invoice Processing process component 144.

As shown in FIG. 14, the Inbound Delivery Processing process component 140 includes a Confirmed Inbound Delivery business object 1406. The Confirmed Inbound Delivery business object 1406 represents a confirmation that a certain composition of goods has actually been received by the product recipient. The Confirmed Inbound Delivery business object 1406 uses a Request Invoicing from Confirmed Inbound Delivery to Supplier Invoice Processing outbound process agent 1408 to invoke a Notify of Invoicing Due operation 1412. The operation 1412 can send an invoicing due notification to the Supplier Invoice Processing process component 144. The Notify of Invoicing Due operation 1412 is included in an Invoice Verification Out interface 1410. The Notify of Invoicing Due operation 1412 sends an Invoice Due Notification message 1414 to the Supplier Invoice Processing process component 144.

A Maintain Invoice Request operation 1418 receives the Invoicing Due Notification message 1414. The operation 1418 is included in an Invoice Verification In interface 1416. The operation 1418 creates or updates a reference object in the Supplier Invoice Processing process component 144 to perform invoice verification with reference to a purchase order, for example, without having to access other process components. The reference object is used for checking against the preceding documents and to make proposals for invoice entry. The Maintain Invoice Request operation 1418 uses a Maintain Supplier Invoice Request inbound process agent 1420 to update the Supplier Invoice Request business object 822. The Supplier Invoice Request business object 822 represents a document that is sent to invoice verification advising that a supplier invoice for specified quantities and prices is expected or is to be created through evaluation settlement.

Interactions Between Process Components "Due Item Processing" and "Accounting"

Figure 15:
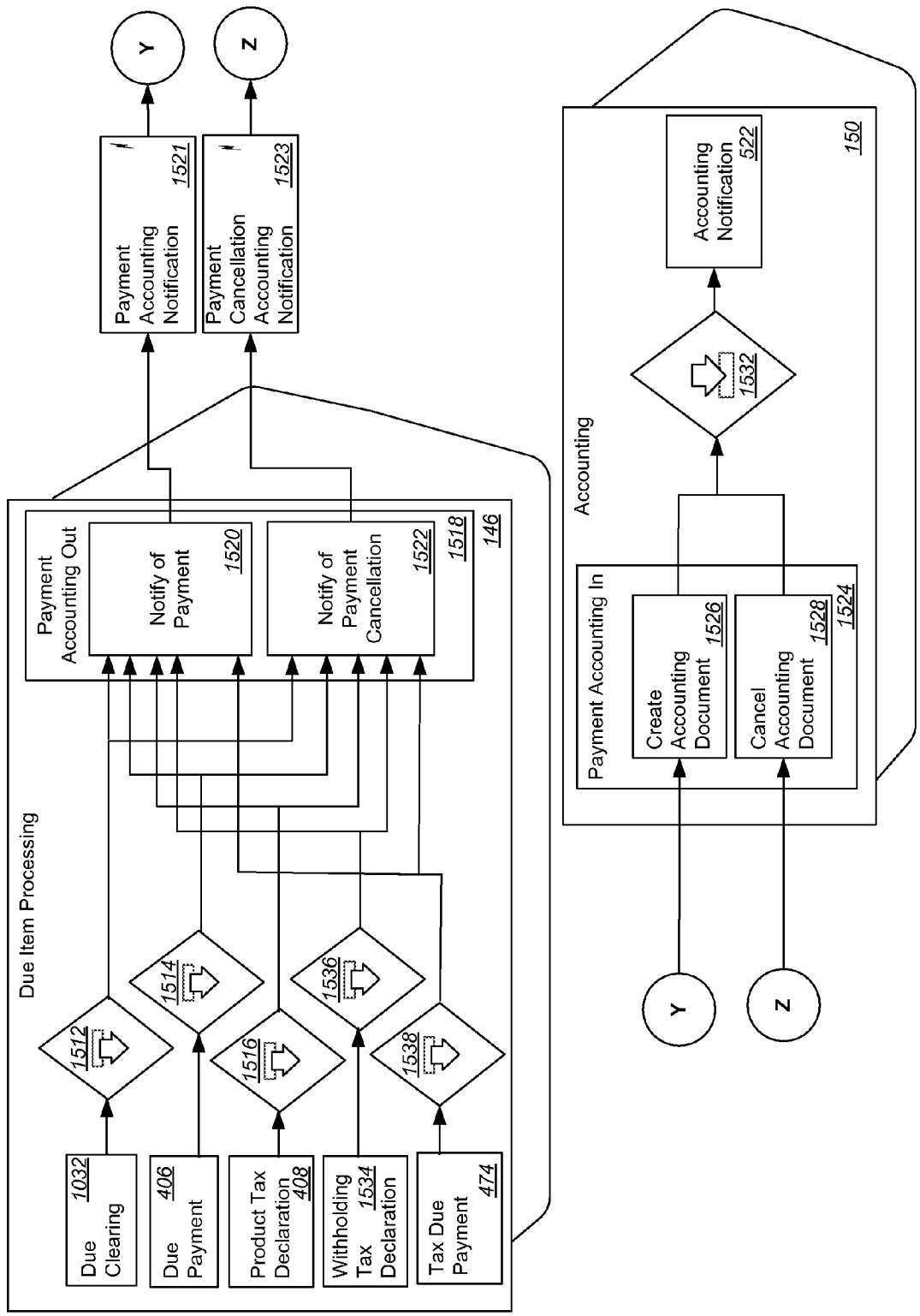
FIG. 15 is a block diagram showing interactions between a Due Item Processing component and an Accounting process component.

FIG. 15 is a block diagram showing interactions between the Due Item Processing process component 146 and the Accounting process component 150 in the architectural design of FIGS. 1A and 1B. The interaction starts when a payment or clearing for trade or tax receivables or payables is created or cancelled. The Due Item Processing process component 146 notifies the Accounting process component 150 about the creation or cancellation of the payment or clearing.

As shown in FIG. 15, the Due Item Processing process component 146 includes a Due Clearing business object 1032, the Due Payment business object 406, the Product tax Declaration business object 408, a Withholding Tax Declaration business object 1534, and the Tax Due Payment business object 474. Updates in the Due Clearing business object 1032, the Due Payment business object 406, the Product Tax Declaration business object 408, the Withholding Tax Declaration business object 1534, and/or the Tax Due Payment business object 474 can trigger messages to be sent to update the Accounting Notification business object 522.

Specifically, an update in the Due Clearing business object 1032 triggers a Notify of Payment from Due Clearing to Accounting outbound process agent 1512. The Due Clearing business object 1032 represents a group of receivables and payables for clearing. The process agent 1512 sends notification for a clearing of trade receivables and/or payables to accounting. The Notify of Payment from Due Clearing to Accounting outbound process agent 1512 invokes a Notify of Payment operation 1520 or a Notify Payment Cancellation operation 1522. The operations 1520 and 1522 are included in a Payment Accounting Out interface 1518. The Notify of Payment from Due Clearing to Accounting outbound process agent 1512 invokes the Notify of Payment operation 1520 if the due clearing is released. The process agent 1512 invokes the Notify of Payment Cancellation operation 1522 if the due clearing is cancelled.

The Notify of Payment operation 1520 can notify accounting of payments or clearings of trade and tax receivables or payables. The Notify of Payment operation 1520 sends a Payment Accounting Notification message 1521 to the Accounting process component 150. The Notify of Payment Cancellation operation 1522 can notify accounting of payment or clearing cancellations for trade and tax receivables or payables. The Notify of Payment Cancellation operation 1522 sends a Payment Cancellation Accounting Notification message 1523 to the Accounting process component 150.

An update in the Due Payment business object 406 triggers a Notify of Payment from Due Payment to Accounting outbound process agent 1514. The Due Payment business object 406 represents a payment request or payment confirmation with regard to trade receivables and payables. The outbound process agent 1514 sends notification to the Accounting process component 150 for inward or outward trade receivables and/or payables payments. The Notify of Payment from Due Payment to Accounting outbound process agent 1514 invokes the Notify of Payment operation 1520 or the Notify Payment Cancellation operation 1522. The Notify of Payment from Due Payment to Accounting outbound process agent 1514 invokes the Notify of Payment operation 1520 if a VAT (value added tax) declaration is released. The Notify of Payment from Due Clearing to Accounting outbound process agent 1514 invokes the Notify of Payment Cancellation operation 1522 if the VAT declaration is cancelled.

An update in the Product Tax Declaration business object 408 triggers a Notify of Payment from Product Tax Declaration to Accounting outbound process agent 1516. The Product Tax Declaration business object 408 represents a declaration of the product tax payables or receivables of a company to the responsible tax authority according to the tax declaration arrangement and country specific legal requirements that triggers the payment to the tax authority if required. The outbound process agent 1516 sends notification to the Accounting process component 150 for a payment of product tax receivables or payables. The Notify of Payment from Product Tax Declaration to Accounting outbound process agent 1516 invokes the Notify of Payment operation 1520 or the Notify Payment Cancellation operation 1522. The Notify of Payment from Due Payment to Accounting outbound process agent 1516 invokes the Notify of Payment operation 1520 if a VAT declaration is released. The Notify of Payment from Due Clearing to Accounting outbound process agent 1512 invokes the Notify of Payment Cancellation operation 1522 if the VAT declaration is cancelled.

An update in the Withholding Tax Declaration business object 1534 triggers a Notify of Payment from Withholding Tax Declaration to Accounting outbound process agent 1536. The Withholding Tax Declaration business object 1534 represents a declaration of withholding tax payables of a company to a tax authority according to the tax declaration arrangement and country specific legal requirements that triggers the payment to the tax authority if required. The outbound process agent 1536 sends notification to the Accounting process component 150 for a payment of withholding tax receivables and/or payables. The Notify of Payment from to Withholding Tax Declaration to Accounting outbound process agent 1536 invokes the Notify of Payment operation 1520 or the Notify Payment Cancellation operation 1522.

An update in the Tax Due Payment business object 474 triggers a Notify of Payment from Tax Due Payment to Accounting outbound process agent 1538. The Tax Due Payment business object 474 represents a payment request or payment confirmation with regard to tax payables and receivables. The outbound process agent 1538 sends notification to the Accounting process component 150 of a payment of tax receivables and/or payables. The Notify of Payment from Tax Due Payment to Accounting outbound process agent 1538 invokes the Notify of Payment operation 1520 or the Notify Payment Cancellation operation 1522.

A Payment Accounting In interface 1524 in the Accounting process component 150 includes a Create Accounting Document operation 1526 and a Cancel Accounting Document operation 1528. The Create Accounting Document operation 1526 handles the Payment Accounting Notification message 1521. The Create Accounting Document operation 1526 receives payment accounting notification from payment processing or the Due Item Processing process component 146. The Cancel Accounting Document operation 1528 handles the Payment Cancellation Accounting Notification message 1523. The Cancel Accounting Document operation 1528 receives a payment accounting cancellation request from payment processing or the Due Item Processing process component 146. Both operations 1526 and 1528 trigger a Maintain Accounting Document based on Payment inbound process agent 1532 to update the Accounting Notification business object 522. The Accounting Notification business object 522 represents a notification sent to the Accounting process component 150 by an operational component regarding a business transaction. For example, the Accounting Notification business object 522 can represent this operational business transaction in a standardized form for all business transaction documents, and can include the data needed to valuate the business transaction.

Interactions Between Process Components "RFQ Processing" and "Opportunity/Customer Quote Processing at Supplier"

Figure 16:
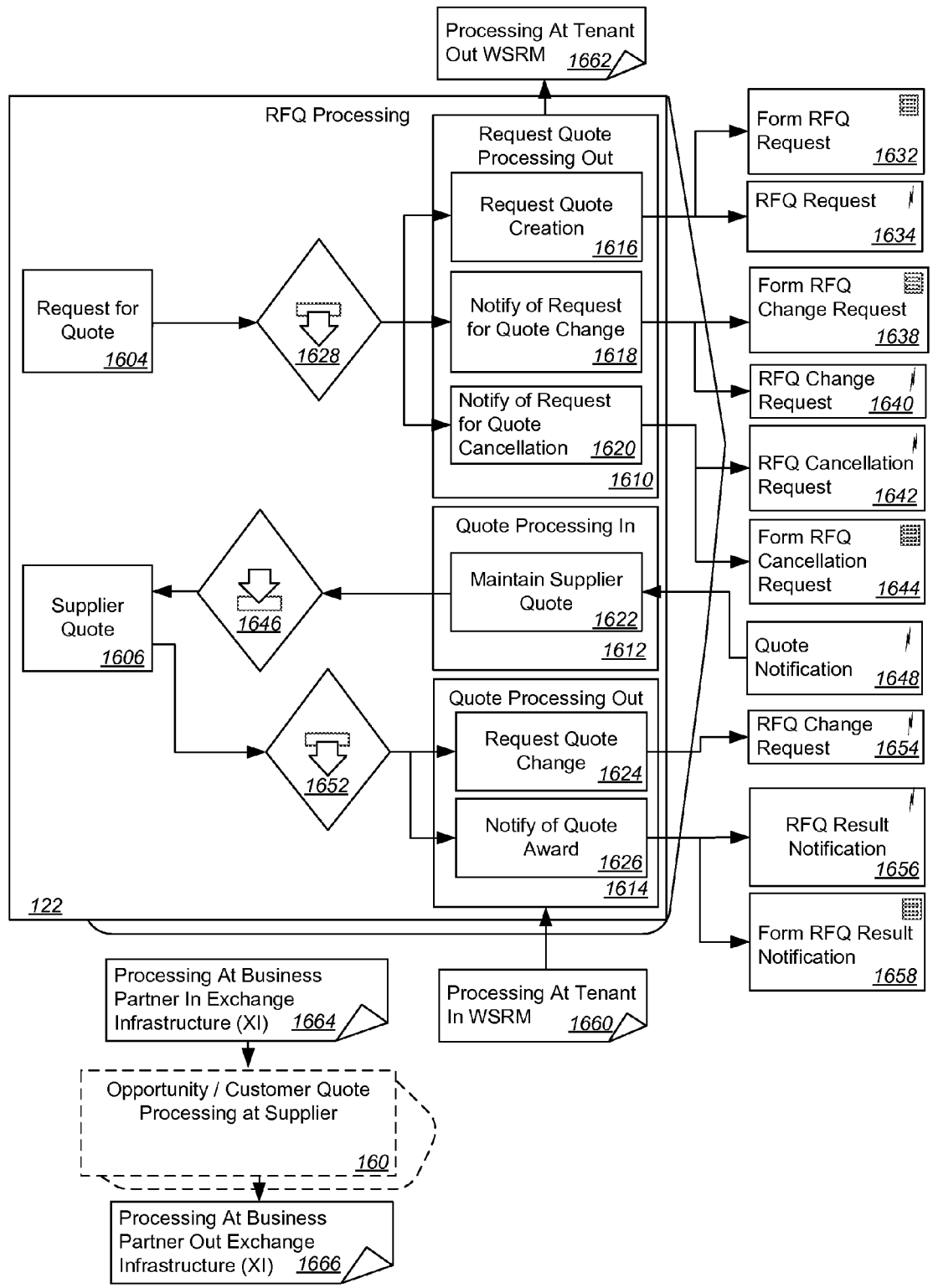
FIG. 16 is a block diagram showing interactions between an RFQ Processing process component and an Opportunity/Customer Quote Processing at Supplier process component.

FIG. 16 is a block diagram showing interactions between the RFQ Processing process component 122 and the Opportunity/Customer Quote Processing at Supplier process component 160 in the architectural design of FIGS. 1A and 1B. The interaction starts when a request for quote is created, changed, or cancelled. The RFQ Processing process component 122 can request the creation or update of a supplier quote from the Opportunity/Customer Quote Processing at Supplier process component 160. The RFQ Processing process component 122 can inform the supplier of the awarding result.

As shown in FIG. 16, the RFQ Processing process component 122 includes a Request for Quote business object 1604 and a Supplier Quote business object 1606. The Request for Quote business object 1604 represents a request from a buyer to a bidder to submit a quote for goods or services according to a set of specified criteria. The Supplier Quote business object 1606 represents a response to a quote request in which a bidder offers to sell goods and services to a buyer according to requested criteria.

The RFQ Processing process component 122 also includes a Request Quote Processing Out interface 1610, a Quote Processing in interface 1612, and a Quote Processing Out interface 1614. The Request Quote Processing Out interface 1610 includes a Request Quote Creation operation 1616, a Notify of Request for Quote Change operation 1618, and a Notify of Request for Quote Cancellation operation 1620. The Request Quote Creation operation 1616 requests the participation of the supplier in a bidding process. The Notify of Request for Quote Change operation 1618 notifies the supplier about changes to the request for quote. The Notify of Request for Quote Cancellation operation 1620 notifies the supplier about the cancellation of a request for quote. The RFQ Processing process component 122 receives information from a Processing At Tenant Out Web Services Reliable Messaging (WSRM) communication channel template 1662. The Request Quote Processing Out interface 1610 sends information to the Opportunity/Customer Quote Processing at Supplier process component 160 using the Processing At Tenant Out Web Services Reliable Messaging (WSRM) communication channel template 1662. The communication channel template 1662 can provide information from an external party about a purchase order confirmation.

The Quote Processing In interface 1612 includes a Maintain Supplier Quote operation 1622 that creates or updates a supplier quote on the basis of the received customer quote which was sent in response to the invitation from the buyer to submit a quotation.

The Quote Processing Out interface 1614 includes a Request Quote Change operation 1624 and a Notify of Quote Award operation 1626. The Request Quote Change operation 1624 requests the change of the customer quote. The Notify of Quote Award operation 1626 notifies the bidder about supplier quote items for which the quotation from the bidder has been awarded, including extending the award, or about a rejection if the quotation from the bidder is not successful. The Quote Processing Out interface 1614 receives information from the Opportunity/Customer Quote Processing at Supplier process component 160 using a Processing At Tenant In Web Services Reliable Messaging (WSRM) communication channel template 1660. The communication channel template 1660 can provide information from an external party about a purchase order confirmation.

The Request for Quote business object 1604 uses a Request Quote Maintenance from Request for Quote to Supplier outbound process agent 1628 when the Request for Quote business object 1004 is published, re-published or cancelled. The Request Quote Maintenance from Request for Quote to Supplier outbound process agent 1628 invokes the Request Quote Creation operation 1616 to send a Form RFQ Request message 1632, or an RFQ Request message 1634 to the Opportunity/Customer Quote Processing at Supplier process component 160. The Request Quote Maintenance from Request for Quote to Supplier outbound process agent 1628 can also invoke the Notify of Request for Quote Change operation 1618 to send a Form RFQ Change Request message 1638, or an RFQ Change Request message 1640 to the Opportunity/Customer Quote Processing at Supplier process component 160. The Request Quote Maintenance from Request for Quote to Supplier outbound process agent 1628 can also invoke the Notify of Request for Quote Cancellation operation 1620 to send an RFQ Cancellation Request message 1642 or a Form RFQ Cancellation Request message 1644 to the Opportunity/Customer Quote Processing at Supplier process component 160.

A Quote Notification message 1648 is received by a Maintain Supplier Quote operation 1622 that uses a Maintain Supplier Quote inbound process agent 1646 to create or update the Supplier Quote business object 1606.

The Supplier Quote business object 1606 uses a Notify of Supplier Quote to Supplier outbound process agent 1652 to invoke the Request Quote Change operation 1624 when a supplier quote is submitted. The Request Quote Change operation 1624 sends an RFQ Change Request message 1654 to the Opportunity/Customer Quote Processing at Supplier process component 160. The Notify of Supplier Quote to Supplier outbound process agent 1652 invokes the Notify of Quote Award operation 1626 when a supplier quote is submitted. The Notify of Quote Award operation 1626 sends an RFQ Result Notification message 1656 or a Form RFQ Result Notification message 1658 to the Opportunity/Customer Quote Processing at Supplier process component 160.

The Opportunity/Customer Quote Processing at Supplier process component 160 receives information from the RFQ Processing process component 122 using a Processing At Business Partner In XI communication channel template 1664. The Processing At Business Partner In XI communication channel template 1664 can define protocols and parameters used for communication from an external party. The Opportunity/Customer Quote Processing at Supplier process component 160 sends information to the RFQ Processing process component 122 using a Processing At Business Partner Out XI communication channel template 1666. The Processing At Business Partner Out XI communication channel template 1666 can define protocols and parameters used for communication to an external party.

Interactions Between Process Components "Purchase Order Processing" and "External Procurement Trigger and Response"

Figure 17:
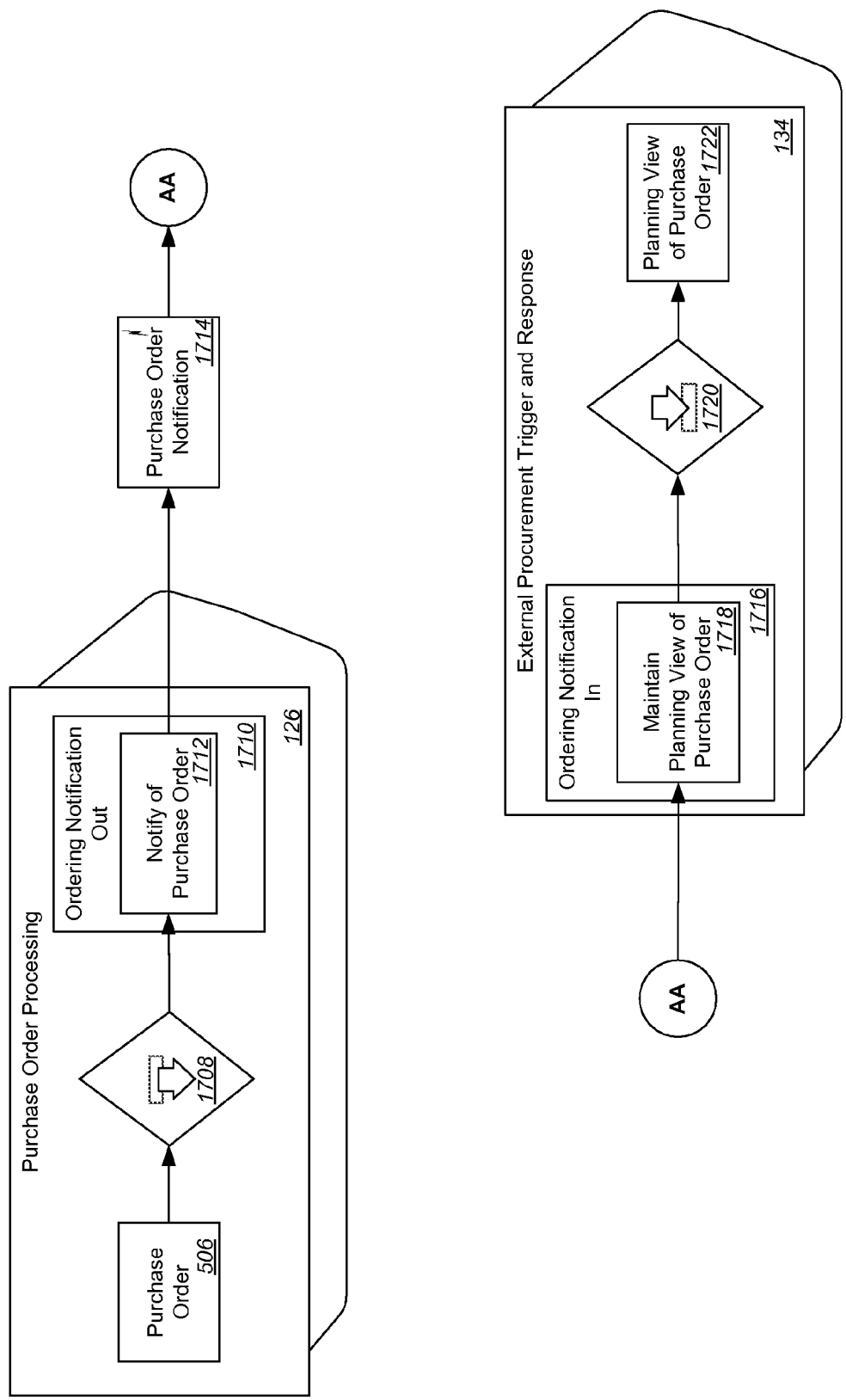
FIG. 17 is a block diagram showing interactions between a Purchase Order Processing process component and an External Procurement Trigger and Response process component.

FIG. 17 is a block diagram showing interactions between the Purchase Order Processing process component 126 and the External Procurement Trigger and Response process component 134 in the architectural design of FIGS. 1A and 1B.

As shown in FIG. 17, the Purchase Order Processing process component 126 includes the Purchase Order business object 506. The Purchase Order business object 506 represents a request from a buyer to a seller to deliver a specified quantity of material, or perform a specified service, at a specified price within a specified time. A creation, modification, or cancellation of the Purchase Order business object 506 triggers a Notify of Purchase Order to External Procurement Trigger and Response outbound process agent 1708 to inform the External Procurement Trigger and Response process component 134 about the creation, modifications or cancellation of the Purchase Order business object 506. The Notify of Purchase Order to External Procurement Trigger and Response outbound process agent 1708 invokes a Notify of Purchase Order operation 1712 in an Ordering Notification Out interface 1710. The Notify of Purchase Order operation 1712 sends a Purchase Order Notification message 1714 to notify the External Procurement Trigger and Response process component 134.

The External Procurement Trigger and Response process component 134 includes a Maintain Planning View of Purchase Order operation 1718 to receive the message 1714. The Maintain Planning View of Purchase Order operation 1718 is included in an Ordering Notification In interface 1716. The operation 1718 updates the planning relevant data of purchase order with information about new or changed purchase orders. A Maintain Planning View of Purchase Order inbound process agent 1720 is used to update a Planning View on Purchase Order business object 1722. The Planning View of Purchase Order business object 1722 represents a planning view of materials, dates, quantities, delivery conditions, parties, and/or sources of supply of a purchase order that are relevant to planning.

Interactions Between Process Components "Payment Processing" and "Payment Order Processing at House Bank"

Figure 18:
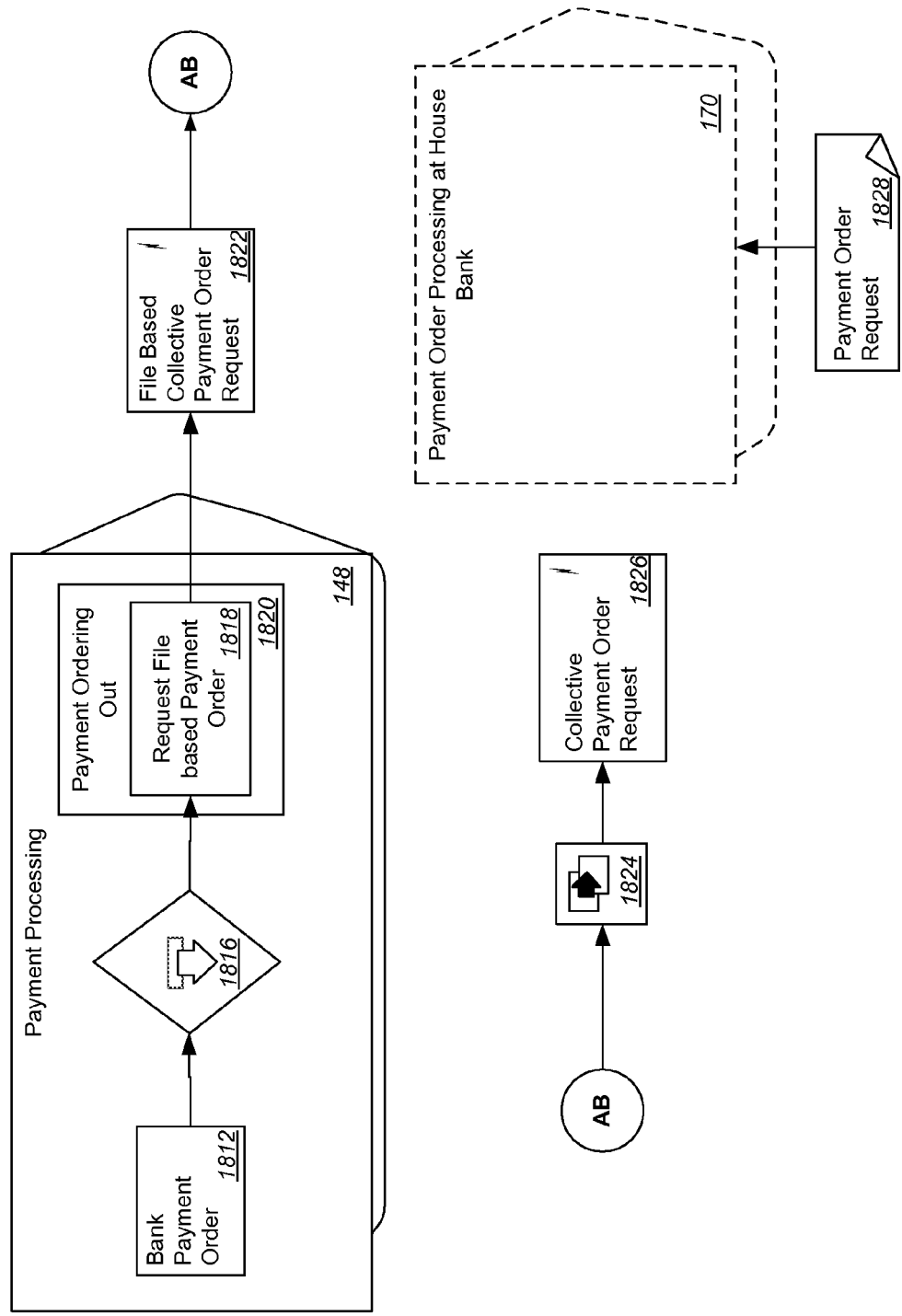
FIG. 18 is a block diagram showing interactions between a Payment Processing process component and a Payment Order Processing at House Bank process component.

FIG. 18 is a block diagram showing interactions between the Payment Processing process component 148 and the Payment Order Processing at House Bank process component 154 in the architectural design of FIGS. 1A and 1B.

As shown in FIG. 18, the Payment Processing process component 148 includes a Bank Payment Order business object 1810. The Bank Payment Order business object 1812 represents an order to a house bank to make a transfer or direct debit from a specified house bank account to fulfill a payment order. In some instances, the house bank can be a bank located in France.

The Bank Payment Order business object 1812 uses a Request File Based Payment Order from Bank Payment Order to House Bank outbound process agent 1816 to invoke a Request File based Payment Order operation 1818. The Request File based Payment Order operation 1818 instructs a house bank, using a file, to make a bank transfer or a direct debit. The operation 1818 is included in a Payment Ordering Out interface 1820. The Request File based Payment Order operation 1818 generates a File based Collective Payment Order Request message 1822. The File based Collective Payment Order Request message 1822 uses Mapping Entity 1824 to transform the file-based message type to a Collective Payment Order Request message 1826 that can be received by the Payment Order Processing at House Bank process component 154. The Collective Payment Order Request message 1826 is in a format that the house bank (a bank located in France) can understand. A collective payment order can be an instruction based on a file transfer to a credit institution to carry out one or more payment transactions (e.g., bank transfers or direct debits). The Payment Order Processing at House Bank process component 154 receives information from the Payment Processing process component 148 using a Payment Order Request communication channel template 1828. The communication channel template 1828 can provide information from a third party about a payment order request.

Interactions Between Process Components "Pricing Engine" and "External Tax Calculation"

Figure 19:
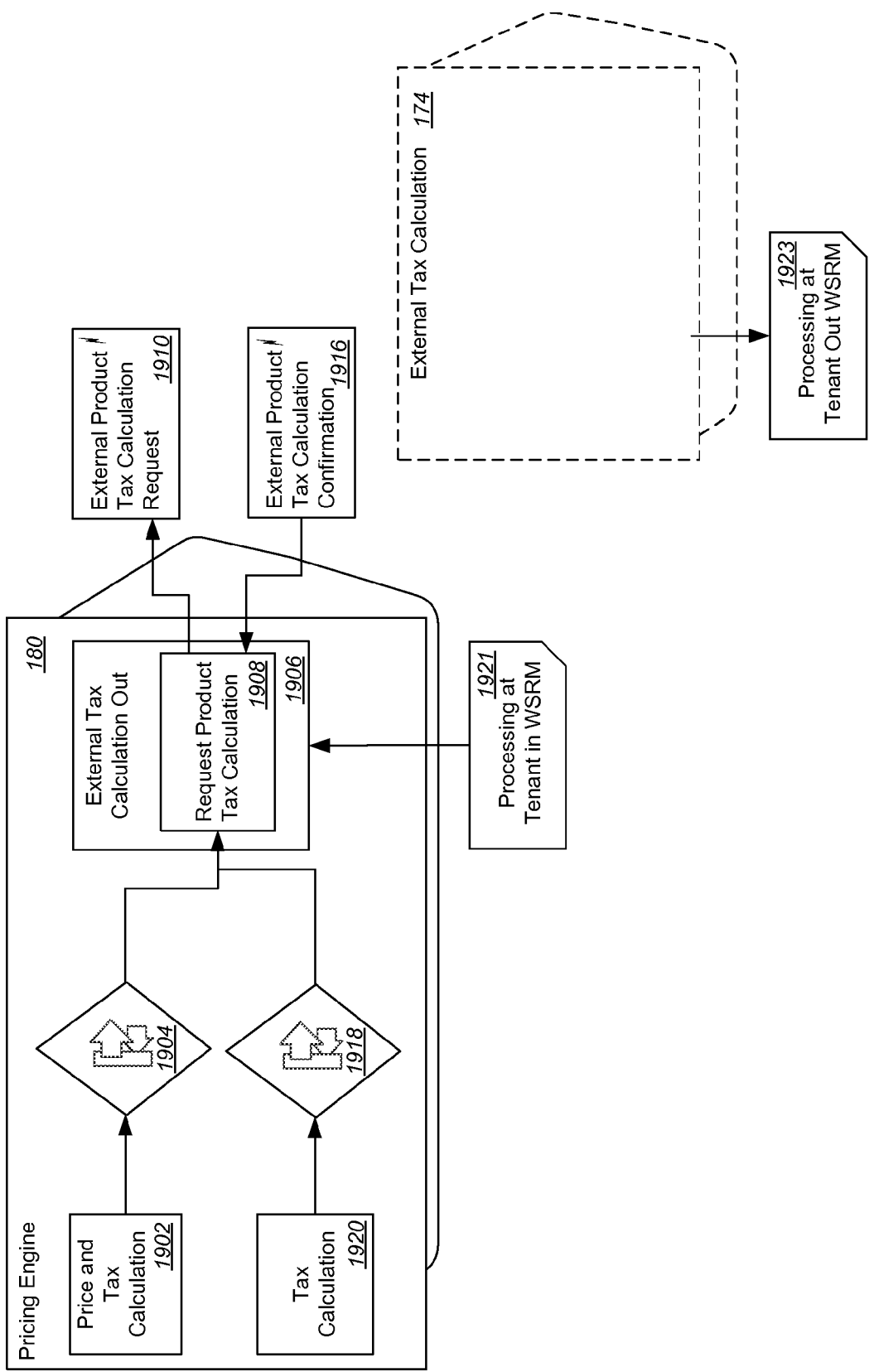
FIG. 19 is a block diagram showing interactions between a Pricing Engine process component and an External Tax Calculation process component.

FIG. 19 is a block diagram showing interactions between the Pricing Engine process component 180 and the External Tax Calculation process component 174 in the architectural design of FIGS. 1A and 1B. The interactions include requesting of tax calculations from the External Tax Calculation process component 174.

As shown in FIG. 19, the Pricing Engine process component 180 includes a Price and Tax Calculation business object 1902. The Price and Tax Calculation business object 1902 represents a summary of the determined price and tax components for a business case. The Price and Tax Calculation business object 1902 uses a Synchronous Request Product Tax Calculation from Price and Tax Calculation to External Tax Calculation synchronous outbound process agent 1904 to invoke a Request Product Tax Calculation operation 1908. The Request Product Tax Calculation operation 1908 is included in an External Tax Calculation Out interface 1906. The External Tax Calculation Out interface 1906 sends information to the External Tax Calculation process component 174 using a Processing at Tenant In WSRM communication channel template 1921.

The Pricing Engine process component 180 also includes a Tax Calculation business object 1920. The Tax Calculation business object 1920 represents a summarization of the determined and calculated tax elements of a business case. The Tax Calculation business object 1920 uses a Synchronous Request Product Tax Calculation from Tax Calculation to External Tax Calculation synchronous outbound process agent 1918 to invoke the Request Product Tax Calculation operation 1908.

The Request Product Tax Calculation operation 1908 can request product tax calculations from an external tax calculation system. In this example, the Request Product Tax Calculation operation 1908 sends an External Product Tax Calculation Request message 1910. The External Product Tax Calculation Request message 1910 is received by the External Tax Calculation process component 174.

In this example, the Request Product Tax Calculation operation 1908 receives an External Product Tax Calculation Confirmation message 1916 from the External Tax Calculation process component 174. The External Tax Calculation process component 174 sends information to the Pricing Engine process component 180 using a Processing at Tenant Out WSRM communication channel template 1923.

Interactions Between Process Components "External Procurement Trigger and Response" and "Purchase Order Processing"

Figure 20:
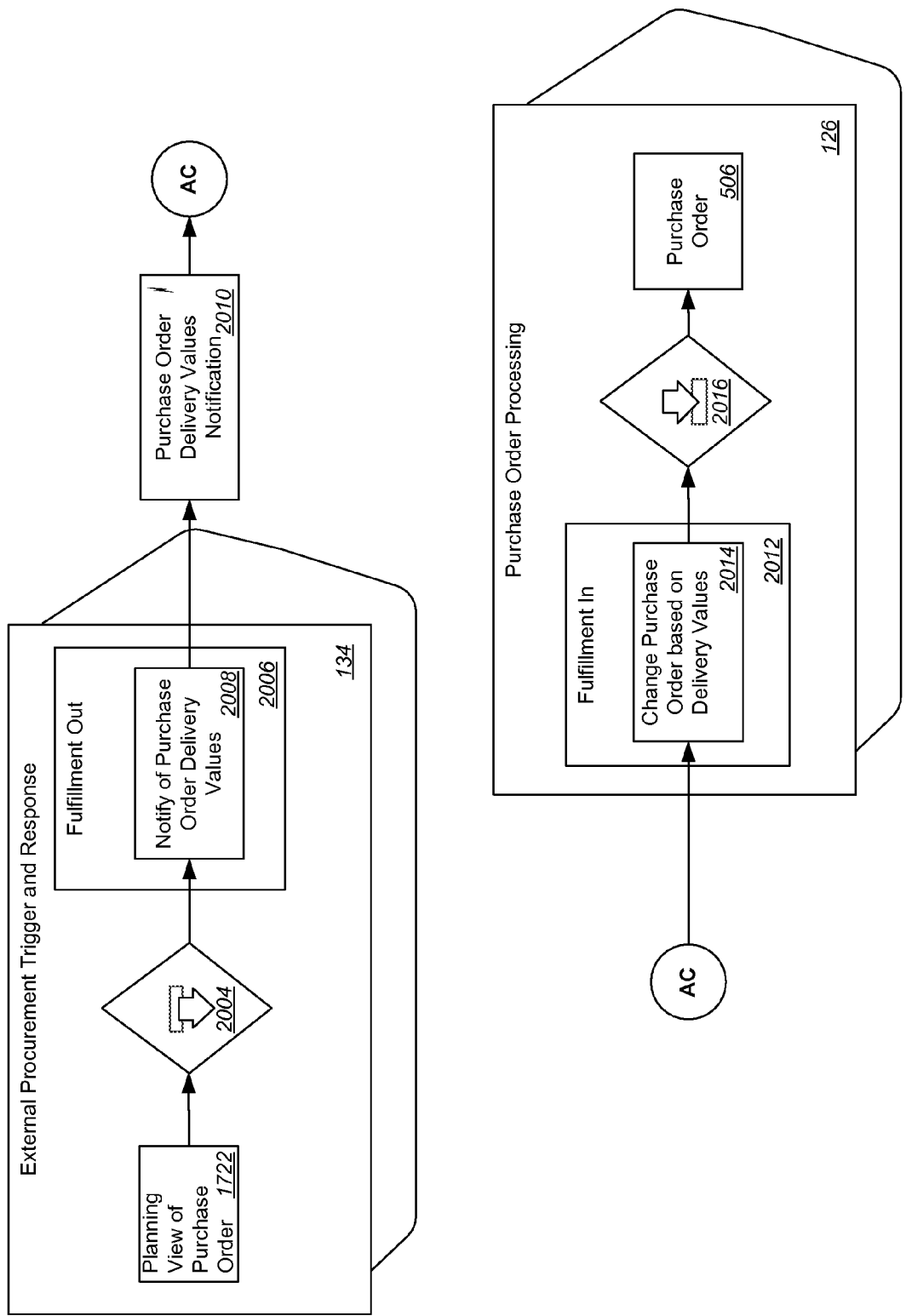
FIG. 20 is a block diagram showing interactions between an External Procurement Trigger and Response process component and a Purchase Order Processing process component.

FIG. 20 is a block diagram showing interactions between the External Procurement Trigger and Response process component 134 and the Purchase Order Processing process component 126 in the architectural design of FIGS. 1A and 1B. The interactions include requesting of the update of a purchase order with data about the fulfillment of the purchase order.

The External Procurement Trigger and Response process component 134 includes the Planning View of Purchase Order business object 1722. The Planning View of Purchase Order business object 1722 represents a planning view of materials, dates, quantities, delivery conditions, parties, and/or sources of supply of a purchase order that are relevant to planning. The Planning View of Purchase Order business object 1722 uses a Notify of Purchase Order Delivery Values from Planning View of Purchase Order to Purchase Order Processing outbound process agent 2004 to invoke a Notify of Purchase Order Delivery Values operation 2008 in a Fulfillment Out interface 2006. The outbound process agent 2004 can send Purchase Order Fulfillment data to purchasing when new inventories (e.g., a planning view) are posted.

The Notify of Purchase Order Delivery Values operation 2008 sends a Purchase Order Delivery Values Notification message 2010 to the Purchase Order Processing process component 126 to notify purchasing of the fulfillment of a purchase order.

A Change Purchase Order based on Delivery values operation 2014 receives the message 2010. The operation 2014 is included in a Fulfillment In interface 2012. The Change Purchase Order based on Delivery Values operation 2014 can change the Purchase Order business object 506 based on delivery values by adding the quantity of a confirmed inbound delivery to the cumulated delivered quantity in a node "Item Actual Values" of a purchase order. The operation 2104 can also add the reference to the confirmed inbound delivery document to the purchase order. In this example, the Change Purchase Order based on Delivery Values operation 2014 uses a Change Purchase Order based on Delivery Values inbound process agent 2016 to update the Purchase Order business object 506. The Purchase Order business object 506 represents a request from a buyer to a seller to deliver a specified quantity of material, or perform a specified service, at a specified price within a specified time.

Interactions Between Process Components "External Procurement Trigger and Response" and "Purchase Request Processing"

Figure 21:
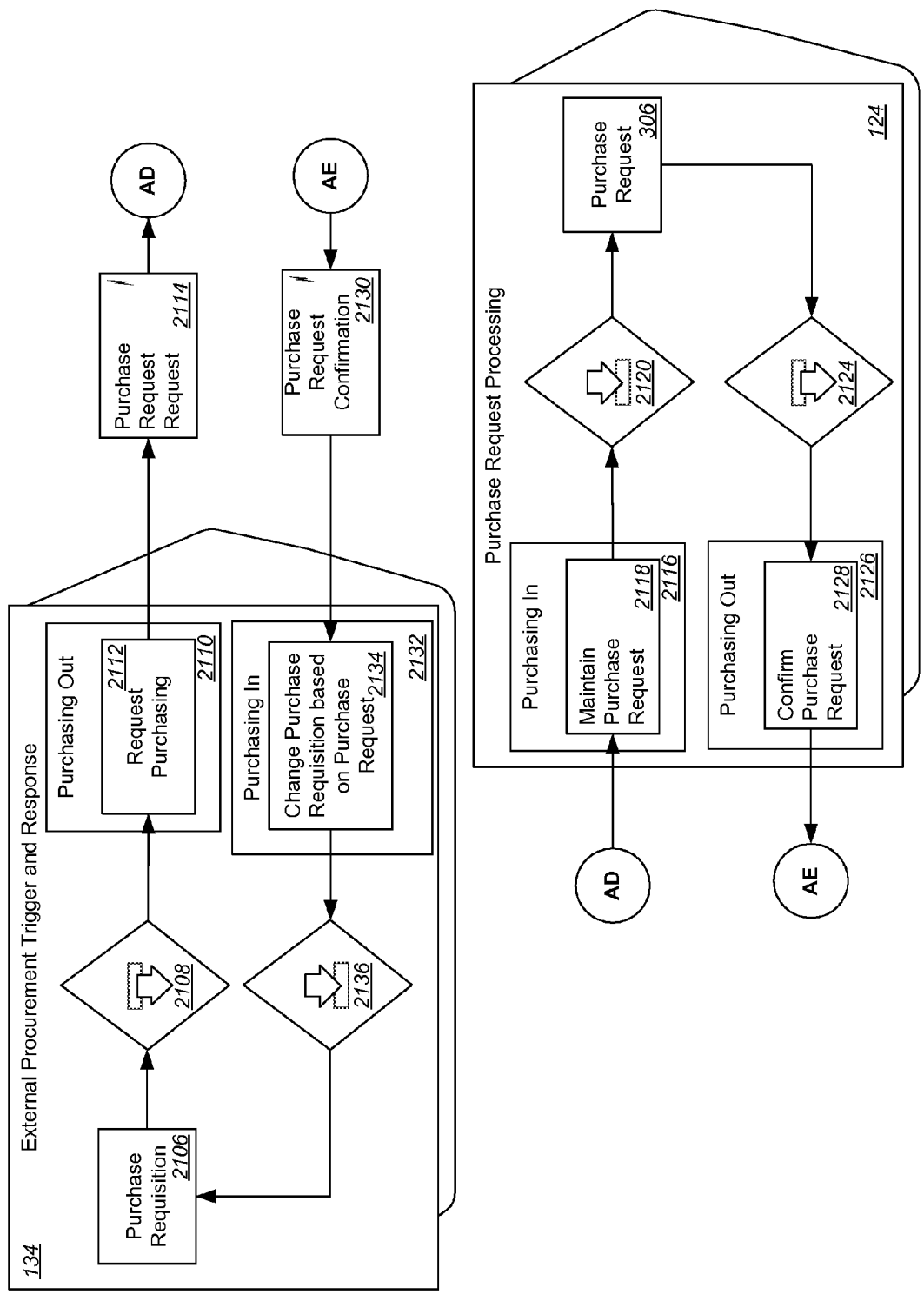
FIG. 21 is a block diagram showing interactions between an External Procurement Trigger and Response process component and a Purchase Request Processing process component.

FIG. 21 is a block diagram showing interactions between the External Procurement Trigger and Response process component 134 and the Purchase Request Processing process component 126 in the architectural design of FIGS. 1A and 1B. An interaction can begin when a purchase requisition is created. The interactions include requesting the creation of a purchase request triggered by the External Procurement Trigger and Response process component 134. The Purchase Request Processing process component 134 reports the creation of the purchase request back to the External Procurement Trigger and Response process component 124.

As shown in FIG. 21, the External Procurement Trigger and Response process component 134 includes a Purchase Requisition business object 2106. The Purchase Requisition business object 2106 represents a requisition to purchasing for the external procurement of materials planned in supply and demand matching. A purchase requisition is derived from the procurement planning order and describes which materials are to be procured in what quantities and at what time.

The Purchase Requisition business object 2106 uses a Request Purchasing from Purchase Requisition to Purchase Request Processing outbound process agent 2108 to send a new purchase requisition or changes of an existing purchase requisition to purchasing. The Request Purchasing from Purchase Requisition to Purchase Request Processing outbound process agent 2108 invokes a Request Purchasing operation 2112 in a Purchasing Out interface 2110 to request from a supply planner asking a buyer to procure products or services. The Request Purchasing operation 2112 sends a Purchase Request Request message 2114 to the Purchase Request Processing process component 124.

The Purchase Request Request message 2114 is received by a Maintain Purchase Request operation 2118 in a Purchasing In interface 2116. The Maintain Purchase Request operation 2118 can create or update a request from a requester to a purchaser to procure products (e.g., materials and/or services). The operation, 2118 can create or update the Purchase Request business object 306 using a Maintain Purchase Request inbound process agent 2120. The Purchase Request business object 306 represents a request to the purchasing department to prepare a request for quote.

An update to the Purchase Request business object 306 triggers a Confirm Purchase Request outbound process agent 2124. The outbound process agent 2124 invokes a Confirm Purchase Request operation 2128 that is included in a Purchasing Out interface 2126. The operation 2128 can confirm the creation, change, or cancellation of a purchase request to the requesting business object. The operation 2128 sends a Purchase Request Confirmation message 2130 to the External Procurement Trigger and Response process component 134.

A Change Purchase Requisition based on Purchase Request operation 2134 receives the message 2130. The operation 2134 is included in a Purchasing In interface 2132. The operation 2134 can confirm to the requester the extent to which a purchase requisition has been fulfilled. In this example, the Change Purchase Requisition based on Purchase Request operation 2134 updates the Purchase Request business object 2106 using a Change Purchase Requisition based on Purchase Request inbound process agent 2136.

Interactions Between Process Components "Site Logistics Processing" and "Accounting"

Figure 22:
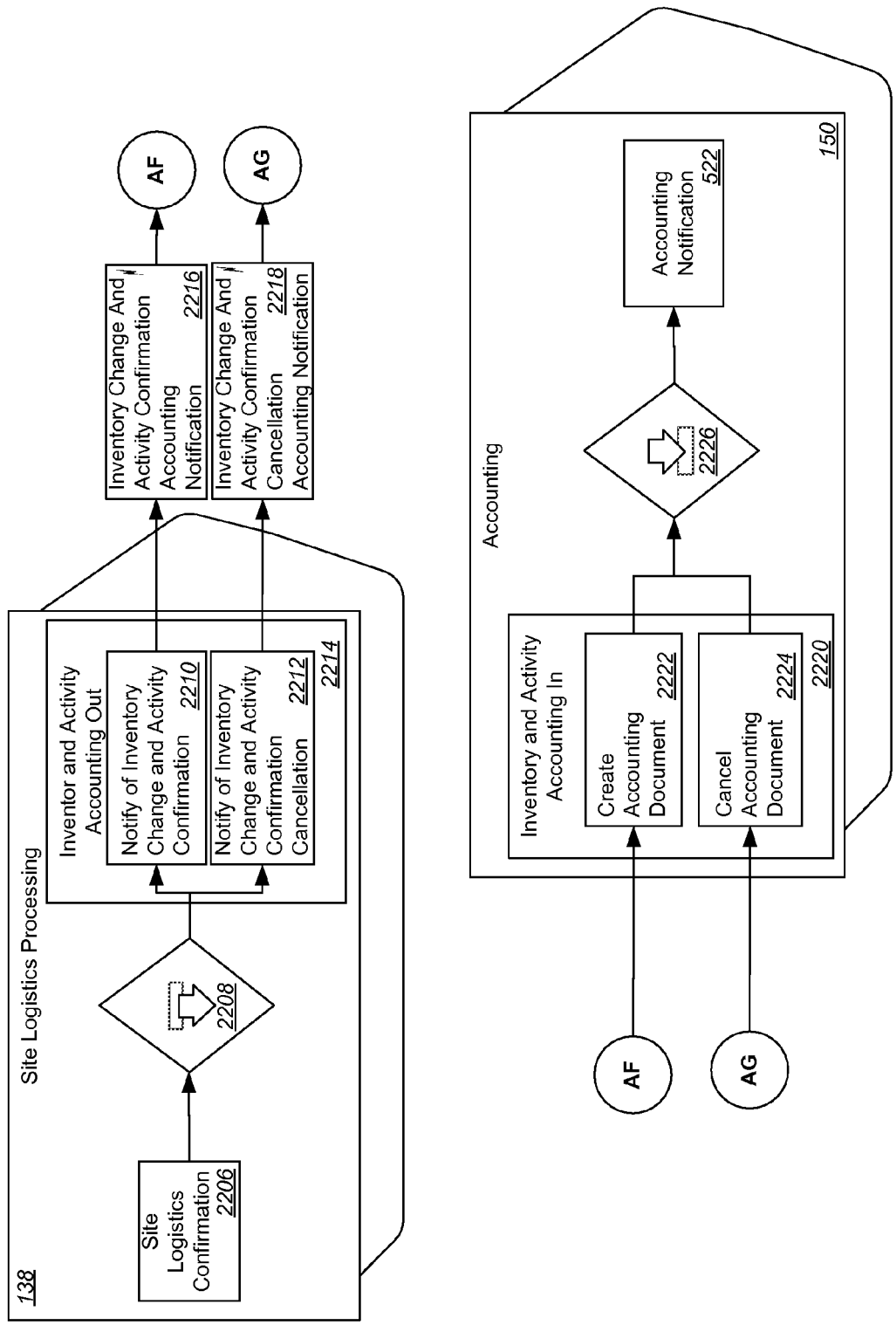
FIG. 22 is a block diagram showing interactions between a Site Logistics Processing process component and an Accounting process component.

FIG. 22 is a block diagram showing interactions between the Site Logistics Processing process component 138 and the Accounting process component 150 in the architectural design of FIGS. 1A and 1B. The interaction starts when a site logistics confirmation is created. The Site Logistics Processing process component 138 notifies the Accounting process component 150 of confirmed or cancelled inventory changes. The inventory changes are used to update the Accounting process component 150.

The Site Logistics Processing process component 138 includes a Site Logistics Confirmation business object 2206. The Site Logistics Confirmation business object 2206 represents a record of confirmed logistic process changes which result from the execution of a site logistics process at a specific time (e.g., inventory changes, plan adjustments, resource utilizations, or progress status changes).

The Site Logistics Confirmation business object 2206 uses a Notify of Inventory Change from Site Logistics Confirmation to Accounting outbound process agent 2208. The Accounting outbound process agent 2208 invokes a Notify of Inventory Change and Activity Confirmation operation 2210 to send an inventory change accounting notification to the Accounting process component 150. Alternatively, a Notify of Inventory Change and Activity Confirmation Cancellation operation 2212 can be invoked. The operation 2212 can request inventory change and activity provision cancellation. Both operations 2210, 2212 are included in an Inventory and Activity Accounting Out interface 2214.

If the Notify of Inventory Change and Activity Confirmation operation 2210 is invoked, then an Inventory Change and Activity Confirmation Accounting Notification message 2216 is sent to the Accounting process component 150. If the Notify of Inventory Change and Activity Confirmation Cancellation operation 2212 is invoked, then an Inventory Change and Activity Confirmation Accounting Cancellation Request message 2218 is sent to the Accounting process component 150.

If the notification message 2216 is received, then a Create Accounting Document operation 2222 is performed. The operation 2222 can receive and handle an inventory change accounting notification. If the cancellation message 2218 is received, then a Cancel Accounting Document operation 2224 is performed to cancel requests received. The operation 2224 can receive an inventory change accounting cancellation request. The operations 2222 and 2224 are included in an Inventory and Activity Accounting In interface 2220. Cancellations and updates can be sent by a Maintain Accounting Document based on Inventory and Activity inbound process agent 2226 to update the Accounting Notification business object 522. The Accounting Notification business object 522 represents a notification sent to Financial Accounting by an operational component regarding a business transaction.

Interactions Between Process Components "RFQ Processing" and "Purchase Order Processing"

Figure 23:
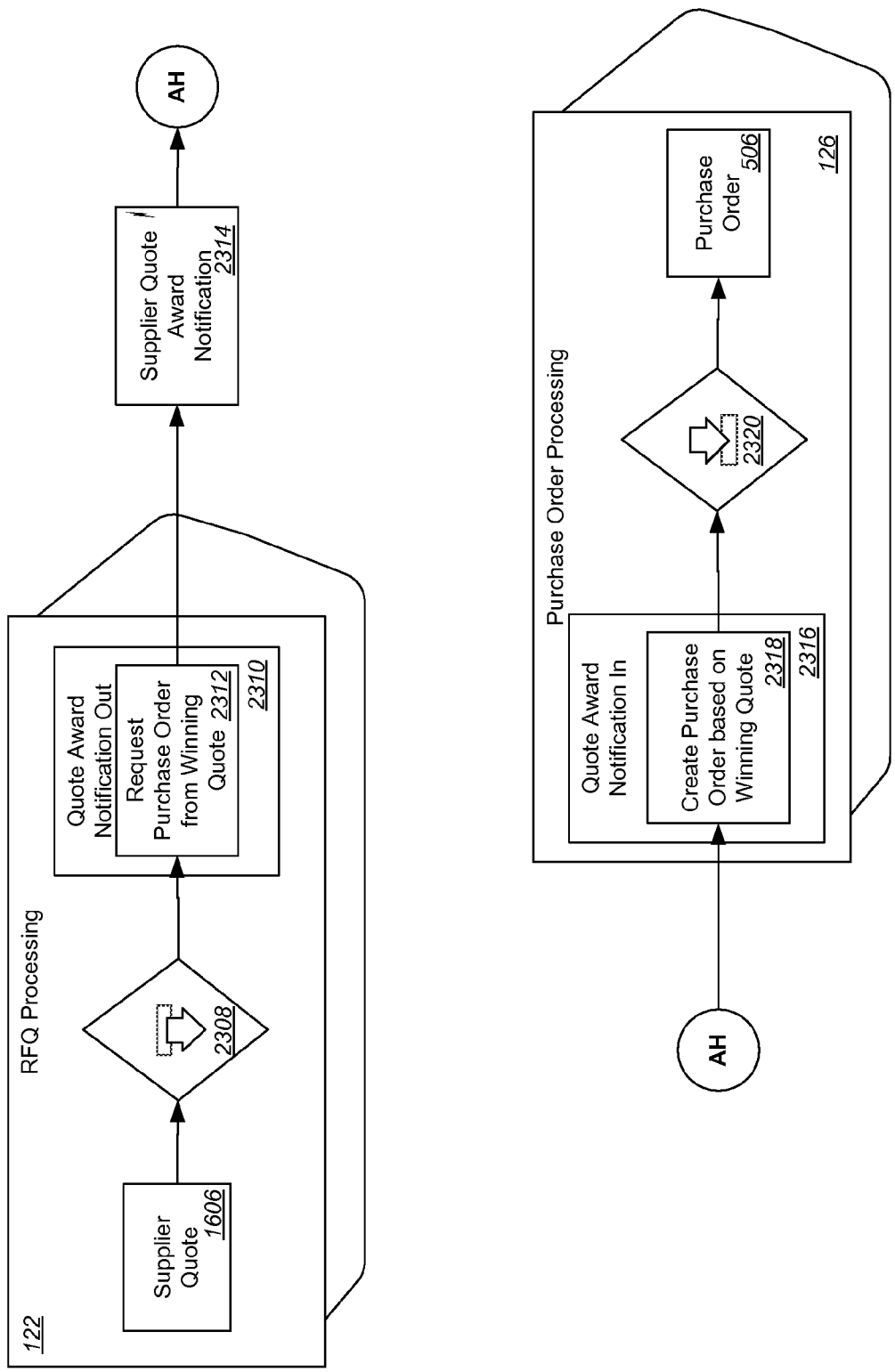
FIG. 23 is a block diagram showing interactions between an RFQ Processing process component and a Purchase Order Processing process component.

FIG. 23 is a block diagram showing interactions between the RFQ Processing process component 122 and the Purchase Order Processing process component 126 in the architectural design of FIGS. 1A and 1B. The interactions include requesting the creation of a purchase order based on a supplier quote in the Purchase Order Processing process component 126.

The RFQ Processing process component 122 includes the Supplier Quote business object 1606. The Supplier Quote business object 1606 represents a response to a quote request in which a bidder offers to sell goods and services to a buyer according to some requested criteria. An acceptance of the Supplier Quote business object 1606 triggers a Request Purchase Order from Supplier Quote to Purchase Order Processing outbound process agent 2308. The Request Purchase Order from Supplier Quote to Purchase Order Processing outbound process agent 2308 invokes a Request Purchase Order from Winning Quote operation 2312. The operation 2312 is included in a Quote Award Notification Out interface 2310. The Request Purchase Order from Winning Quote operation 2312 requests a purchase order based on the awarded respective winning supplier quote. The Request Purchase Order from Winning Quote operation 2312 sends a Supplier Quote Award Notification message 2314 to the Purchase Order Processing process component 126.

The Purchase Order Processing process component 126 includes a Create Purchase Order based on Winning Quote operation 2318 to receive the Supplier Quote Award Notification message 2314. The operation 2318 is included in a Quote Award Notification In interface 2316. The Create Purchase Order based on Winning Quote operation 2318 can create a purchase order based on the data contained in a winning supplier quote. For example, if the supplier quote refers to a purchase request, data from the purchase request items are added by the operation to complete the purchase order. The operation 2318 uses a Maintain Purchase Order based on Winning Quote inbound process agent 2320 to update the Purchase Order business object 506. The Purchase Order business object 506 represents a request from a buyer to a seller to deliver a specified quantity of material, or perform a specified service, at a specified price within a specified time.

Interactions Between Process Components "Supplier Invoice Processing" and "Accounting"

Figure 24:
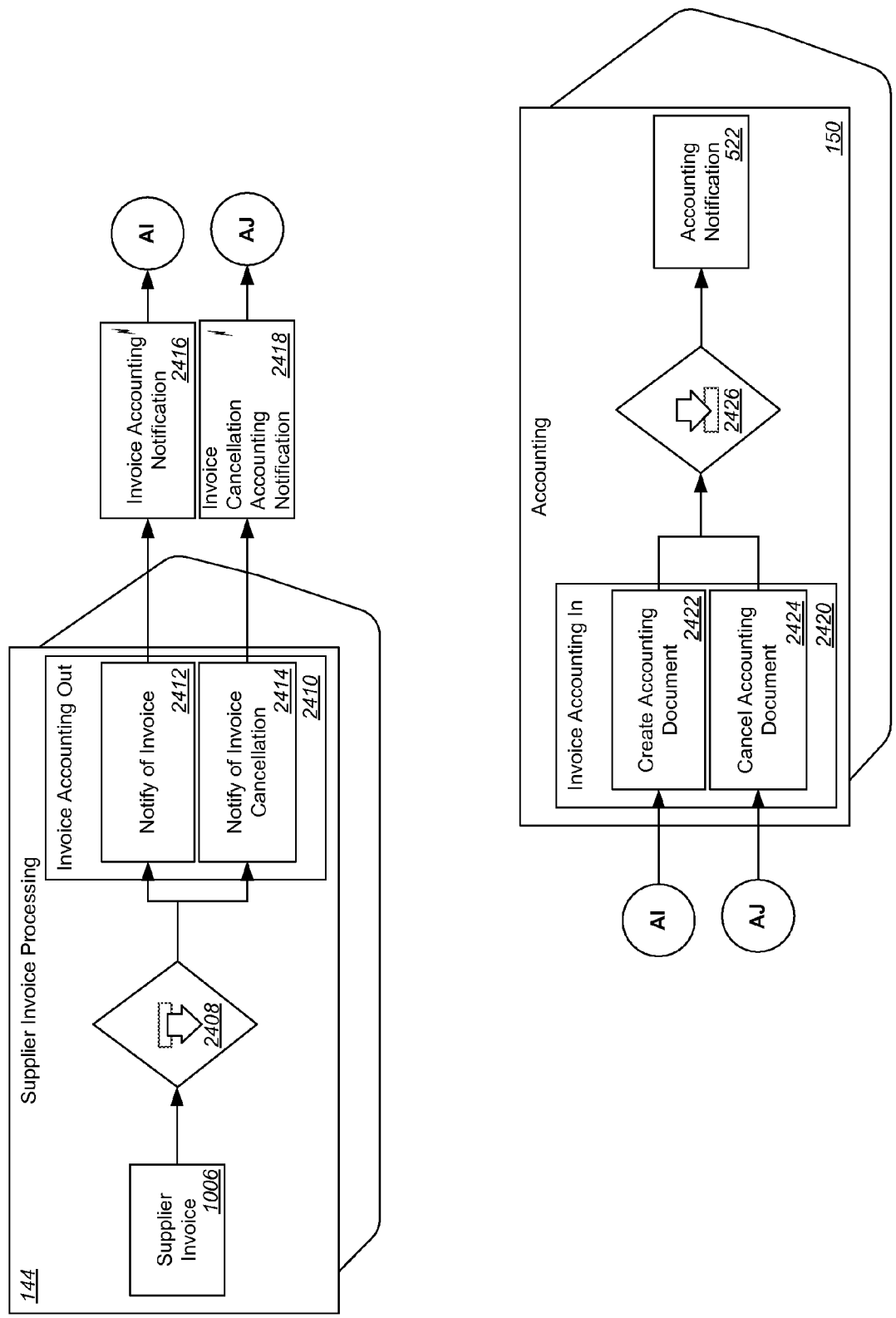
FIG. 24 is a block diagram showing interactions between a Supplier Invoice Processing process component and an Accounting process component.

FIG. 24 is a block diagram showing interactions between the Supplier Invoice Processing process component 144 and the Accounting process component 150 in the architectural design of FIGS. 1A and 1B. The interaction starts when a supplier invoice is created or cancelled. The Supplier Invoice Processing process component 144 requests the creation or cancellation of accounting documents from the Accounting process component 150.

As shown in FIG. 24, the Supplier Invoice Processing process component 144 includes the Supplier Invoice business object 1006. The Supplier Invoice business object 1006 represents a company's obligation to pay a supplier for delivered goods and services. The Supplier Invoice business object 1006 uses a Notify of Supplier Invoice to Accounting outbound process agent 2408 to notify accounting of the existence of the supplier invoice. For example, once the supplier invoice is posted to the system, the outbound processing agent 2408 sends a notification to accounting stating the supplier invoice has been posted.

The Supplier Invoice Processing process component 144 includes an Invoice Accounting Out interface 2410. The interface 2410 includes a Notify of Invoice operation 2412 and a Notify of Invoice Cancellation operation 2414. The Notify of Invoice operation 2412 can notify accounting about accounting-relevant data from a posted supplier invoice. The Notify of Invoice operation 2412 sends an Invoice Accounting Notification message 2416 to the Accounting process component 150. The Notify of Invoice Cancellation operation 2414 can notify accounting about accounting-relevant data from a previously posted supplier invoice that is canceled. The operation 2414 sends an Invoice Cancellation Accounting Notification message 2418.

The Accounting process component 150 includes an Invoice Accounting In interface 2420. The Invoice Accounting In interface 2420 includes a Create Accounting Document operation 2422 to receive the Invoice Accounting Notification message 2416. The operation 2422 can create an accounting document for the Supplier Invoice business object 1006. For example, the accounting document records payables, receivables, expenses, and revenues for the Invoice in the Accounting process component 150. The operation 2422 uses a Maintain Accounting Document based on Invoice inbound process agent 2426 to update the Accounting Notification business object 522.

The Invoice Accounting In interface 2420 also includes a Cancel Accounting Document operation 2424 to receive the Invoice Cancellation Accounting Notification message 2418. The operation 2424 uses the Maintain Accounting Document based on Invoice inbound process agent 2426 to cancel a customer or supplier invoice. The Maintain Accounting Document based on Invoice inbound process agent 2426 updates the Accounting Notification business object 522. The Accounting Notification business object 522 represents a notification sent to Financial Accounting by an operational component regarding a business transaction.

Interactions Between Process Components "Supplier Invoice Processing" and "Supplier Invoice Verification Exception Resolution at Processor"

Figure 25:
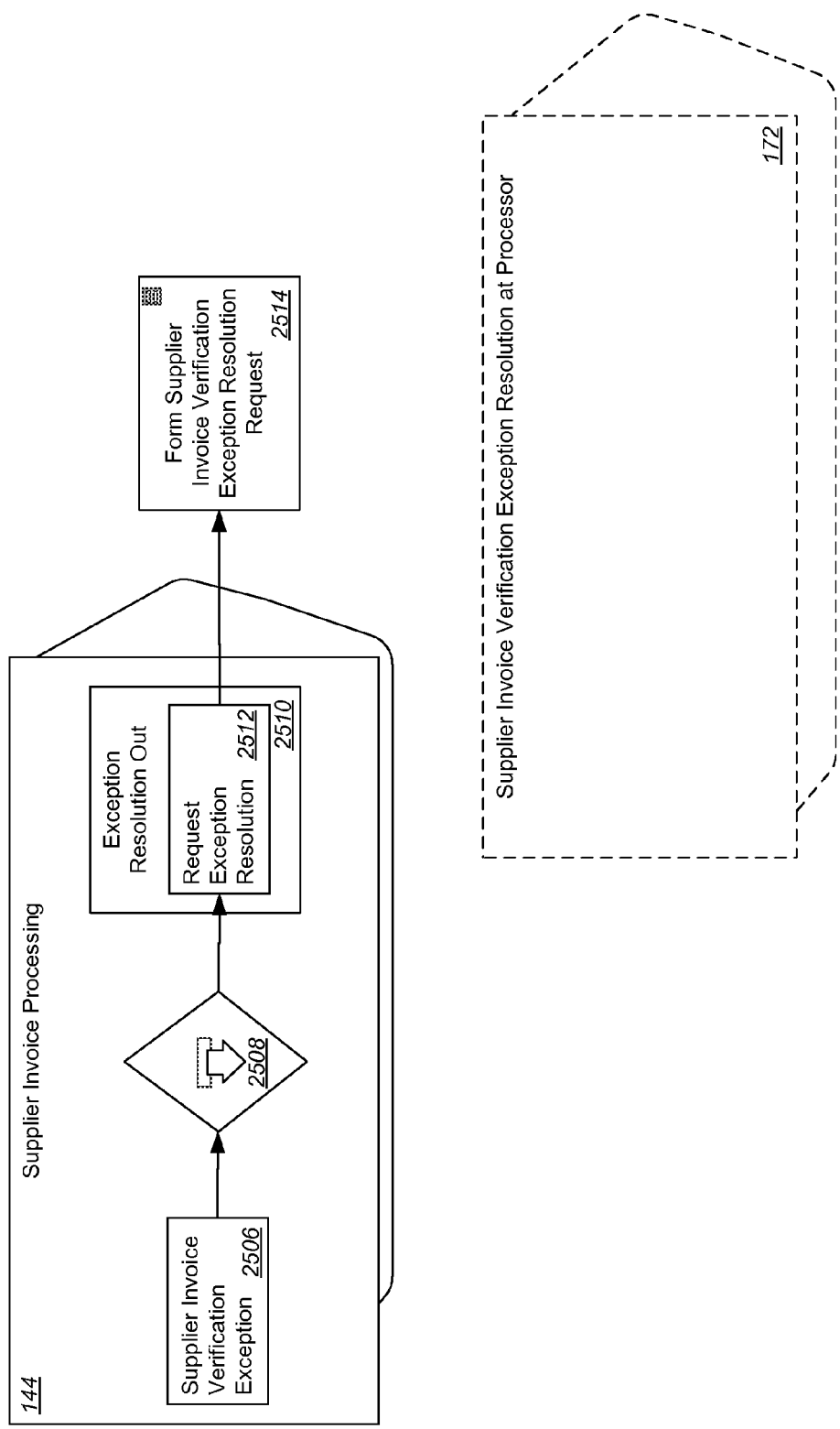
FIG. 25 is a block diagram showing interactions between a Supplier Invoice Processing process component and a Supplier Invoice Verification Exception Resolution at Processor process component.

FIG. 25 is a block diagram showing interactions between the Supplier Invoice Processing process component 144 and the Supplier Invoice Verification Exception Resolution at Processor process component 172 in the architectural design of FIGS. 1A and 1B. The interactions include requesting a clarification of a supplier invoice exception that occurred during invoice verification.

The Supplier Invoice Processing process component 144 includes a Supplier Invoice Verification Exception business object 2506. The Supplier Invoice Verification Exception business object 2506 represents a group of related issues arising during a supplier invoice verification process. In some implementations, these issues cause an exception to be bundled according to certain business criteria.

An update to the Supplier Invoice Processing process component 144 can trigger a Request Resolution from Supplier Invoice Verification Exception to Processor outbound process agent 2508. The Request Resolution from Supplier invoice Verification Exception to Processor outbound process agent 2508 invokes a Request Exception Resolution operation 2512 in an Exception Resolution Out interface 2510. The operation 2512 request the clarification of a supplier invoice verification exception from an external party. The Request Exception Resolution operation 2512 sends a Form Supplier Invoice Verification Exception Resolution Request form-based message 2514 to the Supplier Invoice Verification Exception Resolution at Processor process component 172.

Interactions Between Process Components "Outbound Delivery Processing at Supplier" and "Inbound Delivery Processing"

Figure 26:
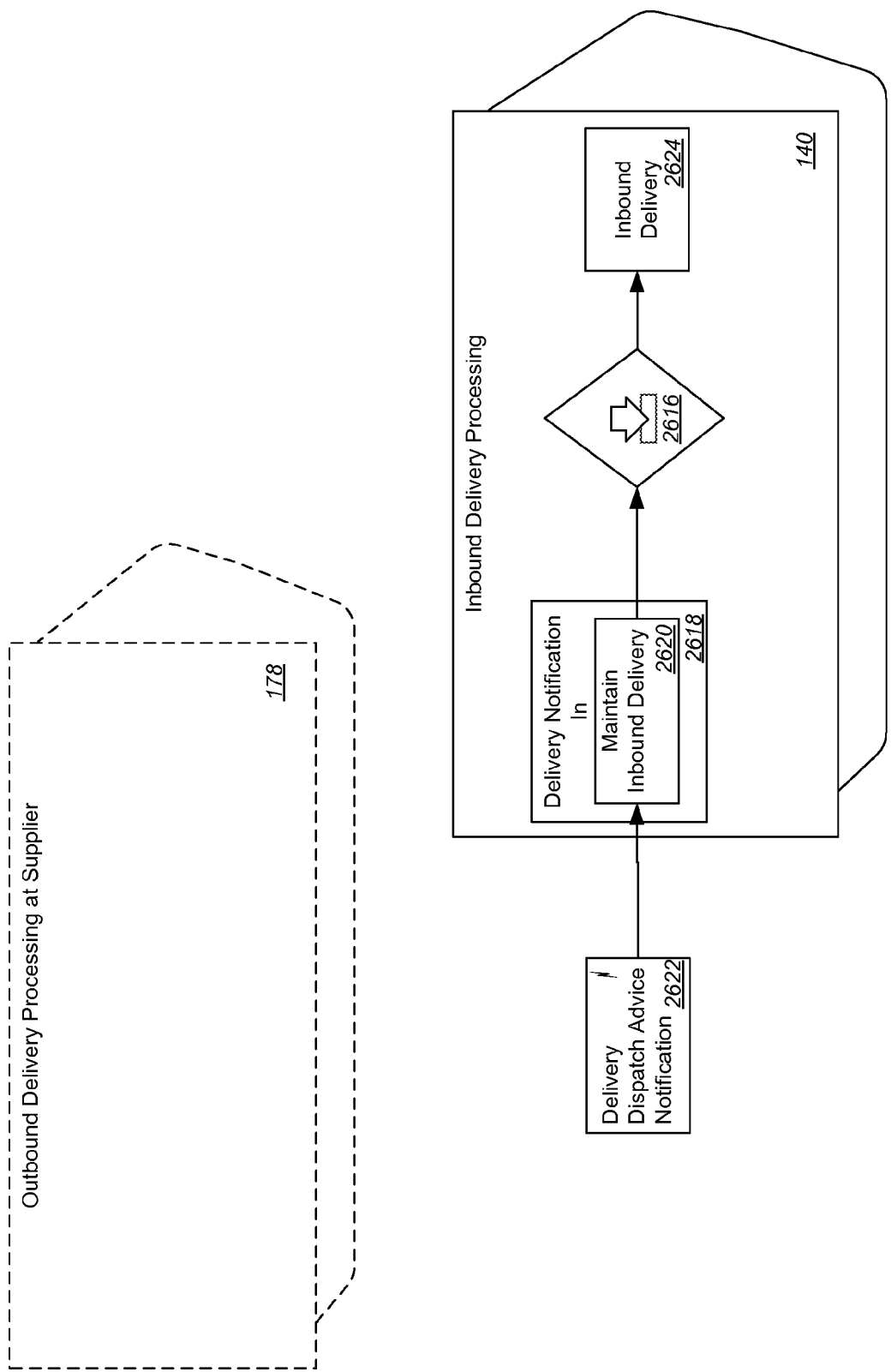
FIG. 26 is a block diagram showing interactions between an Outbound Delivery Processing at Supplier process component and an Inbound Delivery Processing process component.

FIG. 26 is a block diagram showing interactions between the Outbound Delivery Processing at Supplier process component 178 and the Inbound Delivery Processing process component 140 in the architectural design of FIGS. 1A and 1B.

As shown in FIG. 26, the Inbound Delivery Processing process component 140 includes a Delivery Notification In interface 2618. The Delivery Notification In interface 2618 includes a Maintain Inbound Delivery operation 2620. The operation 2620 can receive dispatched delivery notification from, for example, an Outbound Delivery Processing at Customer process component 178.

The Maintain Inbound Delivery operation 2620 receives a Delivery Dispatch Advice Notification message 2622 from the Outbound Delivery Processing at Supplier process component 178. The Maintain Inbound Delivery operation 2620 uses a Maintain Inbound Delivery inbound process agent 2616 to update an Inbound Delivery business object 2624. The Inbound Delivery business object 2624 represents a composition of the goods that is received by a product recipient.

Interactions Between Process Components "Inventory Processing" and "Supply and Demand Matching"

Figure 27:
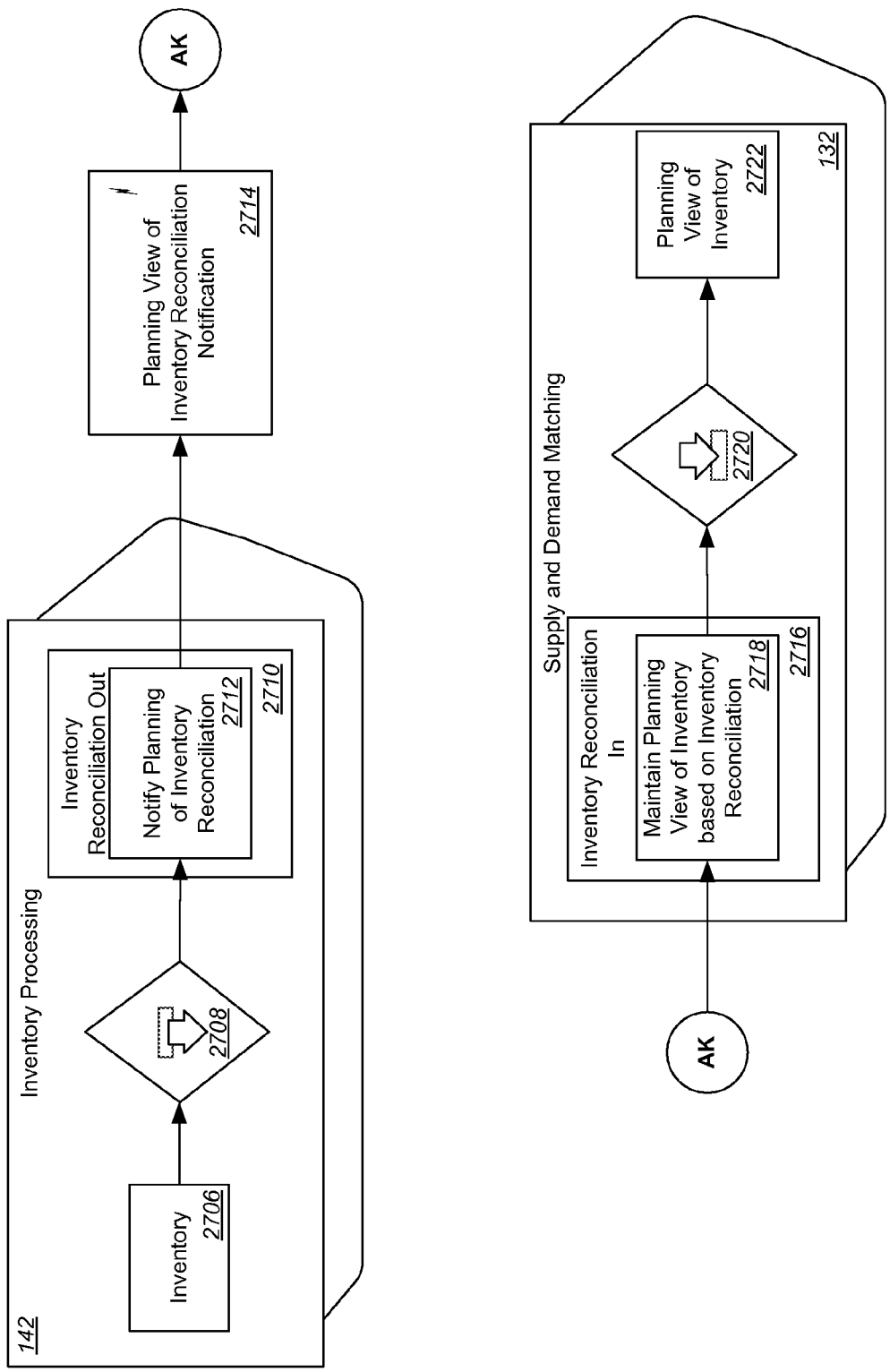
FIG. 27 is a block diagram showing interactions between an Inventory Processing process component and a Supply and Demand Matching process component.

FIG. 27 is a block diagram showing interactions between the Inventory Processing process component 142 and the Supply and Demand Matching process component 132 in the architectural design of FIGS. 1A and 1B. This interaction can be used for reconciling the actual quantities of the planning view of inventory in the Supply and Demand Matching process component 132 with the actual quantities of the original inventory in the Inventory Processing process component 142 if a deviation is detected.

As shown in FIG. 27, the Inventory Processing process component 142 includes an Inventory business object 2706. The Inventory business object 2706 represents a quantity of all the materials in a location including the material reservations at the location. For example, quantities of materials are physically grouped using Identified Logistic Units or Logistic Units.

The Inventory business object 2706 uses a Notify of Reconciliation from Inventory to Supply and Demand Matching outbound process agent 2708. The Notify of Reconciliation from Inventory to Supply and Demand Matching outbound process agent 2708 invokes a Notify Planning of Inventory Reconciliation operation 2712 in an Inventory Reconciliation Out interface 2710. For example, the operation 2712 notifies the Supply and Demand Matching process component 132 about the reconciliation of inventory quantities aggregated on a material and supply planning area level.

The Notify Planning of Inventory Reconciliation operation 2712 sends a Planning View of Inventory Reconciliation Notification message 2714 to the Supply and Demand Matching process component 132.

A Maintain Planning View of Inventory based on Inventory Reconciliation operation 2718 receives the Planning View of Inventory Reconciliation Notification message 2714. The operation 2718 is included in an Inventory Reconciliation in interface 2716. For example, the Maintain Planning View of Inventory based on Inventory Reconciliation operation 2718 carries out an absolute quantity update of a stock item disaggregated actual inventory quantity information that is mapped for a material and certain usability in a supply planning area, in a certain inventory managed location, and/or for certain identified stock in t the Supply and Demand Matching process component 132.

The Maintain Planning View of Inventory based on Inventory Reconciliation operation 2718 uses a Maintain Planning View of Inventory based on Inventory Reconciliation inbound process agent 2720 to update a Planning View of Inventory business object 2722. The Planning View of Inventory business object 2722 represents a view of a material stock aggregated at the level of the supply planning area.

Interactions Between Process Components "Demand Planning" and "Demand Forecast Processing"

Figure 28:
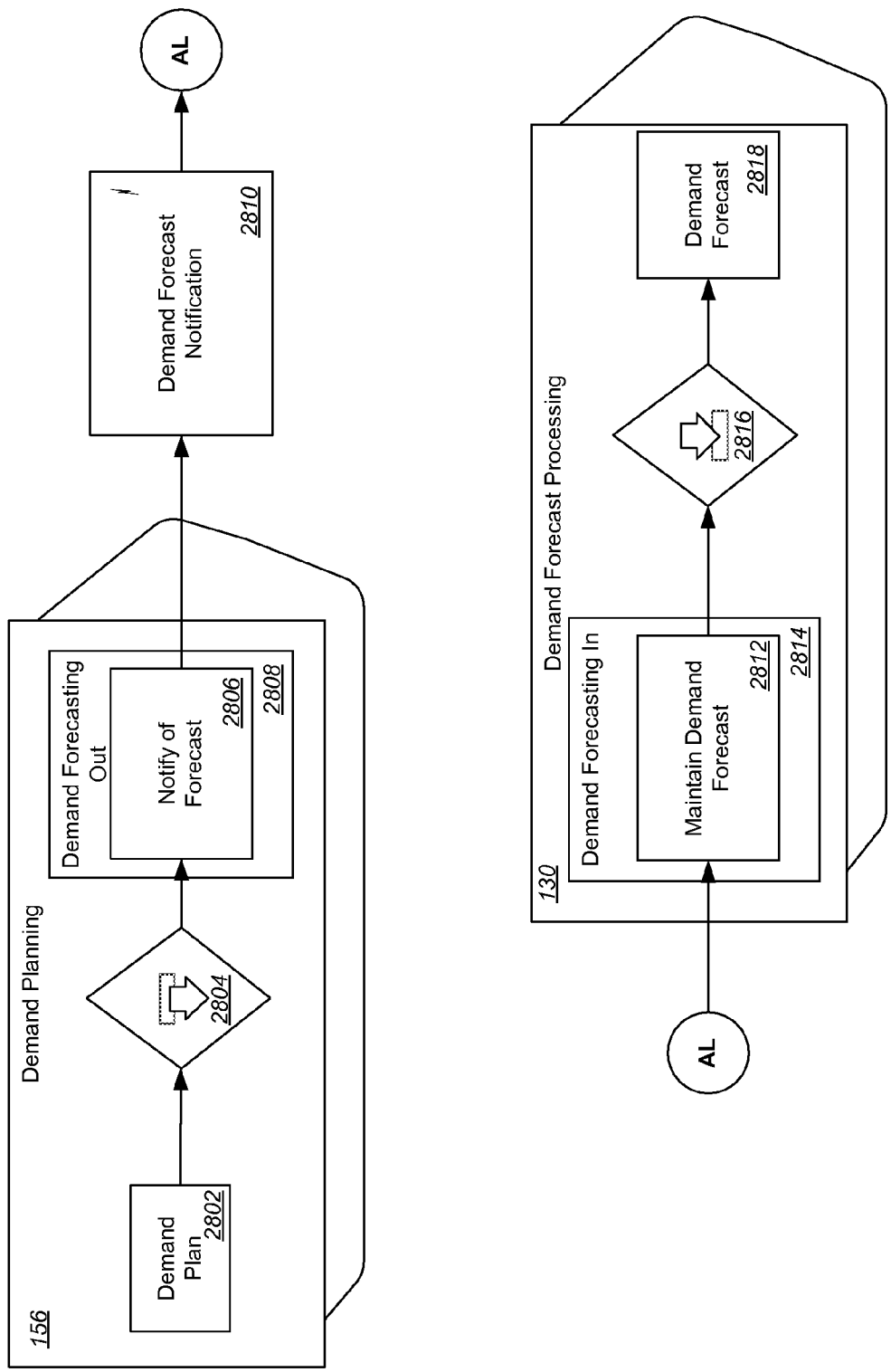
FIG. 28 is a block diagram showing interactions between a Demand Planning process component and a Demand Forecast Processing process component.

FIG. 28 is a block diagram showing interactions between the Demand Planning process component 156 and the Demand Forecast Processing process component 130 in the architectural design of FIGS. 1A and 1B. This interaction includes a notification of new or changed demand forecasts by demand planning.

As shown in FIG. 28, the Demand Planning process component 156 includes a Demand Plan business object 2802. The Demand Plan business object 2802 represents a collection of quantitative forecasts of the product demands within a planning period. These forecasts are generated as required, for example, at product, brand, or customer group level.

The Demand Plan business object 2802 uses a Notify of Forecast from Demand Planning to Demand Forecast Processing outbound process agent 2804. The Notify of Forecast from Demand Planning to Demand Forecast Processing outbound process agent 2804 invokes a Notify of Forecast operation 2806 in a Demand Forecasting Out interface 2808. For example, the operation 2806 sends current and deleted forecasts to the Demand Forecast Processing process component 130.

The Notify of Forecast operation 2806 sends a Demand Forecast Notification message 2810 to the Demand Forecast Processing process component 130. The Demand Forecast Processing process component 130 includes a Maintain Demand Forecast operation 2812 in the Demand Forecasting In interface 2814. The Maintain Demand Forecast operation 2812 receives the Demand Forecast Notification message 2810. The Maintain Demand Forecast operation 2812 creates, updates, and deletes the demand forecast object with the given forecast data. In this example, the Maintain Demand Forecast operation 2812 uses a Maintain Demand Forecast inbound process agent 2816 to update a Demand Forecast business object 2818. The Demand Forecast business object 2818 represents a forecast of a material demand in a particular supply planning area.

Interactions Between Process Components "Payment Processing" and "Payment Processing at Business Partner"

Figure 29:
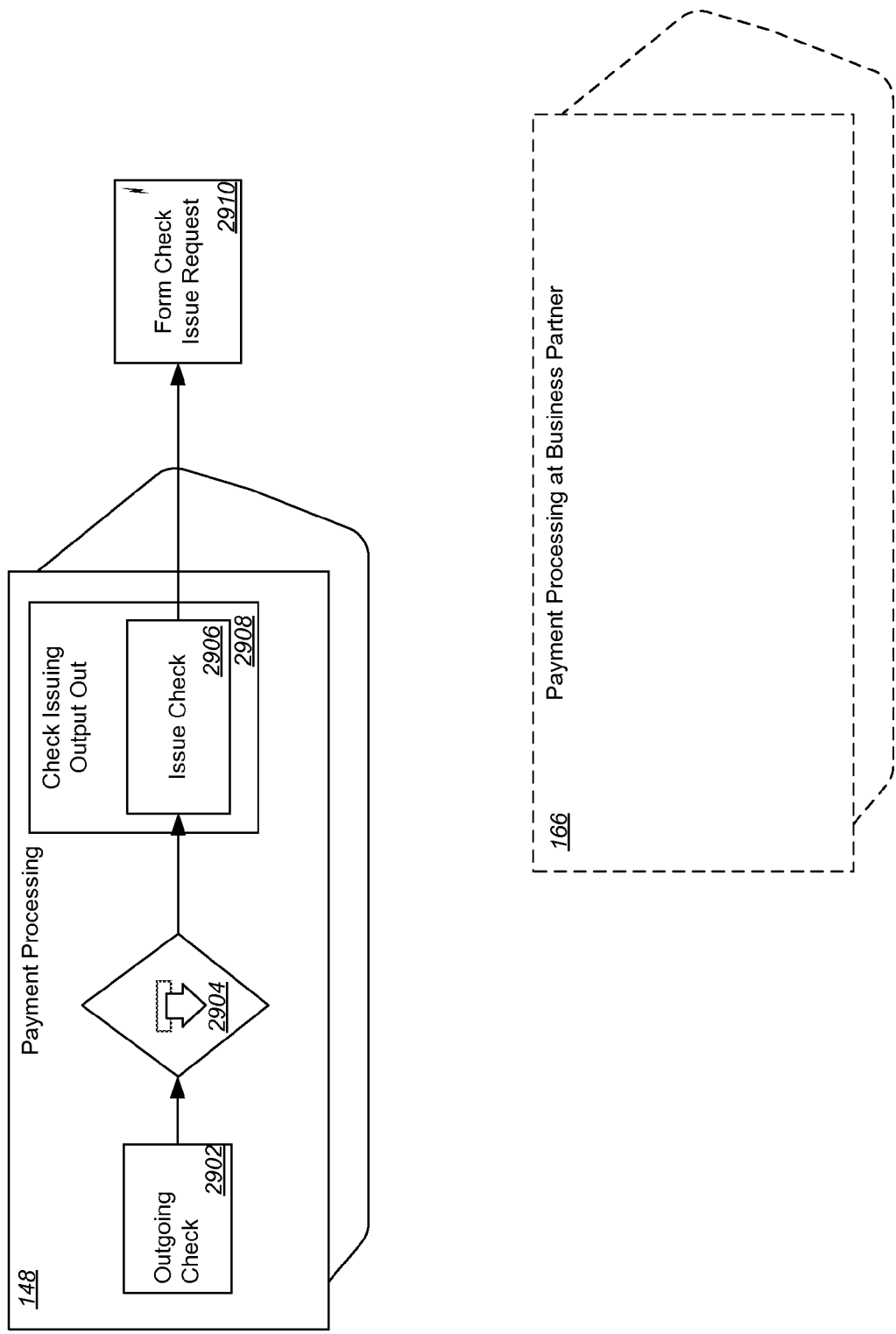
FIG. 29 is a block diagram showing further interactions between a Payment Processing process component and a Payment Processing at Business Partner process component.

FIG. 29 is a block diagram showing interactions between the Payment Processing process component 148 and the Payment Processing at Business Partner process component 166 in the architectural design of FIGS. 1A and 1B. The interaction starts with the creation of an outgoing check from a payment order within the Payment Processing process component 148. For example, the Payment Processing process component 148 prints an outgoing check that is to be sent to a business partner.

As shown in FIG. 29, the Payment Processing, process component 148 includes an Outgoing Check business object 2902. The Outgoing Check business object 2902 represents a check issued by a company payable to a business partner to fulfill a payment order. The Outgoing Check business object 2902 uses an Issue Check From Outgoing Check to Business Partner outbound process agent 2904. The Issue Check From Outgoing Check to Business Partner outbound process agent 2904 invokes an Issue Check operation 2906 in a Check Issuing Output Out interface 2908. For example, the operation 2906 sends current and deleted forecasts to the Payment Processing at Business Partner process component 166 to request an issuance of a check. In this example, the Issue Check operation 2906 sends a Form Check Issue Request message 2910 to the Payment Processing at Business Partner process component 166.

Interactions Between Process Components "Payment Processing" and "Payment Processing at Business Partner"

Figure 30:
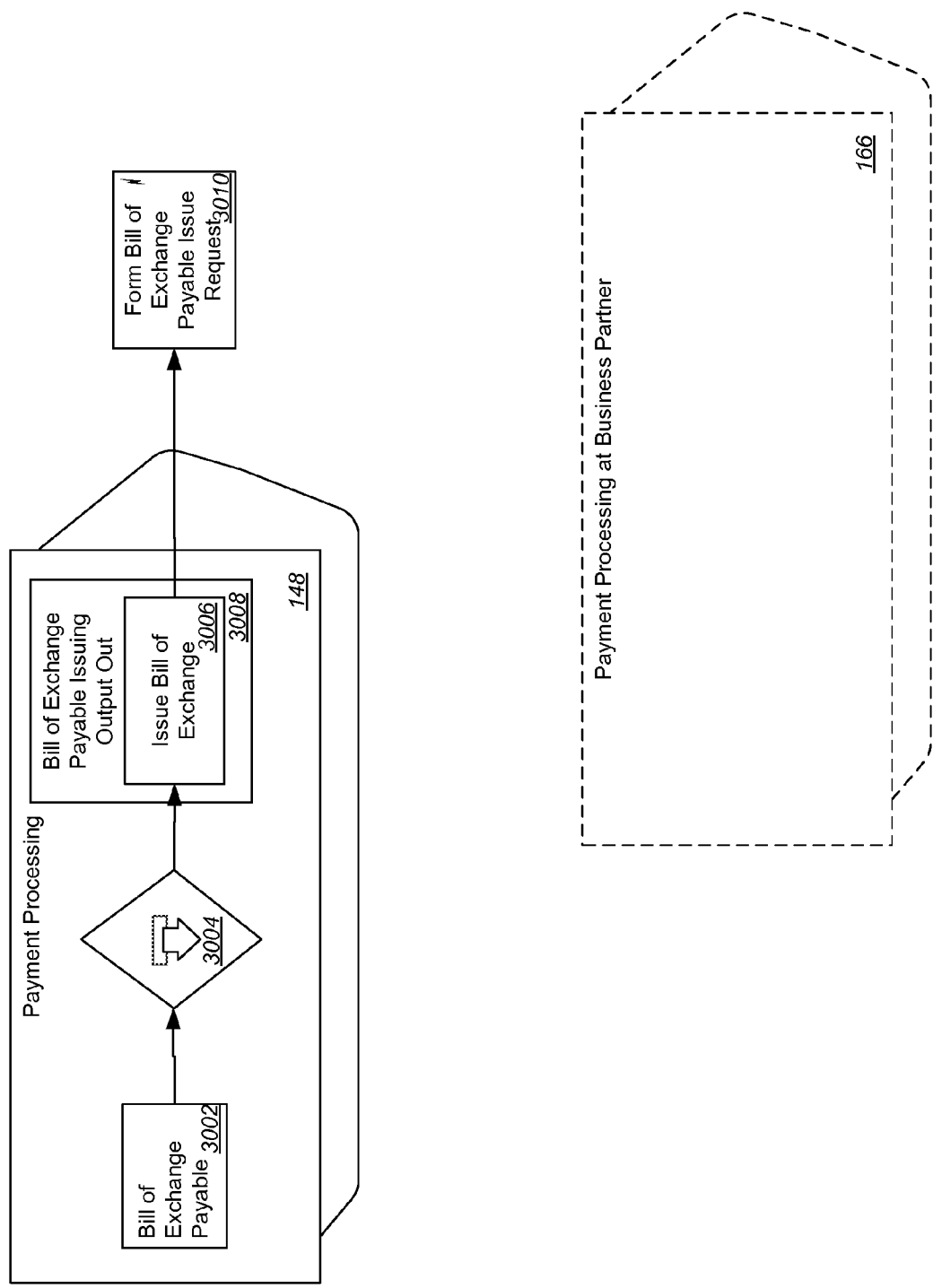
FIG. 30 is a block diagram showing further interactions between a Payment Processing process component and a Payment Processing at Business Partner process component.

FIG. 30 is a block diagram showing interactions between the Payment Processing process component 148 and the Payment Processing at Business Partner process component 166 in the architectural design of FIGS. 1A and 1B.

As shown in FIG. 30, the Payment Processing process component 148 includes a Bill of Exchange Payable business object 3002. The Bill of Exchange Payable business object 3002 represents a bill of exchange for an Outgoing payment. The Bill of Exchange Payable business object 3002 uses an Issue Bill Of Exchange Payable to Business Partner outbound process agent 3004. The Issue Bill Of Exchange Payable to Business Partner outbound process agent 3004 invokes an Issue Bill of Exchange operation 3006 in a Bill of Exchange Payable Issuing Output Out interface 3008. For example, the operation 3006 requests the issuing of a bill of exchange. The Issue Bill of Exchange operation 3006 sends a Form Bill of Exchange Payable Issue Request message 3010 to the Payment Processing at Business Partner process component 166.

Interactions Between Process Components "Site Logistics Processing" and "Site Logistics Processing"

Figure 31:
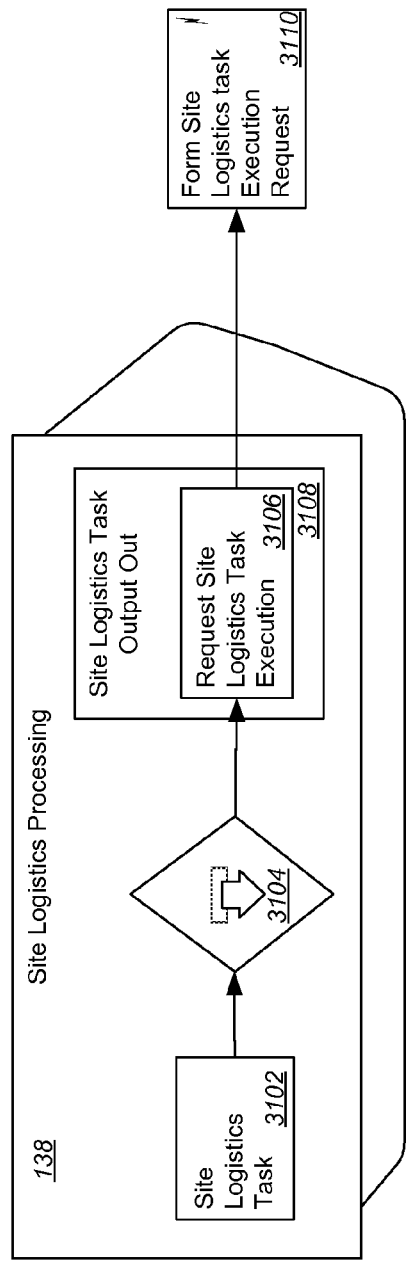
FIG. 31 is a block diagram showing interactions of a Site Logistics Processing process component.

FIG. 31 is a block diagram showing interactions within the Site Logistics Processing process component 138 in the architectural design of FIGS. 1A and 1B.

As shown in FIG. 31, the Site Logistics Processing process component 138 includes a Site Logistics Task business object 3102. The Site Logistics Processing business object 3102 represents a task for executing a logistics operation or activity within a site. For example, the Site Logistics Task business object 3102 represents a piece of work to be performed by a person or an automated system.

The Site Logistics Task business object 3102 uses a Request Site Logistics Task Execution for Output outbound process agent 3104 to request printing of a site logistics task list. The Request Site Logistics Task Execution for Output outbound process agent 3104 invokes a Request Site Logistics Task Execution operation 3106 in a Site Logistics Task Output Out interface 3108. For example, the operation 3106 requests the printing of site logistics task instructions. The Request Site Logistics Task Execution operation 3106 sends a Form Site Logistics Task Execution Request message 3110.

Interactions Between Process Components "Site Logistics Processing" and "Supply and Demand Matching"

Figure 32:
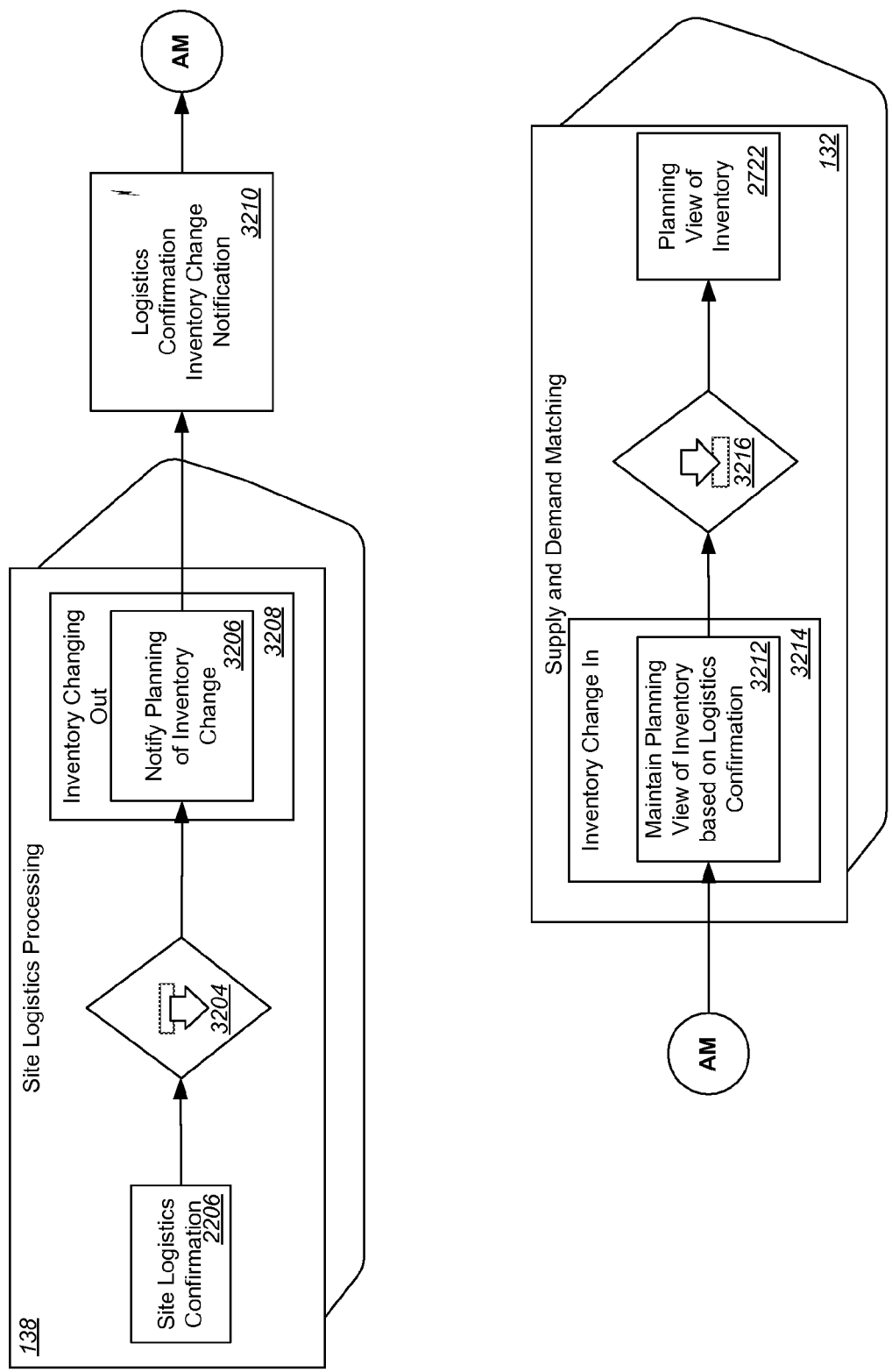
FIG. 32 is a block diagram showing interactions between a Site Logistics Processing process component and a Supply and Demand Matching process component.

FIG. 32 is a block diagram showing interactions between the Site Logistics Processing process component 138 and the Supply and Demand Matching process component 132 in the architectural design of FIGS. 1A and 1B. This interaction includes an updating of the planning view on inventory in the Supply and Demand Matching process component 132 based on inventory changes in the Site Logistics Processing process component 138.

As shown in FIG. 32, the Site Logistics Processing process component 138 includes the Site Logistic Confirmation business object 2206. The Site Logistics Confirmation business object 2206 represents a record of confirmed logistic process changes which result from the execution of a site logistics process at a specific time (e.g., inventory changes, plan adjustments, resource utilizations, or progress status changes).

The Site Logistic Confirmation business object 2206 uses a Notify Of Inventory Change From Site Logistic Confirmation To Supply And Demand Matching outbound process agent 3204. The Notify Of Inventory Change From Site Logistic Confirmation To Supply And Demand Matching outbound process agent 3204 invokes a Notify of Inventory Change operation 3206 in a Inventory Changing Out interface 3208. For example, the operation 3206 sends inventory change planning notifications to the Supply and Demand Matching process component 132.

In this example, the Notify of Inventory Change operation 3206 sends a Logistics Confirmation Inventory Change Notification message 3210 to the Supply and Demand Matching process component 132. The Supply and Demand Matching process component 132 includes a Maintain Planning View of Inventory based on Logistics Confirmation operation 3212 in a Inventory Changing In interface 3214. For example, the operation 3212 maintains planning view of inventory based on logistics confirmation for a relative quantity change to an inventory item, disaggregated actual inventory quantity information that is mapped for a material and certain usability in a supply planning area, in a certain inventory managed location, and for certain identified stock in the Supply and Demand Matching process component 132.

In this example, the Maintain Planning View of Inventory based on Logistics Confirmation operation 3212 receives the Logistics Confirmation Inventory Change Notification message 3210 and uses a Maintain Planning View of Inventory based on Logistics Confirmation inbound process agent 3216 to update the Planning View of inventory business object 2722. The Planning View of Inventory business object 2722 represents a view of a material stock aggregated at the level of the supply planning area.

Interactions Between Process Components "Site Logistics Processing" and "Logistics Execution Control"

Figure 33:
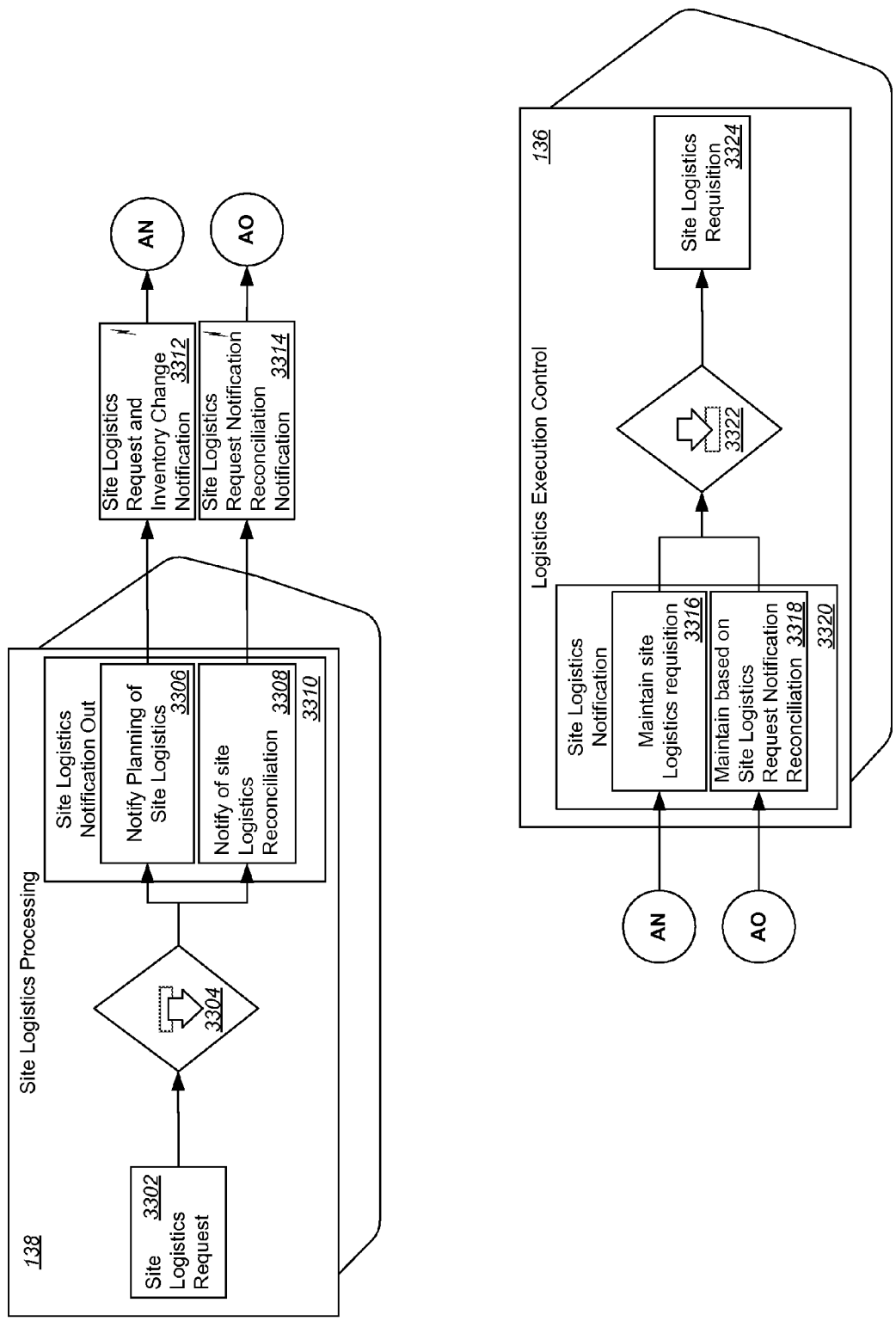
FIG. 33 is a block diagram showing interactions between a Site Logistics Processing process component and a Logistics Execution Control process component.

FIG. 33 is a block diagram showing interactions between the Site Logistics Processing process component 138 and the Logistics Execution Control process component 136 in the architectural design of FIGS. 1A and 1B. The interactions include requesting the creation of a site logistics requisition in the Logistics Execution Control process component 138 when a site logistics request is created from an inbound delivery, and updating of a site logistics requisition with the confirmation data and inventory changes from the site logistics request. In addition, the notification of a reconciliation of a site logistics request to the Logistics Execution Control process component 136 which reconciles the site logistics requisition with its related site logistics request.

The Site Logistics Processing process component 138 includes a Site Logistics Request business object 3302. The Site Logistics Request business object 3302 represents an internal request for site logistics to prepare and perform, within a certain time period, an outbound, inbound, or internal site logistics process.

The Site Logistics Request business object 3302 uses a Notify of Site Logistics Request to Logistics Execution Control outbound process agent 3304 to notify the Logistics Execution Control process component 136 of the creation of a site logistics request or the update of a site logistics request. The outbound process agent 3304 can also notify the Logistics Execution Control process component 136 of the reconciliation of a site logistics. The Notify of Site Logistics Request to Logistics Execution Control outbound process agent 3304 invokes a Notify Planning of Site Logistics operation 3306 and/or a Notify of Site Logistics Reconciliation operation 3308. Both operations 3306 and 3308 are included in a Site Logistics Notification Out interface 3310. The Notify Planning of Site Logistics operation 3306 can notify the Logistics Execution Control process component 136 about the creation of a new site logistics request and to create a site logistics requisition or update relevant inventory changes in an existing site logistics requisition. The Notify of Site Logistics Reconciliation operation 3308 can notify the planning system of a reconciliation of a site logistics request.

In this example, the Notify Planning of Site Logistics operation 3306 and the Notify of Site Logistics Reconciliation operation 3308 send a Site Logistics Request And Inventory Change Notification message 3312 and a Site Logistics Request Notification Reconciliation Notification message 3314, respectively, to the Logistics Execution Control process component 136.

The Logistics Execution Control process component 136 includes a Maintain Site Logistics Requisition operation 3316 and a Maintain based on Site Logistics Request Notification Reconciliation operation 3318 to receive the messages 3312 and 3314. Both operations 3316 and 3318 are included in a Site Logistics Notification In Interface 3320. The Maintain Site Logistics Requisition operation 3316 can create or update a site logistics requisition with relevant inventory changes from a site logistics request. The Maintain based on Site Logistics Request Notification Reconciliation operation 3318 can reconcile a site logistics requisition with its related site logistics request.

In this example, the Maintain Site Logistics Requisition operation 3316 receives the Site Logistics Request and Inventory Change Notification message 3312. The Maintain Site Logistics Requisition operation 3316 uses a Maintain Site Logistics Requisition based on Site Logistics Request Notification inbound process agent 3322 to update a Site Logistics Requisition business object 3324. For example, the inbound process agent 3322 performs the creation or updating of a site logistics requisition. The inbound process agent 3322 can also perform the reconciliation of a site logistics requisition. In this example, the Maintain based on Site Logistics Request Notification Reconciliation operation 3318 receives the Site Logistics Request Notification Reconciliation Notification message 3314. The operation 3318 uses the Maintain Site Logistics Requisition based on Site Logistics Request Notification inbound process agent 3322 to update the Site Logistics Requisition business object 3324. The Site Logistics Requisition business object 3324 represents a request to the Logistics Execution to execute a site logistics process for a certain quantity of material, by a certain time.

Interactions Between Process Components "Supplier Invoice Processing" and "Customer Invoice Processing at Supplier"

Figure 34:
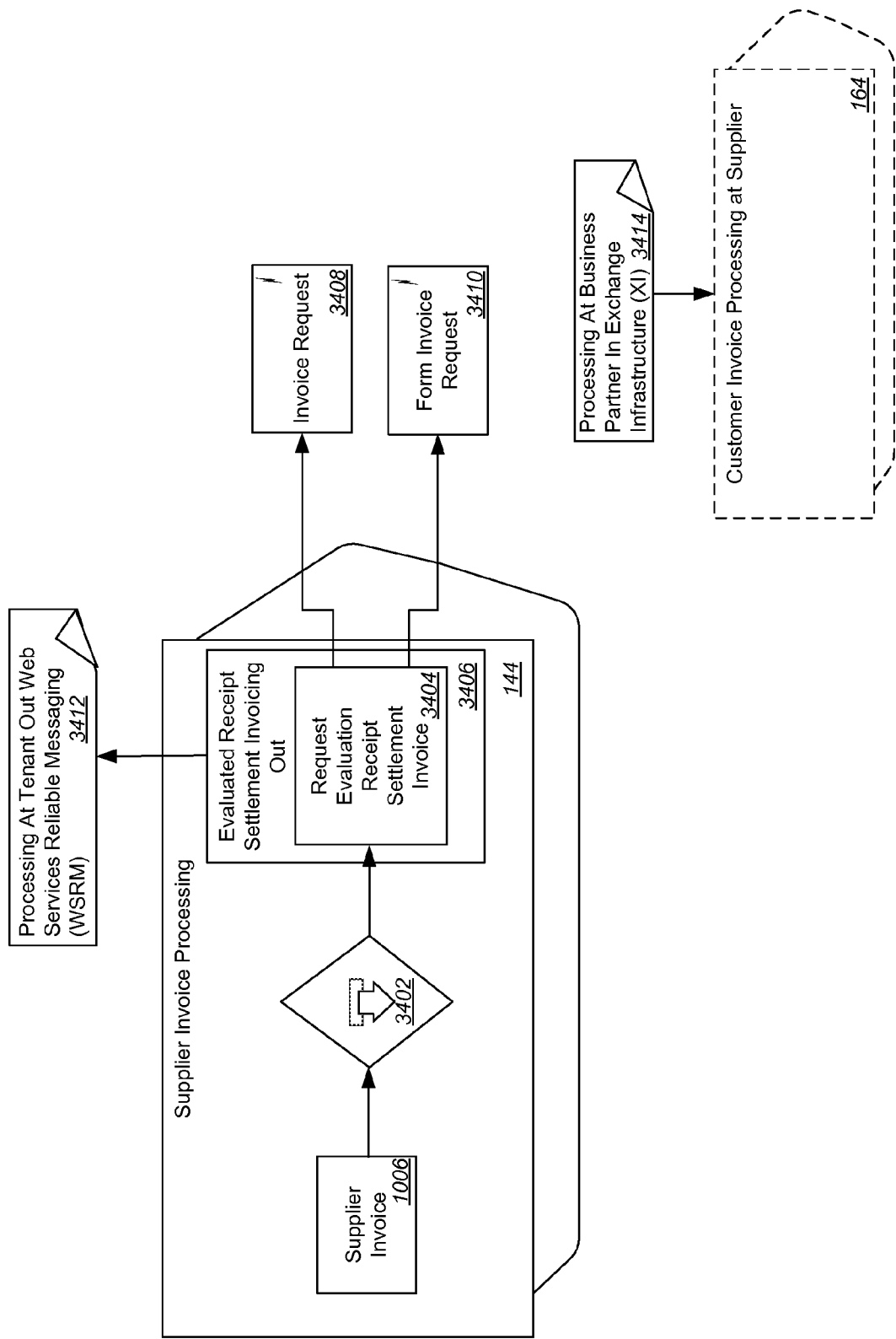
FIG. 34 is a block diagram showing interactions between a Supplier Invoice Processing process component and a Customer Invoice at Supplier process component.

FIG. 34 is a block diagram showing interactions between the Supplier Invoice Processing process component 144 and the Customer Invoice Processing at Supplier process component 164 in the architectural design of FIGS. 1A and 1B. The interactions include requesting the creation of a customer invoice based on the data from an invoice that is automatically created by evaluated receipt settlement in the Supplier Invoice Processing process component 144.

As shown in FIG. 34, the Supplier Invoice Processing process component 144 includes the Supplier Invoice business object 1006. The Supplier Invoice business object 1006 represents a company's obligation to pay a supplier for delivered goods and services. For example, if the company returns goods or complains about services, the supplier usually issues a credit memo for an amount equal to, or lower than the original invoice, and refunds the money to the company. For invoiced goods that require a duty, a customs duty invoice can be submitted by the customs authority, stating a company's obligation to pay tax on the import or export of goods.

The Supplier Invoice business object 1006 uses a Request Evaluated Receipt Settlement (ERS) Invoice to Supplier outbound process agent 3402. The Request ERS Invoice to Supplier outbound process agent 3402 invokes a Request Evaluation Receipt Settlement Invoice operation 3404 in an Evaluated Receipt Settlement Invoicing Out interface 3406. For examples the operation 3404 informs the seller party about a supplier invoice created by the buyer party using the credit memo procedure (e.g., an evaluated receipt settlement). The Supplier Invoice Processing process component 144 sends information to the Customer Invoice Processing at Supplier process component 164 using a Processing At Tenant Out Web Services Reliable Messaging (WSRM) communication channel template 3412. The Evaluated Receipt Settlement Invoicing Out interface 3406 sends information to the Customer Invoice Processing at Supplier process component 164 using the Processing At Tenant Out Web Services Reliable Messaging (WSRM) communication channel template 3412. The communication channel template 3412 can define protocols and parameters used for communication with an external party.

The Request Evaluation Receipt Settlement Invoice operation 3404 can send an Invoice Request message 3408 and/or a Form Invoice Request message 3410 to the Customer Invoice Processing at Supplier process component 164. The Customer Invoice Processing at Supplier process component 164 receives information from the Supplier Invoice Processing process component 144 using a Processing At Business Partner In XI communication channel template 3414. The Processing At Business Partner In Exchange Infrastructure (XI) communication channel template 3414 can define protocols and parameters used for communication with an external party.

Interactions Between Process Components "Supplier Invoice Processing" and "Balance of Foreign Payment Management"

Figure 35:
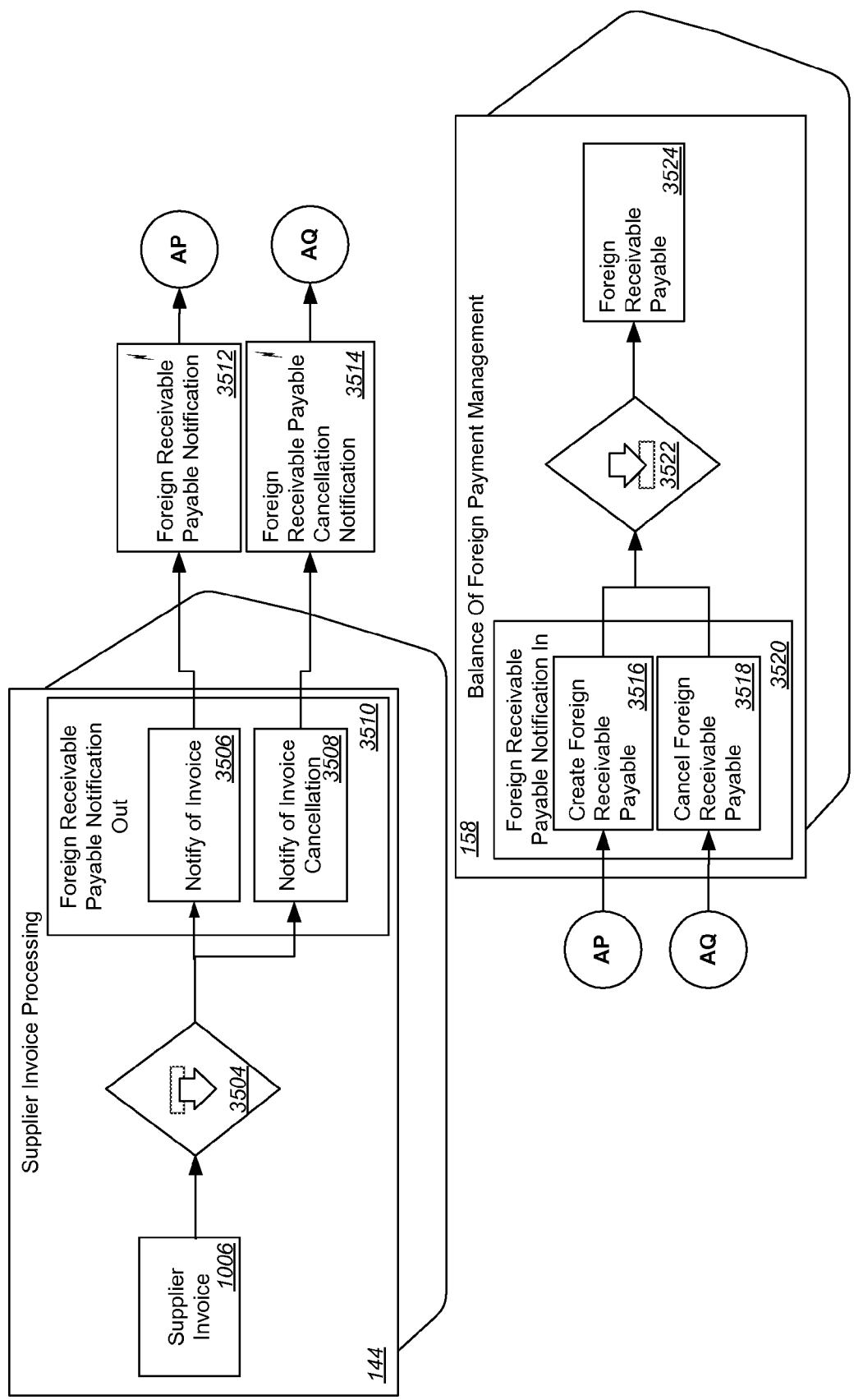
FIG. 35 is a block diagram showing interactions between a Supplier Invoice Processing process component and a Balance of Foreign Payment Management process component.

FIG. 35 is a block diagram showing interactions between the Supplier Invoice Processing process component 144 and the Balance of Foreign Payment Management process component 158. The interaction starts when a supplier invoice is created or cancelled related to a non-resident seller. The Supplier Invoice Processing process component 144 can notify the Balance of Foreign Payments Management process component 158 about the creation or cancellation of a payable related to a non-resident seller.

As shown in FIG. 35, the Supplier Invoice Processing process component 144 includes a Supplier Invoice business object 1006 that represents a company's obligation to pay a supplier for delivered goods and services. For example, if the company returns goods or complains about services, the supplier call issue a credit memo for an amount equal to or lower than the original invoice, and can refund the money to the company. For example, for invoiced goods that require a duty, a customs duty invoice can be submitted by the customs authority, stating a company's obligation to pay tax on the import or export of goods. A Notify Supplier of Invoice to Balance of Foreign Payments Management outbound process agent 3504 uses a Notify of Invoice operation 3506 to notify the Balance Of Foreign Payment Management process component 158 about the foreign receivables/payables of the supplier invoice. Alternatively, a Notify of Invoice Cancellation operation 3508 can be used to notify the Balance of Foreign, Payment Management process component 158 about the cancellation of a previously sent notification for foreign receivables/payables of the supplier invoice. Both operations 3506 and 3508 are included in a Foreign Receivable Payable Notification Out interface 3510. The Notify of Invoice operation 3506 generates a Foreign Receivable Payable Notification message 3512 that can be sent to the Balance of Foreign Payment Management process component 158. The Notify of Invoice Cancellation operation 3508 generates a Foreign Receivable Payable Cancellation Notification message 3514 that can be sent to the Balance of Foreign Payment Management process component 158.

The messages 3512 and 3514 are received by a Create Foreign Receivable Payable operation 3516 and a Cancel Foreign Receivable Playable operation 3518, respectively, which are included in a Foreign Receivable Payable Notification In interface 3520. The Foreign Receivable Payable Notification message 3512 is received by the Create Foreign Receivable Payable operation 3516, which creates a foreign receivable or payable. The Foreign Receivable Payable Cancellation Notification message 3514 is received by the Cancel Foreign Receivable Payable operation 3518, which cancels a foreign receivable or payable. Operations 3516 and 3518 use a Maintain Foreign Receivable Payable inbound process agent 3522 to create, change, or cancel a foreign receivable or payable in a Foreign Receivable Payable business object 3524. The Foreign Receivable Payable business object 3524 represents a receivable from or payable to a non-resident business partner.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in, this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the present disclosure or of what may be claimed, but rather as an exemplification of preferred embodiments of the present disclosure. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising instructions encoded on a non-transitory, computer-readable medium, the instructions being structured as process components interacting with each other through service interfaces, the instructions operable when executed by at least one processor to:

define a plurality of process components, each of the process components comprising a modular and application-independent package of reusable, granular software implementing a respective and distinct business process, the business process comprising functionality exposed by the process component via a corresponding service interface, the plurality of process components including:

an inventory processing process component that provides services to maintain current stock, content, and structure of logistics units and allocations;

an inbound delivery processing process component that combines tasks concerning inbound delivery processes and enables communication with an originating document, a vendor, and invoicing;

a site logistics processing process component that supports preparation, execution, and confirmation of logistics processes within a site;

a material inspection processing process component that processes quality inspection steps that have to be performed to check whether a material fulfills its specified requirements;

a purchase request processing process component that creates, changes, and processes purchase requests to locate appropriate external sources of supply;

a purchase order processing process component that creates and maintains purchase orders and purchase order confirmations;

a purchasing contract process component that creates and maintains purchasing contracts;

a supplier invoice processing process component that processes supplier invoices, the processes including exception handling and approval;

a demand forecast processing process component that receives and processes demand forecasts;

a supply and demand matching process component that combines tasks necessary to ensure that sufficient material receipt elements exist to cover material demand while taking available capacity into account;

an external procurement trigger and response process component that combines tasks for processing procurement planning orders and an interface to purchasing from a supply planning perspective; and a logistics execution control process component that creates, controls, and monitors supply chain execution activities that are necessary for fulfillment of an order, and triggers necessary site logistics activities and receives information about the supply chain execution progress; and define a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based, pair-wise interaction between the respective process components of the respective operations, the pair-wise interactions between pairs of the process components including interactions between:

the logistics execution control process component and the inbound delivery processing process component, where the pair-wise interaction between the logistics execution control process component and the inbound delivery processing process component includes the transmission of:
  a delivery request fulfillment request message from the logistics execution control process component to the inbound delivery processing process component, the delivery request fulfillment request message comprising a request for fulfillment of an inbound delivery order on a macro-logistics level;
  a delivery request fulfillment confirmation message from the inbound delivery processing process component to the logistics execution control process component, the delivery request fulfillment confirmation message comprising a confirmation of delivery fulfillment;

the purchase order processing process component and the supplier invoice processing process component, where the pair-wise interaction between the purchase order processing process component and the supplier invoice processing process component includes the transmission of:
  an invoicing due notification message from the purchase order processing process component to the supplier invoice processing process component, the invoicing due notification message comprising a notification to the supplier invoice processing process component regarding an invoice due and/or when a purchase order business object is created, changed, or cancelled; and
  a purchase order invoice values notification message from the supplier invoice processing process component and the purchase order processing process component, the purchase order invoice values notification message comprising a notification to the purchase order processing process component that at least a portion of a purchase order has been invoiced, the notification including at least a portion of the invoiced quantity and amount of the purchase order;

the inbound delivery processing process component and the supplier invoice processing process component, where the pair-wise interaction between the inbound delivery processing process component and the supplier invoice processing process component includes the transmission of:
  an invoicing due notification message from the inbound delivery processing process component to the supplier invoice processing process component, the invoicing due notification message comprising notification of a due invoice to the supplier invoice processing process component;

the purchase order processing process component and the external procurement trigger and response process component, where the pair-wise interaction between the purchase order processing process component and the external procurement trigger and response process component includes the transmission of:
  a purchase order notification message from the purchase order processing process component to the external procurement trigger and response process component, the purchase order notification message comprising a notification to the external procurement trigger and response process component regarding creation, modification, or cancellation of a purchase order;

the external procurement trigger and response process component and the purchase order processing process component, where the pair-wise interaction between the external procurement trigger and response process component and the purchase order processing process component includes the transmission of:
  a purchase order delivery values notification message from the external procurement trigger and response process component to the purchase order processing process component, the purchase order delivery values notification message comprising a notification to purchasing of fulfillment of a particular purchase order;
  a purchase request request message from the external procurement trigger and response process component to the purchase order processing process component, the purchase request request message comprising a request from a supply planner to a buyer asking the buyer to procure products or services; and
  a purchase request confirmation message from the purchase order processing process component to the external procurement trigger and response process component, the purchase request confirmation message comprising a confirmation of a creation, change, or cancellation of a purchase request;

the inventory processing process component and the supply and demand matching process component, where the pair-wise interaction between the inventory processing process component and the supply and demand matching process component includes the transmission of:
  a planning view of inventory reconciliation notification message from the inventory processing process component to the supply and demand matching process component, the planning view of inventory reconciliation notification message comprising a notification to the supply and demand matching process component regarding the reconciliation of inventory quantities aggregated on a material and supply planning area level;

the site logistics processing process component and the supply and demand matching process component, where the pair-wise interaction between the site logistics processing process component and the supply and demand matching process component includes the transmission of:
  a logistics confirmation inventory change notification message from the site logistics processing process component to the supply and demand matching process component, the logistics confirmation inventory change notification message comprising a notification related to inventory change planning resulting from execution of a site logistics process at a specific time; and the site logistics processing process component and the logistics execution control process component, where the pair-wise interaction between the site logistics processing process component and the logistics execution control process component includes the transmission of:
- a site logistics request and inventory change notification message from the site logistics processing process component to the logistics execution control process component, the site logistics request and inventory change notification message comprising notification to the logistics execution control process component regarding creation of a new site logistics request and a request to create a site logistics requisition or update relevant inventory changes in an existing site logistics requisition; and
- a site logistics request notification reconciliation notification message from the site logistics processing process component to the logistics execution control process component, the site logistics request notification reconciliation notification message comprising a notification to a planning system of a reconciliation of a site logistics request.

2. The product of claim 1, wherein the plurality of process components further includes:
- an accounting process component that represents relevant business transactions for valuation and profitability analysis;
- a due item processing process component that collects, manages, and monitors trade receivables or payables and corresponding sales tax or withholding tax;
- a balance of foreign payment management process component that collects, processes, and reports receivables and payables according to foreign trade regulations to create a balance of payments of a country;
- a demand planning process component that provides accurate and measurable estimates of future demand;
- a payment processing process component that processes and manages payments; and
- a request for quote (RFQ) processing process component that processes requests for quotes and supplier quotes for strategic as well as operational negotiation purposes;

and wherein the pair-wise interactions between pairs of the process components further include interactions between:
the purchase request processing process component and an RFQ Processing process component;
- the due item processing process component and the payment processing process component;
- the purchase order processing process component and the accounting process component;
- the payment processing process component and a payment processing at a business partner external processing component;
- a bank statement creation at bank external process component and the payment processing process component;
- the supplier invoice processing process component and the due item processing process component;
- the payment processing process component and the accounting process component;
- the purchase order processing process component and a sales order processing at supplier external process component;
- a customer invoice processing at supplier external process component and the supplier invoice processing process component;
- the due item processing component and the accounting process component;
- the RFQ Processing process component and an opportunity/customer quote processing at supplier external process component;
- the payment processing process component and a payment order processing at house bank external process component;
- the site logistics processing process component and the accounting process component;
- the RFQ processing process component and the purchase order processing process component;
- the supplier invoice processing process component and the accounting process component;
- the supplier invoice processing process component and a supplier invoice verification exception resolution at processor external process component;
- an outbound delivery processing at supplier external process component and the inbound delivery processing process component;
- the demand planning process component and the demand forecast processing process component;
- the site logistics processing process component and the site logistics processing process component;
- the supplier invoice processing process component and a customer invoice at supplier process component; and
- the supplier invoice processing process component and the balance of foreign payment management process component.

3. The product of claim 1, wherein:
each of the plurality of process components is assigned to no more than one deployment unit among multiple deployment units, and each deployment unit is deployable on a separate computer hardware platform independent of every other deployment unit; and
all interaction between a process component in one deployment unit and any other process component in any other deployment unit takes place through the respective service interfaces of the two process components.

4. The product of claim 1, wherein the deployment units comprise:
- a financial accounting deployment unit that includes the accounting process component;
- a production and site logistics execution deployment unit that includes the inbound delivery processing process component, the site logistics processing process component, the material inspection processing process component, and the inventory processing process component;
- a purchasing deployment unit that includes the purchase request processing process component, the purchase order processing process component, and the purchasing contract processing process component;
- a supplier invoicing deployment unit that includes the supplier invoice processing process component;
- a payment deployment unit that includes the payment processing process component;
- a strategic sourcing processing deployment unit that includes the request for quote (RFQ) processing process component;
- a business planning deployment unit that includes the demand planning process component;
- a due item management deployment unit that includes the due item processing process component and the balance of foreign payment management process component; and
- a supply chain control deployment unit that includes the demand forecast processing process component, the supply and demand matching process component, the external procurement trigger and response process component, and the logistics execution control process component.

5. The product of claim 1, wherein:
each of the process components includes at least one business object.

6. The product of claim 5, wherein the business objects comprise a business process object.

7. The product of claim 5, wherein none of the business objects included in any one of the process components is included in any of the other process components.

8. The product of claim 1, further comprising a plurality of process agents, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

9. The product of claim 8, wherein each inbound process agent comprises a first inbound process agent operable to start an execution of a step requested in a first inbound message by creating or updating at least one business object instance.

10. The product of claim 8, wherein the outbound process agents comprise a first asynchronous outbound process agent that is called after a business object that is associated with the first outbound process agent changes.

11. The product of claim 1, wherein the operations comprise synchronous and asynchronous operations.

12. A system, comprising:
a computer system comprising at least one hardware platform for executing computer instructions, the computer instructions structured as a plurality of process components interacting with each other through service interfaces, each hardware platform including at least one processor for executing the computer instructions;
at least one memory storing a plurality of process components executable by the respective processor of the particular hardware platform, each of the process components comprising a modular and application-independent package of reusable granular software implementing a respective and distinct business process, the business process comprising functionality exposed by the process component via at least one service interface, the plurality of process components including:
an inventory processing process component that provides services to maintain current stock, content, and structure of logistics units and allocations;
an inbound delivery processing process component that combines tasks concerning inbound delivery processes and enables communication with an originating document, a vendor, and an invoicing;
a site logistics processing process component that supports preparation, execution, and confirmation of logistics processes within a site;
a material inspection processing process component that processes quality inspection steps that have to be performed to check whether a material fulfills its specified requirements;
a purchase request processing process component that creates, changes, and processes purchase requests to locate appropriate external sources of supply;
a purchase order processing process component that creates and maintains purchase orders and purchase order confirmations;
a purchasing contract process component that creates and maintains purchasing contracts;
a supplier invoice processing process component that processes supplier invoices, the processes including exception handling and approval;
a demand forecast processing process component that receives and processes demand forecasts;
a supply and demand matching process component that combines tasks necessary to ensure that sufficient material receipt elements exist to cover material demand while taking available capacity into account;
an external procurement trigger and response process component that combines tasks for processing procurement planning orders and an interface to purchasing from a supply planning perspective;
a logistics execution control process component that creates, controls, and monitors supply chain execution activities that are necessary for fulfillment of an order, and triggers the necessary site logistics activities and receives information about the supply chain execution progress; and
the at least one memory further storing a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:
the logistics execution control process component and the inbound delivery processing process component, where the pair-wise interaction between the logistics execution control process component and the inbound delivery processing process component includes the transmission of:
a delivery request fulfillment request message from the logistics execution control process component to the inbound delivery processing process component, the delivery request fulfillment request message comprising a request for fulfillment of an inbound delivery order on a macro-logistics level;
a delivery request fulfillment confirmation message from the inbound delivery processing process component to the logistics execution control process component, the delivery request fulfillment confirmation message comprising a confirmation of delivery fulfillment;
the purchase order processing process component and the supplier invoice processing process component, where the pair-wise interaction between the purchase order processing process component and the supplier invoice processing process component includes the transmission of:
an invoicing due notification message from the purchase order processing process component to the supplier invoice processing process component, the invoicing due notification message comprising a notification to the supplier invoice processing process component regarding an invoice due and/or when a purchase order business object is created, changed, or cancelled; and a purchase order invoice values notification message from the supplier invoice processing process component and the purchase order processing process component, the purchase order invoice values notification message comprising a notification to the purchase order processing process component that at least a portion of a purchase order has been invoiced, the notification including at least a portion of the invoiced quantity and amount of the purchase order;

the inbound delivery processing process component and the supplier invoice processing process component, where the pair-wise interaction between the inbound delivery processing process component and the supplier invoice processing process component includes the transmission of:

an invoicing due notification message from the inbound delivery processing process component to the supplier invoice processing process component, the invoicing due notification message comprising notification of a due invoice to the supplier invoice processing process component;

the purchase order processing process component and the external procurement trigger and response process component, where the pair-wise interaction between the purchase order processing process component and the external procurement trigger and response process component includes the transmission of:

a purchase order notification message from the purchase order processing process component to the external procurement trigger and response process component, the purchase order notification message comprising a notification to the external procurement trigger and response process component regarding creation, modification, or cancellation of a purchase order;

the external procurement trigger and response process component and the purchase order processing process component, where the pair-wise interaction between the external procurement trigger and response process component and the purchase order processing process component includes the transmission of:

a purchase order delivery values notification message from the external procurement trigger and response process component to the purchase order processing process component, the purchase order delivery values notification message comprising a notification to purchasing of fulfillment of a particular purchase order;

a purchase request request message from the external procurement trigger and response process component to the purchase order processing process component, the purchase request request message comprising a request from a supply planner to a buyer asking the buyer to procure products or services; and a purchase request confirmation message from the purchase order processing process component to the external procurement trigger and response process component, the purchase request confirmation message comprising a confirmation of a creation, change, or cancellation of a purchase request;

the inventory processing process component and the supply and demand matching process component, where the pair-wise interaction between the inventory processing process component and the supply and demand matching process component includes the transmission of:

a planning view of inventory reconciliation notification message from the inventory processing process component to the supply and demand matching process component, the planning view of inventory reconciliation notification message comprising a notification to the supply and demand matching process component regarding the reconciliation of inventory quantities aggregated on a material and supply planning area level;

the site logistics processing process component and the supply and demand matching process component, where the pair-wise interaction between the site logistics processing process component and the supply and demand matching process component includes the transmission of:

a logistics confirmation inventory change notification message from the site logistics processing process component to the supply and demand matching process component, the logistics confirmation inventory change notification message comprising a notification related to inventory change planning resulting from execution of a site logistics process at a specific time; and the site logistics processing process component and the logistics execution control process component, where the pair-wise interaction between the site logistics processing process component and the logistics execution control process component includes the transmission of:

a site logistics request and inventory change notification message from the site logistics processing process component to the logistics execution control process component, the site logistics request and inventory change notification message comprising notification to the logistics execution control process component regarding creation of a new site logistics request and a request to create a site logistics requisition or update relevant inventory changes in an existing site logistics requisition; and a site logistics request notification reconciliation notification message from the site logistics processing process component to the logistics execution control process component, the site logistics request notification reconciliation notification message comprising a notification to a planning system of a reconciliation of a site logistics request.

13. The system of claim 12 wherein:

the plurality of process components further includes:

an accounting process component that represents relevant business transactions for valuation and profitability analysis;

a due item processing process component that collects, manages, and monitors trade receivables or payables and corresponding sales tax or withholding tax;

a balance of foreign payment management process component that collects, processes, and reports receivables and payables according to foreign trade regulations to create a balance of payments of a country;

a demand planning process component that provides accurate and measurable estimates of future demand;

a payment processing process component that processes and manages payments; and a request for quote (RFQ) processing process component that processes requests for quotes and supplier quotes for strategic as well as operational negotiation purposes; and the pair-wise interactions between pairs of the process components further include interactions between:
- the purchase request processing process component and an RFQ Processing process component;
- the due item processing process component and the payment processing process component;
- the purchase order processing process component and the accounting process component;
- the payment processing process component and a payment processing at a business partner external processing component;
- a bank statement creation at bank external process component and the payment processing process component;
- the supplier invoice processing process component and the due item processing process component;
- the payment processing process component and the accounting process component;
- the purchase order processing process component and a sales order processing at supplier external process component;
- a customer invoice processing at supplier external process component and the supplier invoice processing process component;
- the due item processing component and the accounting process component;
- the RFQ Processing process component and an opportunity/customer quote processing at supplier external process component;
- the payment processing process component and a payment order processing at house bank external process component;
- the site logistics processing process component and the accounting process component;
- the RFQ processing process component and the purchase order processing process component;
- the supplier invoice processing process component and the accounting process component;
- the supplier invoice processing process component and a supplier invoice verification exception resolution at processor external process component;
- an outbound delivery processing at supplier external process component and the inbound delivery processing process component;
- the demand planning process component and the demand forecast processing process component;
- the site logistics processing process component and the site logistics processing process component;
- the supplier invoice processing process component and a customer invoice at supplier process component; and
- the supplier invoice processing process component and the balance of foreign payment management process component.

14. The system of claim 12, wherein:
each of the process components includes one or more business object.

15. The system of claim 12, wherein none of the business objects included in any one of the process components is included in any of the other process components.

16. The system of claim 12, further comprising a plurality of process agents, each process agent being either an inbound process agent or an outbound process agent, each inbound process agent being operable to receive a message from a corresponding inbound operation, each outbound process agent being operable to cause a corresponding outbound operation to send a message, and each process agent being associated with exactly one process component.

17. The system of claim 12, the system comprising multiple hardware platforms, wherein:
- the inbound delivery processing process component, the site logistics processing process component, the material inspection processing process component, and the inventory processing process component are deployed on a first hardware platform;
- the purchase request processing process component, the purchase order processing process component, and the purchasing contract process component are deployed on a second hardware platform;
- the supplier invoice processing process component is deployed on a third hardware platform; and
- the demand forecast processing process component, the supply and demand matching process component, the external procurement trigger and response process component, and the logistics execution control process component are deployed on a fourth hardware platform.

18. The system of claim 17, wherein each of the first through the fourth hardware platforms are distinct and separate from each other.

19. A computer-implemented method for developing a computer software application, the method comprising the following steps performed by at least one processor:
obtaining, in a programmable computer system having at least one processor, a storage medium, and an interface, digital data representing an architectural design for a set of processes implementing an end-to-end application process, the design specifying a process component for each process in the set of processes, each of the process components comprising a modular and application-independent package of reusable granular software implementing a respective and distinct business process, the business process comprising functionality exposed by the process component, and the design further specifying a set of process component interactions based on messages transmitted between two or more of the process components, wherein
the specified process components include:
- an inventory processing process component that provides services to maintain current stock, content, and structure of logistics units and allocations;
- an inbound delivery processing process component that combines tasks concerning inbound delivery processes and enables communication with an originating document, a vendor, and invoicing;
- a site logistics processing process component that supports preparation, execution, and confirmation of logistics processes within a site;
- a material inspection processing process component that processes of quality inspection steps that have to be performed to check whether a material fulfills its specified requirements;
- a purchase request processing process component that creates, changes, and processes purchase requests to locate appropriate external sources of supply;
- a purchase order processing process component that creates and maintains purchase orders and purchase order confirmations;
- a purchasing contract process component that creates and maintains purchasing contracts;

a supplier invoice processing process component that processes supplier invoices, the processes including exception handling and approval;

a demand forecast processing process component that receives and processes demand forecasts;

a supply and demand matching process component that combines tasks necessary to ensure that sufficient material receipt elements exist to cover material demand while taking available capacity into account;

an external procurement trigger and response process component that combines tasks for processing procurement planning orders and an interface to purchasing from a supply planning perspective;

a logistics execution control process component that creates, controls, and monitors supply chain execution activities that are necessary for fulfillment of an order, and triggers the necessary site logistics activities and receives information about the supply chain execution progress;

and wherein the process component interactions include interactions between:

the logistics execution control process component and the inbound delivery processing process component, where the pair-wise interaction between the logistics execution control process component and the inbound delivery processing process component includes the transmission of:

a delivery request fulfillment request message from the logistics execution control process component to the inbound delivery processing process component, the delivery request fulfillment request message comprising a request for fulfillment of an inbound delivery order on a macro-logistics level;

a delivery request fulfillment confirmation message from the inbound delivery processing process component to the logistics execution control process component, the delivery request fulfillment confirmation message comprising a confirmation of delivery fulfillment;

the purchase order processing process component and the supplier invoice processing process component, where the pair-wise interaction between the purchase order processing process component and the supplier invoice processing process component includes the transmission of:

an invoicing due notification message from the purchase order processing process component to the supplier invoice processing process component, the invoicing due notification message comprising a notification to the supplier invoice processing process component regarding an invoice due and/or when a purchase order business object is created, changed, or cancelled; and a purchase order invoice values notification message from the supplier invoice processing process component and the purchase order processing process component, the purchase order invoice values notification message comprising a notification to the purchase order processing process component that at least a portion of a purchase order has been invoiced, the notification including at least a portion of the invoiced quantity and amount of the purchase order;

the inbound delivery processing process component and the supplier invoice processing process component, where the pair-wise interaction between the inbound delivery processing process component and the supplier invoice processing process component includes the transmission of:

an invoicing due notification message from the inbound delivery processing process component to the supplier invoice processing process component, the invoicing due notification message comprising notification of a due invoice to the supplier invoice processing process component;

the purchase order processing process component and the external procurement trigger and response process component, where the pair-wise interaction between the purchase order processing process component and the external procurement trigger and response process component includes the transmission of:

a purchase order notification message from the purchase order processing process component to the external procurement trigger and response process component, the purchase order notification message comprising a notification to the external procurement trigger and response process component regarding creation, modification, or cancellation of a purchase order;

the external procurement trigger and response process component and the purchase order processing process component, where the pair-wise interaction between the external procurement trigger and response process component and the purchase order processing process component includes the transmission of:

a purchase order delivery values notification message from the external procurement trigger and response process component to the purchase order processing process component, the purchase order delivery values notification message comprising a notification to purchasing of fulfillment of a particular purchase order;

a purchase request request message from the external procurement trigger and response process component to the purchase order processing process component, the purchase request request message comprising a request from a supply planner to a buyer asking the buyer to procure products or services; and a purchase request confirmation message from the purchase order processing process component to the external procurement trigger and response process component, the purchase request confirmation message comprising a confirmation of a creation, change, or cancellation of a purchase request;

the inventory processing process component and the supply and demand matching process component, where the pair-wise interaction between the inventory processing process component and the supply and demand matching process component includes the transmission of:

a planning view of inventory reconciliation notification message from the inventory processing process component to the supply and demand matching process component, the planning view of inventory reconciliation notification message comprising a notification to the supply and demand matching process component regarding the reconciliation of inventory quantities aggregated on a material and supply planning area level;

the site logistics processing process component and the supply and demand matching process component, where the pair-wise interaction between the site logistics processing process component and the supply and demand matching process component includes the transmission of:
- a logistics confirmation inventory change notification message from the site logistics processing process component to the supply and demand matching process component, the logistics confirmation inventory change notification message comprising a notification related to inventory change planning resulting from execution of a site logistics process at a specific time; and the site logistics processing process component and the logistics execution control process component, where the pair-wise interaction between the site logistics processing process component and the logistics execution control process component includes the transmission of:
- a site logistics request and inventory change notification message from the site logistics processing process component to the logistics execution control process component, the site logistics request and inventory change notification message comprising notification to the logistics execution control process component regarding creation of a new site logistics request and a request to create a site logistics requisition or update relevant inventory changes in an existing site logistics requisition; and
- a site logistics request notification reconciliation notification message from the site logistics processing process component to the logistics execution control process component, the site logistics request notification reconciliation notification message comprising a notification to a planning system of a reconciliation of a site logistics request; and generating, using the at least one processor on the computer system, a computer software application to perform the set of processes based at least in part on the obtained digital data including the specified process components and the specified process component interactions.

20. The method of claim 19, wherein:
the specified process components further include:
- an accounting process component that represents relevant business transactions for valuation and profitability analysis;
- a due item processing process component that collects, manages, and monitors trade receivables or payables and corresponding sales tax or withholding tax;
- a balance of foreign payment management process component that collects, processes, and reports receivables and payables according to foreign trade regulations to create a balance of payments of a country;
- a demand planning process component that provides accurate and measurable estimates of future demand;
- a payment processing process component that processes and manages payments; and
- a request for quote (RFQ) processing process component that processes requests for quotes and supplier quotes for strategic as well as operational negotiation purposes; and the process component interactions further include interactions between:
- the purchase request processing process component and an RFQ Processing process component;
- the due item processing process component and the payment processing process component;
- the purchase order processing process component and the accounting process component;
- the payment processing process component and a payment processing at a business partner external processing component;
- a bank statement creation at bank external process component and the payment processing process component;
- the supplier invoice processing process component and the due item processing process component;
- the payment processing process component and the accounting process component;
- the purchase order processing process component and a sales order processing at supplier external process component;
- a customer invoice processing at supplier external process component and the supplier invoice processing process component;
- the due item processing component and the accounting process component;
- the RFQ Processing process component and an opportunity/customer quote processing at supplier external process component;
- the payment processing process component and a payment order processing at house bank external process component;
- the site logistics processing process component and the accounting process component;
- the RFQ processing process component and the purchase order processing process component;
- the supplier invoice processing process component and the accounting process component;
- the supplier invoice processing process component and a supplier invoice verification exception resolution at processor external process component;
- an outbound delivery processing at supplier external process component and the inbound delivery processing process component;
- the demand planning process component and the demand forecast processing process component;
- the site logistics processing process component and the site logistics processing process component;
- the supplier invoice processing process component and a customer invoice at supplier process component; and
- the supplier invoice processing process component and the balance of foreign payment management process component.

21. The method of claim 19, wherein each process in the set of processes is a business process transforming a defined business input into a defined business outcome.

22. The method of claim 21, wherein obtaining digital data representing the architectural design further comprises editing the design before using the design.

* * * * *